(12) United States Patent
Mathur et al.

(10) Patent No.: US 7,048,900 B2
(45) Date of Patent: May 23, 2006

(54) METHOD AND APPARATUS FOR PRODUCTION OF PRECIPITATED CALCIUM CARBONATE AND SILICATE COMPOUNDS IN COMMON PROCESS EQUIPMENT

(75) Inventors: Vijay K. Mathur, Federal Way, WA (US); Varun K. Mathur, Phoenix, AZ (US)

(73) Assignee: G.R. International, Inc., Federal Way, WA (US)

( * ) Notice: Subject to any disclaimer, the term of this patent is extended or adjusted under 35 U.S.C. 154(b) by 419 days.

(21) Appl. No.: 09/797,173

(22) Filed: Feb. 28, 2001

(65) Prior Publication Data

US 2003/0051841 A1 Mar. 20, 2003

Related U.S. Application Data

(60) Provisional application No. 60/265,657, filed on Jan. 31, 2001.

(51) Int. Cl.
*C01B 33/24* (2006.01)
*C01F 11/18* (2006.01)

(52) U.S. Cl. .................. 423/331; 423/430; 423/432

(58) Field of Classification Search .............. 423/331, 423/432, 430, 431
See application file for complete search history.

(56) References Cited

U.S. PATENT DOCUMENTS

| | | | |
|---|---|---|---|
| 601,007 A | 3/1898 | Stureke | |
| 1,574,363 A | 2/1926 | Calvert | |
| 1,851,413 A | 3/1932 | Thomson | |

(Continued)

FOREIGN PATENT DOCUMENTS

| | | |
|---|---|---|
| CA | 566191 | 11/1958 |
| CA | 601124 | 7/1960 |
| CA | 601158 | 7/1960 |
| CA | 653797 | 12/1962 |
| CA | 656411 | 1/1963 |
| CA | 666992 | 7/1963 |
| CA | 712964 | 7/1965 |
| CA | 712965 | 7/1965 |
| CA | 991826 | 6/1976 |
| CA | 1129575 | 8/1982 |
| DE | 2516097 | 12/1975 |
| DE | 3306528 A1 | 7/1984 |
| DE | 3625254 A1 | 1/1987 |
| WO | WO 8402727 | 7/1984 |
| WO | WO 01/14274 A1 | 1/2001 |
| WO | WO 01/07365 A1 | 2/2001 |

OTHER PUBLICATIONS

"The Water Content of Calcium Silicate Hydrate (10", Hydrated Calcium Silicates, Taylor, Part V., 1953 (pp. 163–171), no month.
"System Water Silica Calcium Oxide", Hydrothermal Syntheses and Equilibria, (p. 197–212), no date.
"Mineral Powder Diffraction File", Data Book, International Center for Diffraction Data, 29–377 (4 pages), no data.
"The Action of Carbon Dioxide Under Pressure Upon a Few Metal Hydroxides at o°C$^1$" by F.K. Cameron and W.O. Robinson, Journal of Physical Chemistry, vol. XII, (7 pages), no data.

(Continued)

*Primary Examiner*—Ngoc-Yen Nguyen
(74) *Attorney, Agent, or Firm*—R. Reams Goodloe, Jr.

(57) ABSTRACT

A method and apparatus for the production of calcium carbonate and calcium silicate in common superatmospheric reactors. Multiple reactors can be provided for switching production between reactors, and advantageously utilizing process waste heat. On site production of both PCC and Calcium Silicate Hydrates is thus achieved in a paper mill.

68 Claims, 34 Drawing Sheets

U.S. PATENT DOCUMENTS

| | | |
|---|---|---|
| 1,942,989 A | 1/1934 | Thomson |
| 2,204,113 A | 6/1940 | Allen |
| 2,211,908 A | 8/1940 | O'Connor |
| 2,215,891 A | 9/1940 | Thomson et al. |
| 2,215,892 A | 9/1940 | Thompson et al. |
| 2,386,389 A | 10/1945 | Elkington et al. |
| 2,462,277 A | 2/1949 | Naugle |
| 2,534,303 A | 12/1950 | Serinis |
| 2,547,127 A | 4/1951 | Kalousck |
| 2,665,996 A | 1/1954 | Kalousek |
| 2,786,757 A | 3/1957 | Taylor |
| 2,786,758 A | 3/1957 | Taylor |
| 2,802,719 A | 8/1957 | Avedikian |
| 2,888,377 A | 5/1959 | Allen |
| 2,935,437 A | 5/1960 | Taylor |
| 2,943,970 A | 7/1960 | Allen |
| 2,995,422 A | 8/1961 | Atkinson et al. |
| 3,033,648 A | 5/1962 | Vander Linden |
| 3,034,913 A | 5/1962 | Gosta |
| 3,052,563 A | 9/1962 | Vanderlinden |
| 3,131,024 A | 4/1964 | Leineweber |
| 3,150,926 A | 9/1964 | Pope et al. |
| 3,190,789 A | 6/1965 | Taylor |
| 3,257,220 A | 6/1966 | Kalousek et al. |
| 3,264,130 A | 8/1966 | Mays |
| 3,304,154 A | 2/1967 | Kiouzes-Pezas |
| 3,352,746 A | 11/1967 | Williams |
| 3,597,253 A | 8/1971 | Beschke et al. |
| 3,660,021 A | 5/1972 | Olmsted et al. |
| 3,679,446 A | 7/1972 | Kubo |
| 3,804,652 A | 4/1974 | Laidlier et al. |
| 3,806,585 A | 4/1974 | Takahashi et al. |
| 3,816,149 A | 6/1974 | Zettel |
| 3,833,464 A * | 9/1974 | Rolfe .......................... 162/29 |
| 3,835,216 A | 9/1974 | Almagro et al. |
| 3,920,800 A | 11/1975 | Harris |
| 3,928,539 A | 12/1975 | Natoh et al. |
| 3,998,650 A | 12/1976 | Schmitt-Henco et al. |
| 4,026,721 A | 5/1977 | Kurrie |
| 4,072,537 A | 2/1978 | Kurrie |
| 4,117,191 A | 9/1978 | Kurrie |
| 4,118,227 A | 10/1978 | Shiohara et al. |
| 4,124,439 A | 11/1978 | Dessauer |
| 4,157,379 A | 6/1979 | Arika et al. |
| 4,159,312 A | 6/1979 | Shibazaki et al. |
| 4,162,924 A | 7/1979 | Kubo et al. |
| 4,181,567 A | 1/1980 | Riddel et al. |
| 4,219,590 A | 8/1980 | Shibazaki et al. |
| 4,237,147 A | 12/1980 | Merten et al. |
| 4,242,318 A | 12/1980 | Brahm et al. |
| 4,243,429 A | 1/1981 | Tamura et al. |
| 4,244,933 A | 1/1981 | Shibazaki et al. |
| 4,260,454 A | 4/1981 | Wason et al. |
| 4,272,498 A | 6/1981 | Faatz |
| 4,277,457 A | 7/1981 | Taga et al. |
| 4,279,661 A | 7/1981 | Strauch et al. |
| 4,294,810 A | 10/1981 | Taga et al. |
| 4,298,386 A | 11/1981 | Kubo et al. |
| 4,330,519 A | 5/1982 | Takahashi et al. |
| 4,367,207 A | 1/1983 | Vanderheiden |
| 4,402,892 A | 9/1983 | Helser |
| 4,422,880 A | 12/1983 | Wason et al. |
| 4,432,804 A | 2/1984 | Tamura et al. |
| 4,529,508 A | 7/1985 | Cain, Jr. et al. |
| 4,545,970 A | 10/1985 | Krijgsman |
| 4,557,916 A | 12/1985 | Witham |
| 4,559,214 A | 12/1985 | Howard et al. |
| 4,629,508 A | 12/1986 | Cain, Jr. et al. |
| 4,668,300 A | 5/1987 | Miller |
| 4,698,219 A | 10/1987 | Tsao et al. |
| 4,714,603 A | 12/1987 | Vanderheiden |
| 4,760,138 A | 7/1988 | So et al. |
| 4,762,588 A | 8/1988 | Hirano et al. |
| 4,767,464 A | 8/1988 | Strauch et al. |
| 4,780,180 A | 10/1988 | Take et al. |
| 4,812,299 A | 3/1989 | Wason |
| 4,824,654 A | 4/1989 | Ota et al. |
| 4,828,620 A | 5/1989 | Mallow et al. |
| 4,853,351 A | 8/1989 | Takahashi et al. |
| 4,888,160 A | 12/1989 | Kosin et al. |
| 4,892,590 A | 1/1990 | Gill et al. |
| 4,894,217 A | 1/1990 | Ostman |
| 4,927,618 A | 5/1990 | Mathur et al. |
| 4,961,823 A | 10/1990 | Hirano et al. |
| 4,965,452 A | 10/1990 | Sturm |
| 4,980,395 A | 12/1990 | Mathur et al. |
| 5,043,017 A | 8/1991 | Passaretti |
| 5,059,407 A | 10/1991 | Wallace et al. |
| 5,075,093 A | 12/1991 | Tanaka et al. |
| 5,098,520 A | 3/1992 | Begala |
| 5,120,365 A | 6/1992 | Kogler |
| 5,127,995 A | 7/1992 | Wason |
| 5,156,719 A | 10/1992 | Passaretti |
| 5,164,006 A | 11/1992 | Chapnerkar et al. |
| 5,164,172 A | 11/1992 | Katayama et al. |
| 5,169,682 A | 12/1992 | Asai |
| 5,187,125 A | 2/1993 | Someya et al. |
| 5,215,734 A | 6/1993 | Kunesh et al. |
| 5,223,239 A | 6/1993 | Moran et al. |
| 5,227,025 A | 7/1993 | Kunesh et al. |
| 5,230,734 A | 7/1993 | Kumasaka et al. |
| 5,232,678 A | 8/1993 | Bleakley et al. |
| 5,269,818 A | 12/1993 | Kunesh et al. |
| 5,275,651 A | 1/1994 | Minayoshi et al. |
| 5,279,663 A | 1/1994 | Kaliski |
| 5,292,365 A | 3/1994 | Delfosse |
| 5,292,495 A * | 3/1994 | Nakajima et al. ........... 423/432 |
| 5,296,002 A | 3/1994 | Passaretti |
| 5,326,897 A | 7/1994 | Jagers et al. |
| 5,332,564 A | 7/1994 | Chapnerkar et al. |
| 5,342,600 A | 8/1994 | Bleakley et al. |
| 5,344,487 A | 9/1994 | Whalen-Shaw |
| 5,352,287 A | 10/1994 | Wason et al. |
| 5,364,610 A | 11/1994 | Merris, Jr. |
| 5,370,852 A | 12/1994 | Ikawa et al. |
| 5,376,343 A | 12/1994 | Fouche |
| 5,411,639 A | 5/1995 | Kurrle |
| 5,413,635 A | 5/1995 | Matweecha et al. |
| 5,437,720 A | 8/1995 | Cox et al. |
| 5,455,050 A | 10/1995 | Beyerle et al. |
| 5,494,651 A | 2/1996 | Minayoshi et al. |
| 5,500,131 A | 3/1996 | Metz |
| 5,505,819 A | 4/1996 | De Witt et al. |
| 5,514,212 A | 5/1996 | Kurrle |
| 5,518,540 A | 5/1996 | Jones, Jr. |
| 5,531,821 A | 7/1996 | Wu |
| 5,543,153 A | 8/1996 | Walton |
| 5,558,782 A | 9/1996 | Bleakley et al. |
| 5,558,850 A | 9/1996 | Bleakley et al. |
| 5,584,923 A | 12/1996 | Wu |
| 5,591,256 A | 1/1997 | Freeman et al. |
| 5,593,488 A | 1/1997 | Wu |
| 5,593,489 A | 1/1997 | Wu |
| 5,595,819 A | 1/1997 | Anderson et al. |
| 5,599,388 A | 2/1997 | Wu |
| 5,634,968 A | 6/1997 | Pfaller et al. |
| 5,643,415 A | 7/1997 | Wise |
| 5,643,631 A | 7/1997 | Donigian et al. |
| 5,650,562 A | 7/1997 | Jones, Jr. |
| 5,653,795 A | 8/1997 | Brown |
| 5,665,205 A | 9/1997 | Srivatsa et al. |

| | | | | | | |
|---|---|---|---|---|---|---|
| 5,676,747 | A | 10/1997 | Brown | 6,726,807 B1 * | 4/2004 | Mathur .................... 162/181.6 |
| 5,679,723 | A | 10/1997 | Cooper et al. | 2002/0040773 A1 | 4/2002 | Matsuda et al. |
| 5,690,897 | A | 11/1997 | Drummond | | | |
| 5,695,733 | A | 12/1997 | Kroc et al. | | | |
| 5,711,802 | A | 1/1998 | Theil | | | |
| 5,750,038 | A | 5/1998 | Tsunematsu et al. | | | |
| 5,759,258 | A | 6/1998 | Sohara et al. | | | |
| 5,792,440 | A | 8/1998 | Huege | | | |
| 5,814,143 | A | 9/1998 | Freeman et al. | | | |
| 5,824,364 | A | 10/1998 | Cousin et al. | | | |
| 5,833,747 | A | 11/1998 | Bleakley et al. | | | |
| 5,916,420 | A | 6/1999 | Wurster et al. | | | |
| 5,989,714 | A | 11/1999 | Drummond | | | |
| 6,030,704 | A | 2/2000 | Wilshaw et al. | | | |
| 6,156,286 | A | 12/2000 | Fortier et al. | | | |
| 6,251,356 | B1 * | 6/2001 | Mathur ........................ 423/432 | | | |
| 6,312,659 | B1 | 11/2001 | Wise | | | |
| 6,413,373 | B1 | 7/2002 | Matsuda et al. | | | |

OTHER PUBLICATIONS

Paper on "Reactions Between Carbon Dioxide and Limewater", 4.10. pp. 329–337, no data.

Paper on "Application of High–Opacity Precipitated Calcium Carbonate", June D. Passaretti, et al.; vol. 76, No. 12, Tappi Journal, pp. 135–140, Dec. 1993.

Phamplet "Albafil", Specialty Minerals, Inc. 1994, no month.

Paper on "Calcium Carbonate", Ian C., Macgugan, Handbook of Pulp and Paper Technology, Kenneth W. Britt, 1970, pp. 627–630, no month.

* cited by examiner

Scalenohedral PCC

Rhombohedral PCC, Aspect Ratio ~1:1

Rhombohedral PCC, Aspect Ratio ~1:1.5

"Stacked" Rhombohedral Crystal Structure

Aragonite Crystal Structure

Standard Reaction Conditions

S.E.M. of the Calcium Silicate Hydrate Product, Magnified 7500x

S.E.M of Calcium Silicate Hydrate Complex, Magnified 1500x

S.E.M. of 5XPC 27, Magnified at 10000x

S.E.M. of 5XPC 27, Magnified at 2000x

Effect of Pressure on Reaction Rate

FIG. 14 Effect of Carbonation Reaction Pressure on Surface Area
T=100°F, %CO$_2$ = 20%

Reaction Rate vs. Temperature
%CO$_2$ = 20%

Effect of Temperature on Reaction Rate

Effect of Temperature on Carbonation Efficiency

Effect of $CO_2$ Concentration on Reaction Rate

Effect of $CO_2$ Concentration on Carbonation Efficiency

Effect of $CO_2$ Concentration on Surface Area

Effect of CO₂ Flow Rate on Reaction Rate

Effect of CO₂ Flow Rate on Carbonation Efficiency

Effect of $CO_2$ Flow Rate on Pigment Brightness

Effect of CO₂ Flow Rate on Carbonation Time

S.E.M. of SPC 118, Magnified 7,000x

Effect of Calcium Hydroxide Concentration on Reaction Rate

Effect of Calcium Hydroxide Concentration on Carbonation Efficiency

Effect of Calcium Hydroxide Concentration on Surface Area

Effect of Agitator Rotation on Reaction Rate

Effect of Agitator Rotation on Carbonation Efficiency

Effect of Agitator Rotation on Surface Area

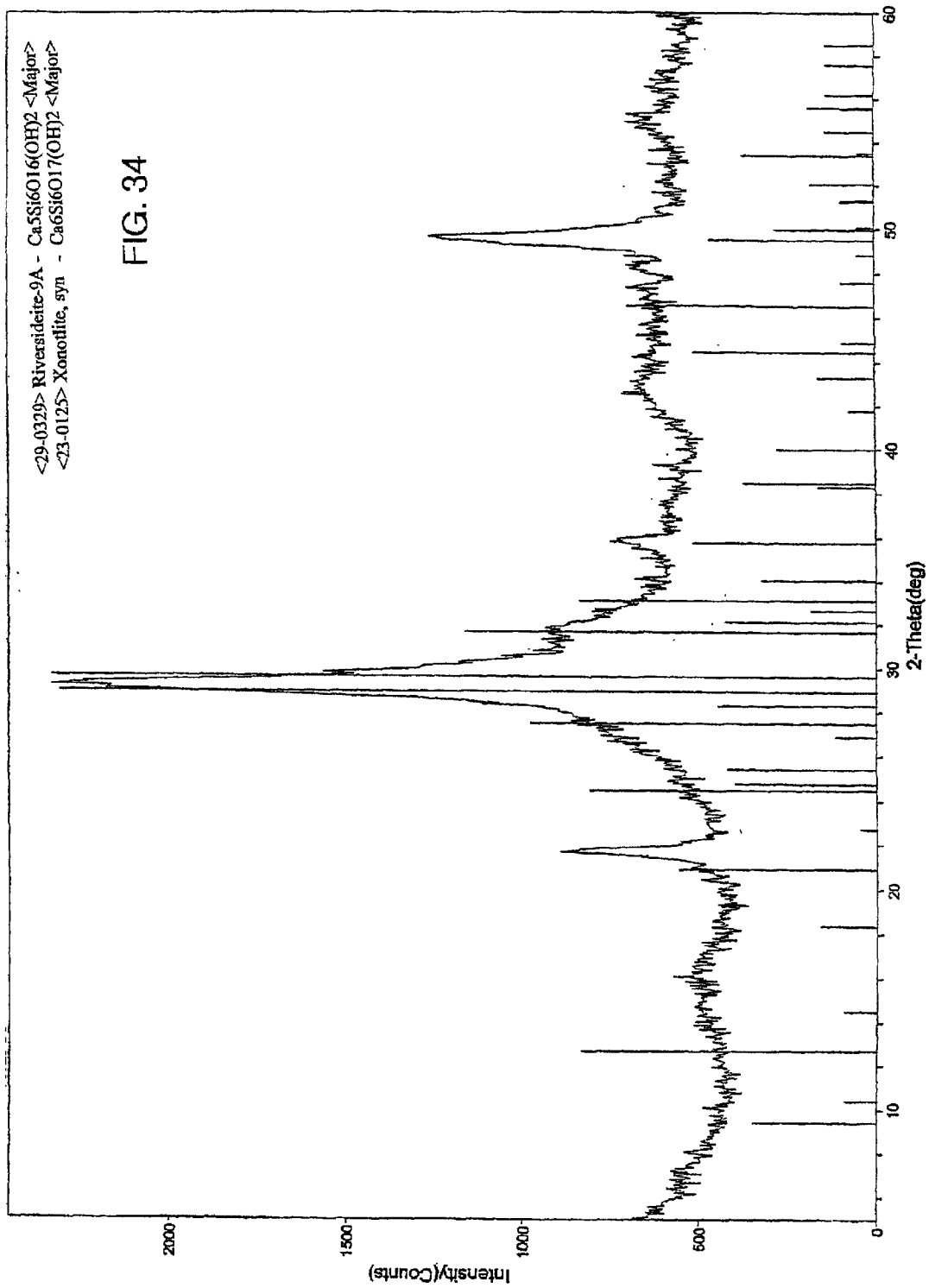

METHOD AND APPARATUS FOR PRODUCTION OF PRECIPITATED CALCIUM CARBONATE AND SILICATE COMPOUNDS IN COMMON PROCESS EQUIPMENT

This application claims benefit of 60/265,657 filed Jan. 31, 2001.

TECHNICAL FIELD

This invention relates to the production of precipitated calcium carbonate and to hydrothermal manufacture of calcium silicate hydrates.

BACKGROUND

The new "internet" economy has created a need for better appearing and for higher performance papers. Desirable aesthetic qualities require papers to be brighter, more opaque, and to have a smoother printing surface. Better qualities of these properties are useful to accommodate increasingly important uses of papers, such as ink jet printing and desktop publishing. And, higher performance requirements are sought in industrial papers like paper board and packaging (used to ship items ordered via the internet) which paper types require components with very high mechanical strength. At the same time, escalating shipping and postal costs mean that users would also benefit from lighter weight papers. In other words, it would be desirable to provide industrial paper with higher mechanical strength, higher brightness, higher opacity, yet still having improved printability, weigh less, and made at a lower basis weight. With paper fillers and paper manufacturing techniques known or practiced heretofore, the juxtaposition of these requirements has not been feasible.

Presently, the paper industry adds filler to paper in order to improve some of the key performance attributes. However, nearly all of the paper fillers currently available have some drawbacks associated with their use. For example, the best known filler for improving the optical properties of paper is titanium dioxide ($TiO_2$). Although it can be used to dramatically improve the optical properties of paper, unfortunately, $TiO_2$ has some major disadvantages. First, it is very expensive, on the order of about US$2,000 per ton at time of filing of this patent application. Second, it is highly abrasive to processing machinery. Third, it is usually shipped in a slurry form, which requires dispersant additives to prevent settling; that both adds cost and creates paper machine runnability issues. Finally, $TiO_2$ must be produced off-site, remotely from the paper mill, shipped to customers, thus adding a large transportation cost.

Other fillers, like silica and calcium silicate, are sometimes used to improve sheet bulk, print quality, and other paper properties. Here again, one of the major disadvantages to these products is that they reduce sheet strength and are expensive (silica at about US$3,000 to about US$4,000 per ton, and calcium silicate at about US$800 to about US$1,000 per ton at time of filing this patent application). These products, like $TiO_2$, are also typically produced off-site, and carry a large transportation cost.

In an effort to reduce production costs, the industry is increasingly switching to commodity fillers such as ground or precipitated calcium carbonate. Precipitated calcium carbonate is perhaps best suited for improving the optical and print qualities of paper. It can also be produced on-site (at a paper mill), thus reducing or eliminating transportation costs. Unfortunately, calcium carbonate is not as effective as $TiO_2$ or silica based fillers. Moreover, it significantly reduces the strength performance of paper, in addition to causing undesirable dusting.

Importantly, it must also be appreciated that the conventional process for the manufacture of PCC also has several limitations. First, the reaction takes place at atmospheric pressure in an "open" vessel, using a batch process technique. Such processes also require a high $CO_2$ concentration (15%–20% by volume) in a combustion gas waste stream, and require a long reaction time (often from about 180 to about 200 minutes) to achieve the formation of the desired carbonate species. Conventional PCC manufacturing also requires large size reactors, (about 200 USgal/ton/day of PCC capacity). Additionally, a large building is required to house such PCC reactors, and consequently, a large sized site is a requirement for such a reactor building. Resultantly, capital for the building, equipment, and construction is significant.

In view of the above, there is a definite and as yet unmet need in the paper industry for a high performance specialty filler manufacturing process, especially for such a process that can produce important commodity fillers like PCC. Moreover, it would be desirable for such a high performance process to be technologically superior, i.e., produce better quality filler products at lower costs than are presently available.

Also, it would be desirable to find a new, high performance specialty filler that would, among other things, improve the aesthetic properties of paper (brightness, opacity, smoothness, print quality, etc.) as well as, and at the same time, and the mechanical properties of paper, (bulk, stiffness, etc.), without decreasing any strength properties. Even more desirably, such a filler would be available for supply as a slurry that is free of dispersant. Finally, it would be desirable that such a high performance filler be available from an on-site production facility, in order to eliminate transportation costs for the finished filler.

With regard to the production of precipitated calcium carbonate, it would also be desirable to provide improvements over conventional batch process so as to reduce or eliminate certain current limitations. For example, in an ideal situation, it would be desirable to produce precipitated calcium carbonate using very low concentration $CO_2$ (as low as about 5.0% $CO_2$ by volume, or less), while nonetheless significantly increasing the reaction rate, in order to reduce the size of reactors required from the current 200 gal/ton/day by at least half, and more preferably, by at least one fourth, i.e, to as low as about 50 gal/ton/day or less reactor size. Moreover, it would be desirable to reduce required building size, and thus reduce both process equipment costs and overall capital costs for such plants.

Finally, it would be highly desirable to develop a new method and apparatus that, with common capital equipment, was capable of both the production of the above mentioned high performance specialty filler as well as the production of precipitated calcium carbonate.

OBJECTS, ADVANTAGES, AND NOVEL FEATURES

Thus, a primary objective of the present invention is:
To provide a method and apparatus, including equipment design, and process equipment configuration that produces both precipitated calcium carbonate and calcium silicate hydrates from common process equipment;

Other objectives of this invention, with respect to the production of calcium carbonate, include the ability to provide a process plant that can:

(a) manufacture precipitated calcium carbonate while conducting the carbonation step under superatmospheric pressure in closed reactor;

(b) reduce the manufacturing time, per batch of precipitated calcium carbonate, by increasing the reaction rate;

(c) improve the efficiency and utilization of $CO_2$ (higher percentage of available $CO_2$ is utilized);

(d) produce precipitated calcium carbonate using low concentration $CO_2$ (as little as 5.0% $CO_2$);

(e) reduce reactor equipment size (on a gal/ton/day basis);

(f) reduce reactor building size;

(g) reduce overall capital cost (on a $/ton/day basis);

(h) provide the flexibility of manufacturing PCC in batch, or in continuous, or in semi-batch processes;

(i) provide the ability to produce PCC of different crystal morphologies, including scalenohedral, rhombohedral, aragonite, and some special products like "stacked" PCC;

(j) be easily reconfigured to operate under alternate process conditions to produce calcium silicate fillers in the same process plant;

(k) provide a PCC product that can be utilized in paper to improve brightness, opacity, and bulk.

Additional objectives of this invention, with respect to calcium silicate hydrate include the ability to provide a process plant that can:

(a) manufacture multiphase calcium silicate hydrates (in composition of matter), employing sequential hydrothermal reactions;

(b) manufacture multiphase calcium silicate hydrates at the end-user's plant location (on-site);

(c) be easily and quickly configured to alternately produce, in the same process equipment, precipitated calcium carbonates;

(d) utilize slaking equipment and processes to prepare lime slurry for the manufacture of both multiphase calcium silicate hydrates and precipitated calcium carbonate;

(e) provide multiphase calcium silicate hydrates which have a fibrous primary structure;

(f) provide multiphase calcium silicate hydrates with fine, fibrous, primary particles (0.1–0.5 microns in diameter);

(g) provides a multiphase calcium silicate hydrates where the fibrous primary structure is interlocked into a "Haystack" type secondary structure;

(h) provide multiphase calcium silicate hydrates with a particle size ranging from 5–50 microns;

(i) produce multiphase calcium silicate hydrates having high brightness values;

(j) produce multiphase calcium silicate hydrates having high scattering coefficient values;

(k) produce multiphase calcium silicate hydrates having high water absorption values;

(l) produce multiphase calcium silicate hydrates having a low density;

(m) produce multiphase calcium silicate hydrates having low air permeability values;

(n) produce multiphase calcium silicate hydrates which, when used in the manufacture of paper will:

Improve opacity over precipitated calcium carbonates;

Improve scattering power over precipitated calcium carbonates;

Improve brightness over precipitated calcium carbonates;

Improve sheet caliper over precipitated calcium carbonates;

Improve sheet bulk over precipitated calcium carbonates;

Improve sheet stiffness over precipitated calcium carbonates;

Improve sheet porosity over precipitated calcium carbonates;

Improve surface smoothness over precipitated calcium carbonates;

Improve sheet tensile over precipitated calcium carbonates;

Improve sheet formation over precipitated calcium carbonates;

Improve the intrinsic sheet water and oil absorption over precipitated calcium carbonates;

Improve print quality over paper filled with precipitated calcium carbonates;

Reduce print show through over paper filled with precipitated calcium carbonates;

(o) produce a product that is chemically compatible with precipitated calcium carbonates;

(p) produce multiphase calcium silicate hydrates, which can act as an extender for $TiO_2$ when used in the manufacture of paper;

(q) produce multiphase calcium silicate hydrates, which can act as an extender or replacement for expensive silica, fiber, etc. when used in the manufacture of paper.

BRIEF DESCRIPTION OF THE DRAWING

FIG. 34 is a graphical depiction of the peaks found through the x-ray diffraction (XRC), at angle 2θ, of the calcium silicate hydrate of the present invention, termed StiSil™ brand calcium silicate (5XPC 27).

DETAILED DESCRIPTION

Figure 1:
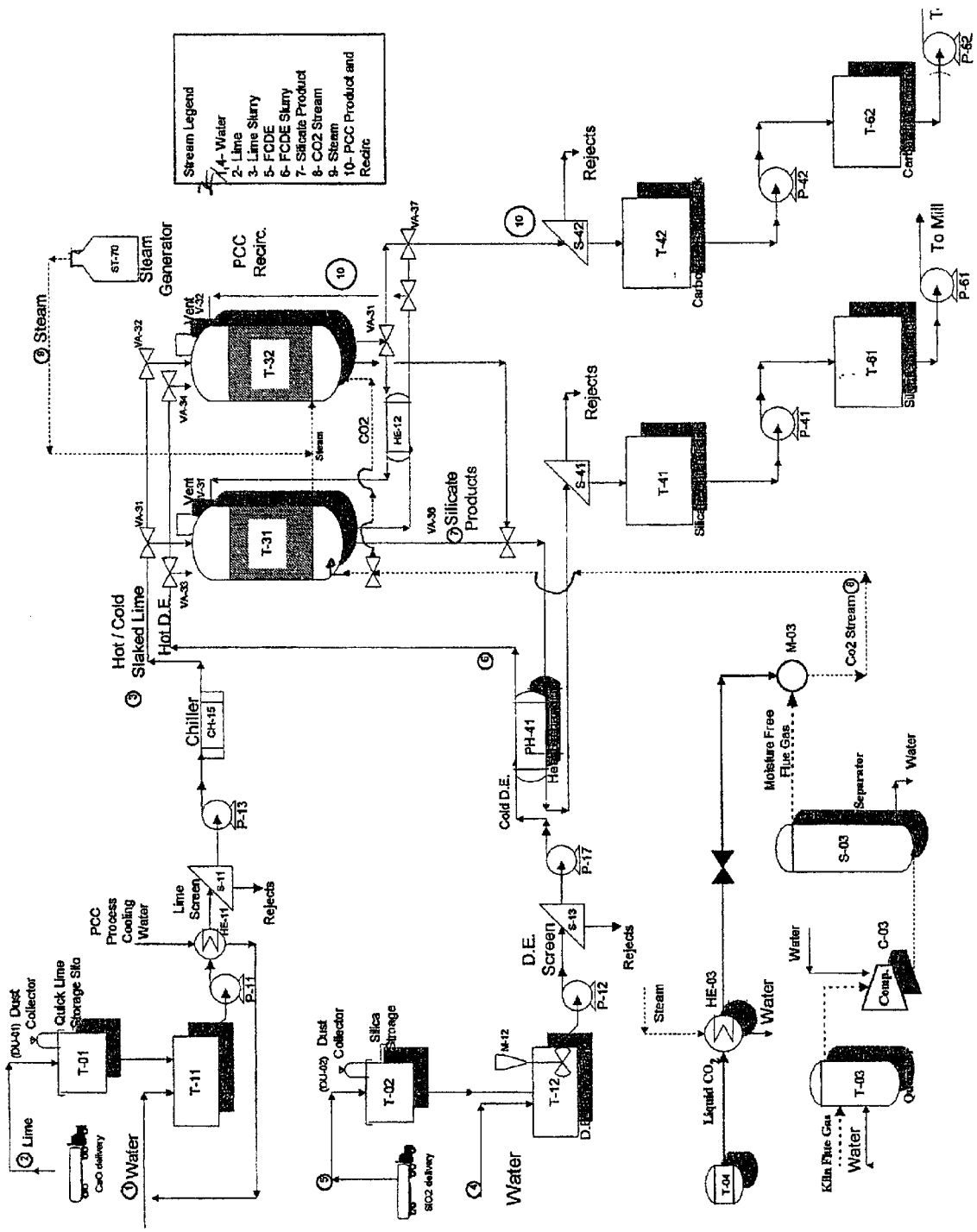
FIG. 1 is a process flow diagram showing one convenient arrangement of a "hybrid" plant for production of both calcium carbonate and calcium silicate, (including, but not limited to, slaking equipment, screening equipment, storage equipment, and reactor vessels) capable of producing either precipitated calcium carbonate and calcium silicate hydrates interchangeably and incorporating the novel process of pressure carbonation for the manufacture of precipitated calcium carbonate and sequential hydrothermal reactions between a lime slurry and a silica slurry, producing multiphase calcium silicate hydrates, according to the processes of the present invention.

In the design of a process plant configured to manufacture both precipitated calcium carbonate (PCC) and calcium silicate hydrate (CSH) in common equipment, it is important to understand the process variables in both the PCC manufacture process and the CSH manufacture process. An process flow diagram of our hybrid plant for the production of both PCC and CSH is shown in FIG. 1.

Calcium Carbonate (PCC)—Detailed Description of the Process Variables

The basic chemistry for producing calcium carbonates is well known, and the basic steps of calcination, slaking, and carbonation, were noted above. The following chemical reactions describe such basic steps:

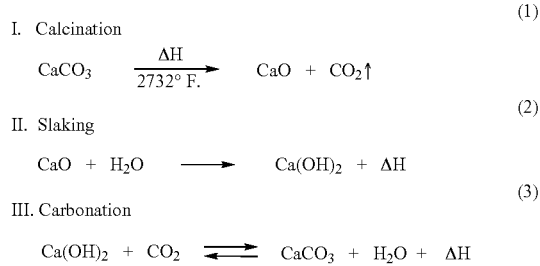

The conventional industrial process for production of precipitated calcium carbonate is performed by providing a slurry of approximately 200 g/L of calcium hydroxide in an atmospheric pressure reactor, and then bubbling a gas stream containing carbon dioxide at about 15–20% by volume into the reactor. In commercially employed PCC production processes, reaction rates in the range of from about 0.5 grams per liter of calcium hydroxide per minute to about 1.5 grams per liter of calcium hydroxide per minute are commonly employed. Thus, in prior art PCC batch production processes, the time required to complete the carbonation reaction is from approximately 120 to approximately 240 minutes. That relatively slow overall reaction rate results in a requirement for large carbonation reactors (reactors in the 18,000 to 20,000 gallon range are common), with the associated high capital costs.

The invention of high speed manufacturing of PCC is based on the ionic reactions involved in the manufacturing process as described below:

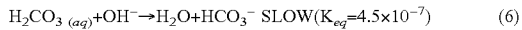

The dissolution of $Ca(OH)_2$ slurry into calcium ions is a slow process. The solubility of lime in water is inversely affected by the temperature of the slurry. For example, the solubility of pure CaO at 32° F. is 0.14% and at 212° F., it drops to 0.05%. The dissolution of $CO_2$ into water to give carbonic acid (equation 5) is fast, but the subsequent ionic reactions with hydroxyl ions to produce carbonate ions ($CO_3^=$) are slow (equations 6 and 7). The formation of calcium carbonate takes place via the following ionic reaction:

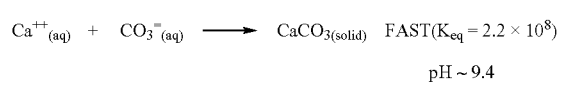

In summary, the rate controlling unit operations in the manufacture of PCC are 1) mass transfer of $CO_2$ into water and 2) the dissolution of $Ca^{++}$ ion from the $Ca(OH)_2$ slurry.

In part, the present invention includes a process for increasing the rate of reaction by carrying out the carbonation reaction under pressure. This is accomplished in a specially designed reactor vessel, which can be operated under pressure. For the purpose of this invention, the following reaction variables, sequentially, are employed to set a desired rate of reaction, filler product morphology, shape, size, and optical properties (such as scattering power).

1) Reaction Pressure
2) Concentration of Carbon Dioxide
3) Rate of Flow of Carbon Dioxide
4) Concentration of $Ca(OH)_2$
5) Reaction Temperature
6) Rate of Agitation The present invention involves carrying out the carbonation reaction between $CO_2$ and $Ca(OH)_2$ under pressure in a carbonation reactor which is a pressure vessel. This novel process involves bubbling $CO_2$ into the $Ca(OH)_2$ slurry in reactor where the pressure can range from above atmospheric pressure to as much as about 100 psig. Preferably, the pressure in the reactor is maintained at up to about 30 psig, and more preferably, the pressure in the reactor is maintained in the range from about 15 psig to about 30 psig. Inert gas and any residual carbon dioxide not utilized (such loss is kept to an absolute minimum) in the reactor is routed via a vent line to the atmosphere.

By carrying out the carbonation reaction under pressure according to this invention, the reaction rate can be increased from the rate of about 0.5 to about 1.5 grams of calcium hydroxide per liter of slurry per minute to up to about 5 to about 15 grams of calcium hydroxide per liter of slurry per minute. Thus, a production rate increase of as much as 10 fold can be achieved. This dramatic increase in reaction rate, even when employed at moderate pressures or with lower concentrations of carbon dioxide, results in a decrease in carbonation time from the prior art range of 120 to 240 minutes per batch (when conducted at atmospheric pressure conditions) to as low as 20 to 40 minutes per batch. Importantly, the carbonation reactor can be sized less than 200 gallons capacity per ton per day of PCC output, and more preferably, less than 100 gallons capacity per ton per day, and most preferably, less than 50 gallons per ton per day of PCC output.

In the novel process, described herein, key process parameters, such as reaction temperature, carbon dioxide partial pressure, flow rate of carbon dioxide, lime slurry concentration in the carbonation reactor, agitator speed in the carbonation reactor, can be more effectively employed, in order to (a) increase the rate of carbonation reaction, (b) increase the carbonation efficiency, i.e., carbon dioxide utilization, and (c) to produce $CaCO_3$ particles of different morphology, shape, size, and size distribution.

The pressure carbonation drives the overall reaction, by improving the $CO_2$ mass transfer ($CO_3^=$ formation). The higher reaction pressure evidently also increases the solubilization of $Ca(OH)_2$ slurry into calcium ions ($Ca^{++}$). This results in a higher reaction rate, due to increased calcium ion availability, which in turn reduces the reaction time of calcium carbonate formation.

Since much higher reaction rates are achievable, for the same production rate of PCC, this novel PCC manufacturing process can be carried out using much smaller equipment and building size than used with prior art atmospheric PCC production equipment. Overall, even considering the additional equipment required in this process, such as the higher capacity gas compressor, an overall lower capital and operating cost is achievable.

Another distinct advantage of this "pressure carbonation" invention is that it increases the efficiency of $CO_2$ utilization. One of the most significant barriers to on-site PCC facilities is the large $CO_2$ requirements with the conventional process. This process, however, is capable of using carbon dioxide in concentrations as low as 5 percent by volume. Because the incoming gas stream is pressurized, and the partial pressure of carbon dioxide is increased in the aqueous solution, the pressurized carbonation reaction provides higher concentrations of $CO_3^=$ ions, since the dissolution of $CO_2$ is proportional to the partial pressure of $CO_2$. Importantly, low grade carbon dioxide containing gases (including those in the 10.0% carbon dioxide by volume range) such as are available from gas fired boilers, can be advantageously employed in on-site PCC production plants.

Even when utilizing low concentrations of $CO_2$ (i.e., less than about 20 percent by volume down to as low as 5 percent by volume, or lower), the utilization of the carbon dioxide may exceed 90%, and more preferably, exceed 95%, and most preferably, exceed 99%.

The novel pressure carbonation process described herein for the production of PCC can also produce a wide variety of crystal habits, such as scalenohedral (FIG. 2), rhombohedral (FIGS. 3 and 4), a special "Stacked" rhombohedral (FIG. 5), or aragonite (FIG. 6), in different sizes, shapes, and aspect ratios.

Finally, and very importantly, the PCC provided by the instant invention produces crystals which improve key paper properties, including porosity, density, brightness, and opacity.

Calcium Silicate Hydrate (CSH)—Detailed Description of the Process Variables

Metal Silicate Hydrates, specifically Calcium Silicate Hydrates, are generally prepared by a hydrothermal reaction between a source of alkali metal ion, in this case calcium oxide, and a source of siliceous material, preferably fluxed calcined diatomaceous earth (FCDE). Other siliceous sources may be used, including natural silica, quartz, and sodium silicate. The alkali metal ion and siliceous material are reacted under high pressure in a sealed reactor and the general chemistry of that reaction is as follows:

I. Lime Slurry Formation $$CaO + H_2O \rightarrow Ca(OH)_2 \quad (9)$$

$$Ca(OH)_2 \rightarrow Ca^{++} + 2(OH)^- \quad (10)$$

II. Silica Slurry Formation $$(SiO_2)_n + 2nH_2O \rightarrow nSi(OH)_4 \quad (11)$$

III. Hydrothermal Reaction $$x[Ca^{++} + 2(OH)^-] + y[Si(OH)_4] \rightarrow (CaO)_x(SiO_2)_y \cdot (x+y)H_2O \quad (12)$$

where x=1 to 6
y=1 to 6

In the actual manufacturing process, the steps described below are generally taken.

Lime Slurry Formation

Lime slurry is prepared according to the slaking process previously described above, with one exception. Here, the lime slurry is not cooled. Instead, the hot lime slurry (approximately 200° F.) is screened and transferred directly to a high pressure vessel. It should be noted that the solubility of calcium hydroxide is very low in water and is inversely proportional to the temperature of that water. For example, the concentration of CaO, in pure water, at 32° F. is reported to be 0.14%. When the temperature of the water rises to boiling, 212° F., the solubility of the lime falls to 0.05%.

Siliceous Slurry Formation

Various siliceous materials such as quartz, water glass, clay, pure silica, natural silica (sand), diatomaceous earth, fluxed calcined diatomaceous earth, or any combination thereof can be used as a source of siliceous material. An ultra fine grade of fluxed calcined diatomaceous earth (FCDE) was taken and made into a slurry of ~1.22 lbs/gallon water. An aqueous slurry of siliceous material at a concentration of from about 1 to about 1.5 pounds of silica per gallon of slurry can be used. The slurry was then preheated to near boiling. The solubility of silica/quartz, unlike that of $Ca(OH)_2$, is directly proportional to temperature. For example, quartz is only slightly soluble up to 212° F. From 212° F. to 266° F., it starts solubilizing, and around 518° F. (270° C.), it reaches its maximum solubility of ~0.07%. The dissolution of silicas can be represented as per the reaction described in equation 11. The solubility of silica can be increased by raising pH and by using various additives (i.e. sodium hydroxide). In addition silica solubility is also a function of particle size, thus the reason for using ultra fine fluxed calcined diatomaceous earth (FCDE).

Hydro-Thermally Reacting the Two Slurries

First, the amount of CaO in the lime slurry and the amount of $SiO_2$ in the diatomaceous earth slurry were adjusted to give a predetermined $CaO/SiO_2$ mol ratio. Second, the concentration of the two slurries (CaO and $SiO_2$) and the final concentration of the mixture were adjusted so as to have a final concentration in the autoclave between 0.2 and 1.0 lbs/gallon.

The reaction itself was carried out in a pressurized vessel, with three major steps:

1) Heating the slurry to the desired temperature (e.g. 356° F. to 572° F.)
2) Reacting at temperature for a specified time (e.g. 60 min to 240 min)
3) Stopping the reaction and cooling down (e.g. 25 min to 30 min)

Figure 7:
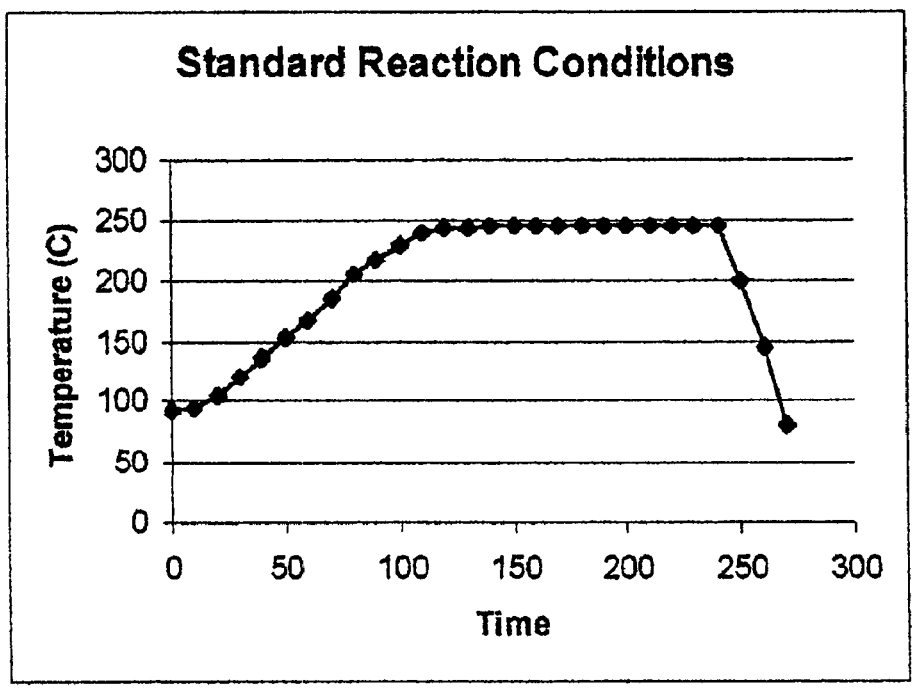
FIG. 7 is a graphical representation of the typical heat up/cool down cycle performed in the 5-liter reactor vessel, used in process of the present invention.

The autoclave was cooled down by passing quenching water through an internal cooling coil or an external jacketed cooling system. The cool down process took approximately 30–60 minutes to drop in temperature from 446° F. (230° C.) to 176° F. (80° C.), see FIG. 7.

The steps mentioned above are very important for this process. Thus, recognition of the inverse solubilities of lime and silica with respect to temperature and time have been utilized in an effort to produce the desired composition and various forms (mixtures) of calcium silicate hydrate material. Without limiting the invention to any theory, it can be postulated that the following reaction occurs during the hydrothermal reaction between calcious material and siliceous material.

The solid $Ca(OH)_2$ particles react with $SiO_2$ in the gel phase to give a calcium silicate hydroxide whose crystallochemical structure can be written as $Ca_6Si_6O_{17}(OH)_2$ (Xenotolite). As the temperature is further raised from 356° F. to 482° F., calcium silicate hydride condenses with the remaining $Ca(OH)_2$ particles to give yet another calcium silicate hydroxide, this time with a distinct X-ray diffraction pattern and a crystallochemical formula of $Ca_4(SiO_3)_3(OH)_2$ (Foshagite).

Thus, this process can produce not only single phase, but also multiple phase calcium silicate hydrates. A wide variety of silicate hydrates can be prepared by manipulating the following process parameters:
1) Lime/Silica ratio
2) Reaction Temperature
3) Slurry Concentration
4) Reaction Time
5) Heating and Cooling Sequence By changing these variables, several different phases of calcium silicate hydroxide can be produced. Some of these phases may include:

| Formula | Morphology | X-ray Diffraction peaks at 2θ | |
|---|---|---|---|
| | | Major | Minor |
| $Ca_4(SiO_3)_3(OH)_2$ | Foshagite | d = 2.93 Å, d = 2.16 Å, | d = 4.96 Å |
| $Ca_6Si_6O_{17}(OH)_2$ | Xenotolite | d = 3.02 Å, d = 2.04 Å, | d = 8.50 Å |
| $Ca_5Si_6O_{17}(OH)_2$ | Riversideite | d = 3.055 Å, d = 3.58 Å, | d = 2.80 Å |
| $CaCO_3$ | Calcite | d = 3.04 Å | d = 2.10 Å |

The final composition may also contain minor amounts of calcite—aragonite, produced as a result of side reactions. The two main filler products provided herein include (a) varying amounts of mixtures of foshagite [$Ca_4(SiO_3)_3(OH)_2$] and xenotolite [$Ca_6Si_6O_{17}(OH)_2$] for ultra high opaque (TiSil brand calcium silicate) and (b) varying amounts of mixtures of riversidite [$Ca_5Si_6O_{17}(OH)_2$] and xenotolite [$Ca_6Si_6O_{17}(OH)_2$] for ultra high bulk (or StiSil brand calcium silicate).

X-ray Diffraction Pattern

Figure 33:
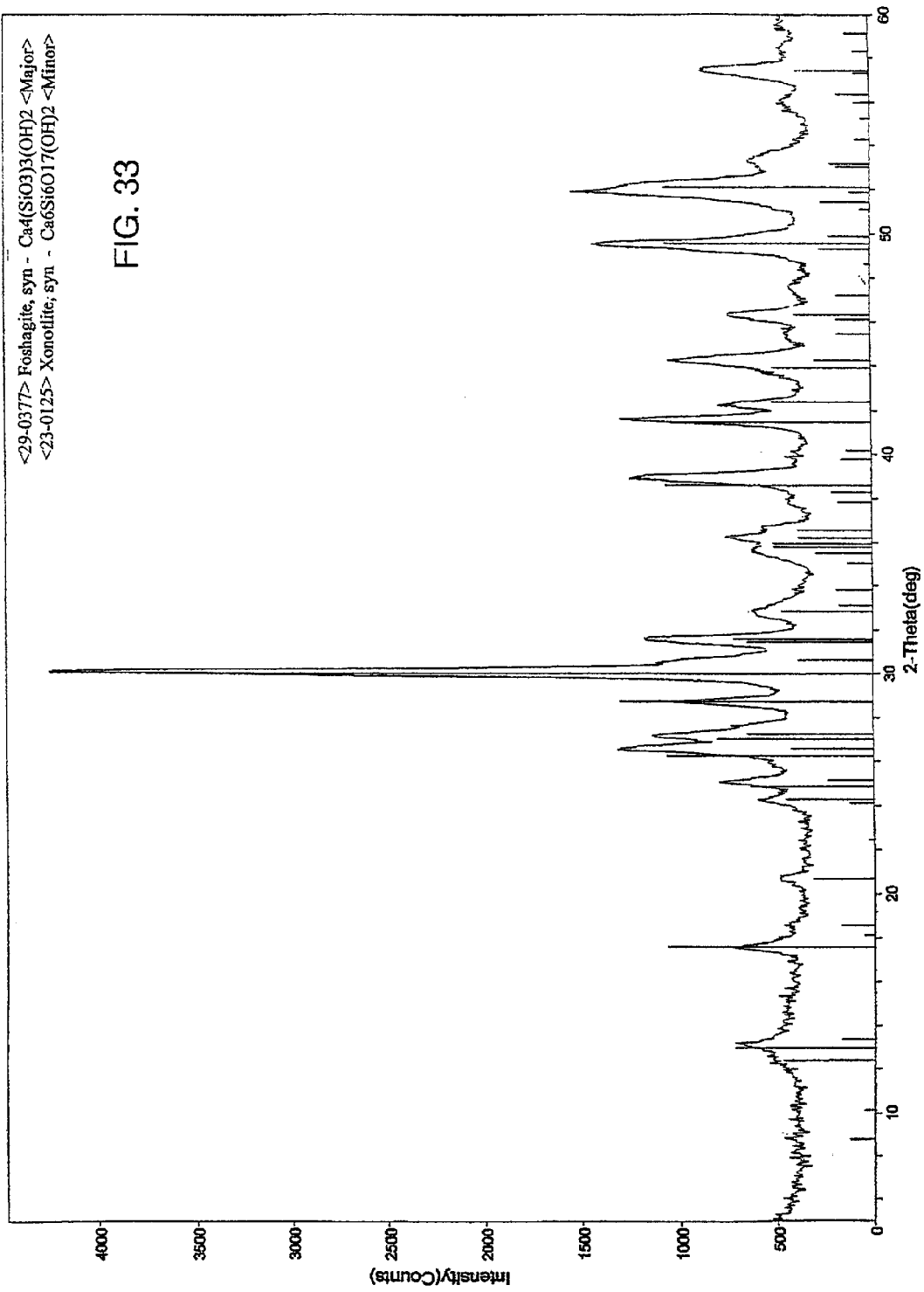
FIG. 33 is a graphical depiction of the peaks found through the x-ray diffraction (XRD), at angle 2θ, of the calcium silicate hydrate of the present invention, termed TiSil™ brand calcium silicate (5XPC 12).

A unique X-ray diffraction pattern of each of the products, TiSil™ brand calcium silicate and the StiSil™ brand calcium silicate, are given in FIGS. 33 and 34, respectively.

X-Ray Diffraction of Calcium Silicate

The crystallochemical formula of the mixture and their characteristic "d" spacing are given below:

| Foshagite (Phase I) | $Ca_4(SiO_3)_3(OH)_2$ (Major) | d = 2.97 Å, d = 2.31 Å, d = 5.05 Å |
|---|---|---|
| Xenotolite (Phase II) | $Ca_6Si_6O_{17}(OH)_2$ (Minor) | d = 3.107 Å, d = 1.75 Å, d = 3.66 Å |

Scanning Electron Micrographs, FIGS. 8 Through 11

Figure 8:
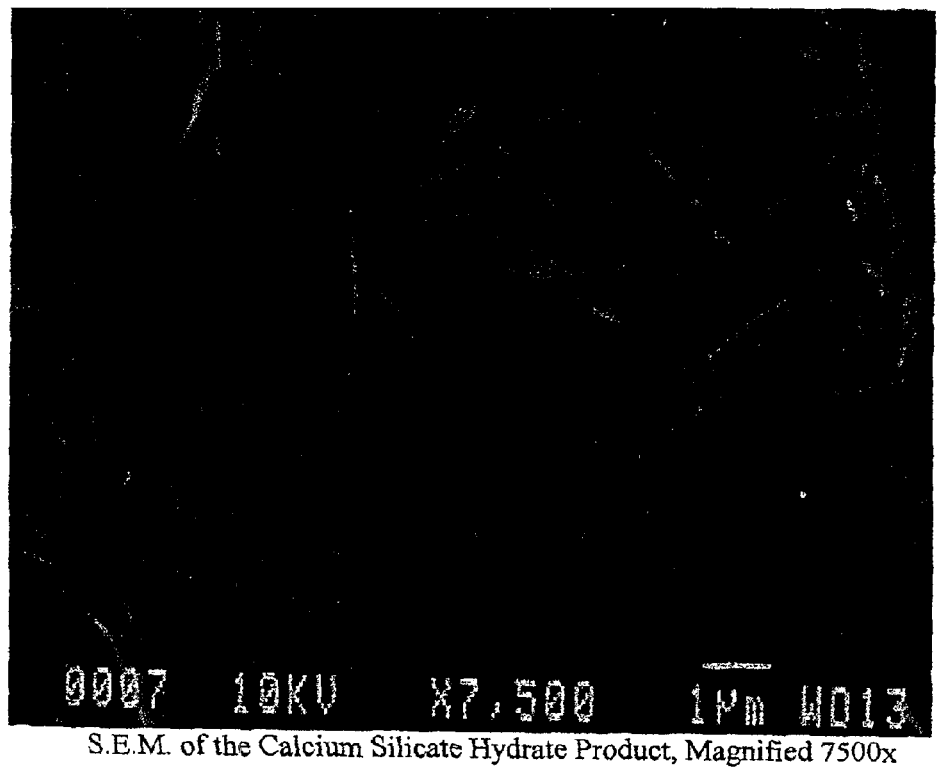
FIG. 8 is a photograph of the calcium silicate hydrate obtained in the process of the present invention, termed TiSil™ brand calcium silicate, at 7,500 times magnification; the photographs were taken with a scanning electron microscope (SEM).
Figure 9:
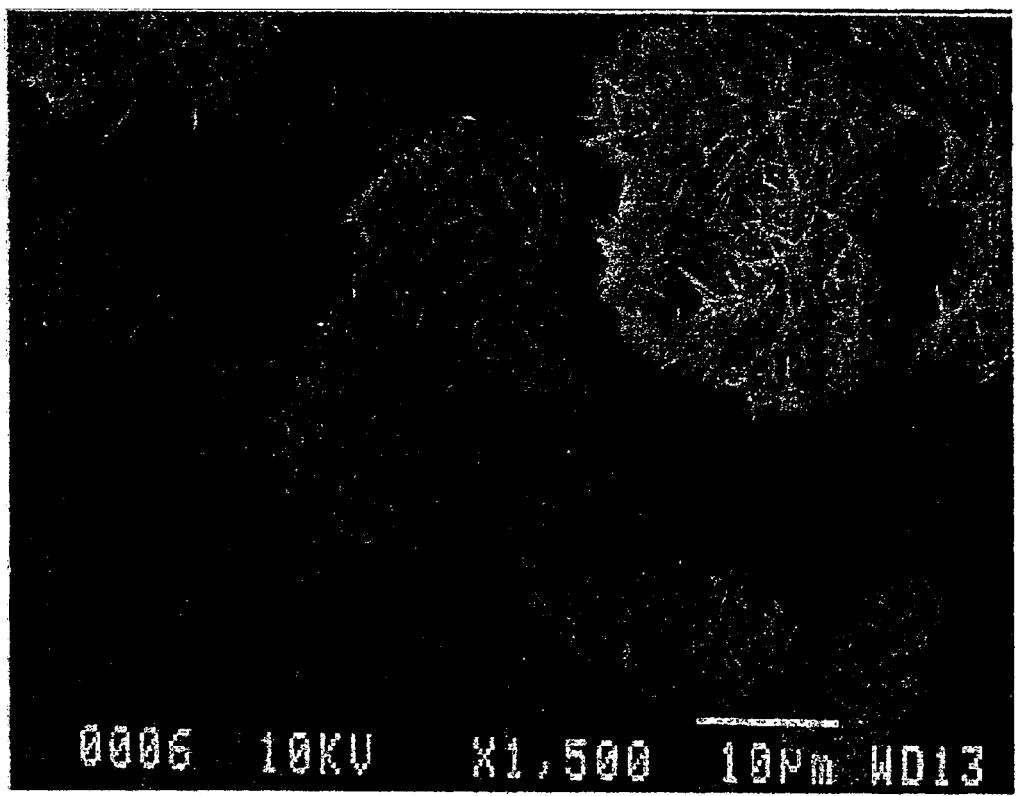
FIG. 9 is a photograph of the calcium silicate hydrate obtained in the process of the present invention, termed TiSil™ brand calcium silicate, at 1,500 times magnification; the photographs were taken with a scanning electron microscope (SEM).
Figure 10:
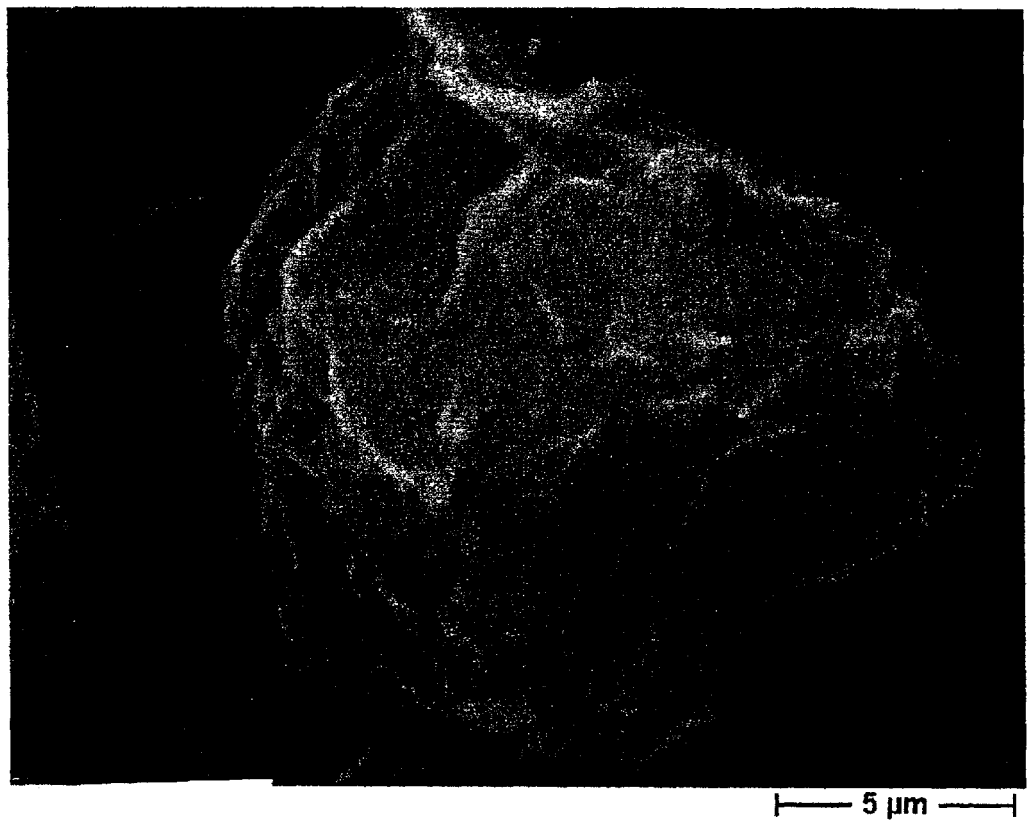
FIG. 10 is a photograph of the calcium silicate hydrate obtained in the process of the present invention, termed StiSil™ brand calcium silicate (5XPC 27), at 10,000 times magnification; the photographs were taken with a scanning electron microscope (SEM).
Figure 11:
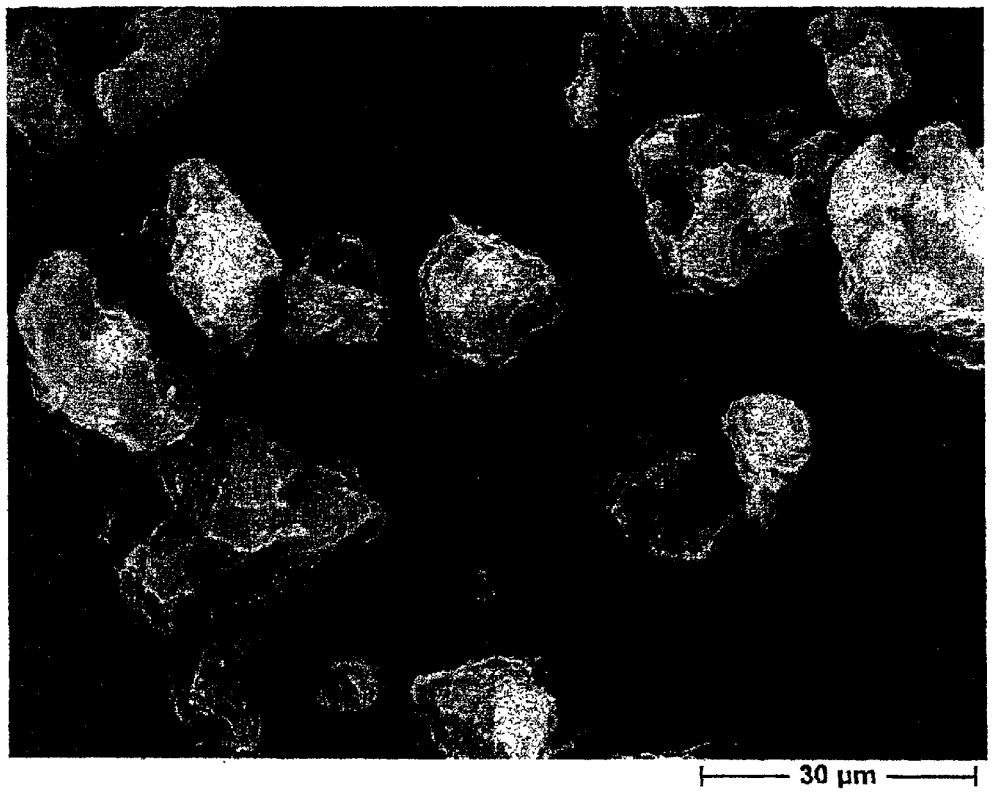
FIG. 11 is a photograph of the calcium silicate hydrate obtained in the process of the present invention, termed StiSil™ brand calcium silicate (5XPC 27), at 2,000 times magnification; the photographs were taken with a scanning electron microscope (SEM).

The scanning electron micrographs ("SEM") of the unique silica products provided, namely the ultra high opaque, TiSil™ brand calcium silicate, and ultra high bulk, StiSil™ brand calcium silicate, are given in FIGS. 8 and 9 for TiSil™ brand calcium silicate and FIGS. 10 and 11 for StiSil™ brand calcium silicate. Both high and low magnifications are provided. As the figures indicate, the products consist of primary particles and secondary particles. The primary particles of ultra high opaque, TiSil brand calcium silicate have a diameter between 0.1 and 0.3 microns and a length between 1.0 and 4.0 microns. FIG. 8 indicates that the primary particle has two phases. The first has a rod or ribbon like structure characteristic of xenotolite ($Ca_6Si_6O_{17})(OH)_2$ while the predominant structures are thin and fibrous, characteristic of foshagite ($Ca_4(SiO_3)_3(OH)_2$). The diameter of the foshagite crystals ranges from 0.1 to 0.3 microns and the length is ranges from 2.0 to 5.0 microns.

The second product or composition of matter, the ultra high bulk StiSil brand calcium silicate, as shown via SEM at 1500× magnification in FIG. 9, reveals a secondary, 3-D, structure. This 3-D structure is formed by the interlocking of the fibrous material and the continuous growth of the "gel" like material at the intersection of the individual particles. This may be the reason that the secondary structure is fairly stable. The secondary structure can generally withstand the shear forces encountered during the discharge of material from pressure vessels after the reaction has completed. The secondary structure also maintains its "bulk density" during some of the papermaking processes such as refining and calendering.

The particle size of secondary structure as measured by particle size measuring devices like the Malvern Mastersizer is in the range of 10–30 microns.

Light Scattering Properties

The refractive index of these calcium silicate particles as reported in the literature is between 146 and 159, however, these particles exhibit much higher scattering coefficients, especially the ultra high opaque TiSil brand calcium silicate, as compared to materials of similar refractive indexes.

Brightness

The calcium silicate hydroxide mixture of provided (ultra high opaque, TiSil brand calcium silicate) also has very high brightness characteristics. A comparison with other pigments is given in below in Table 1:

TABLE 1

Various pigments and their typical brightness values

| Pigment | GE (TAPPI) Brightness (%) |
|---|---|
| Calcium Silicate Hydrate (TiSil) | 95–97 |
| Calcined (High Brightness) Clay | 89–91 |
| Filler Clay | 85–88 |
| Calcium Carbonate | 96 ± 1 |

Water Absorption

One of the most significant characteristics of the multiphase calcium silicate hydrates provided and described herein is the ability of these multiphase calcium silicate hydrates to absorb large amounts of water. These calcium silicate hydrates can adsorb anywhere from 350% to 1000% of their weight. This high water absorption capacity makes the pigment extremely well suited for preventing ink strike through in writing and printing papers, newsprint and more.

Pigment Bulk Density

Both of the calcium silicate hydrates are characterized by having very low bulk density values (10–15 lb/ft³). An indication of bulk density is given by the weight of material occupying a fixed volume in a special cell (as measured by Blaine Method for Surface Area determination).

Pigment Air Permeability

Despite the low bulk density, these calcium silicate hydrate products also have a low air permeability (as measured by Blaine Method for Surface Area determination).

Summary of the Invention—Process and Equipment

This patent pertains to the methods, process conditions, and equipment required for the high speed manufacture of precipitated calcium carbonate (PCC) and the production of calcium silicate hydrate (CSH), having a novel structure and composition of matter, employing common manufacturing equipment.

Principal raw materials are:
1) Quicklime
2) Silica Source (For this invention, fluxed calcined, diatomaceous earth was used)
3) $CO_2$ (either liquid, gaseous, or from flue gas)
4) Steam (High pressure steam from about 50 to about 600 psig for heating)

The following is the manufacturing process common for both precipitated calcium carbonate and calcium silicate hydrates (CSH).

Step I—Slaking of Quicklime

The purpose of slaking is to form a lime slurry, from quicklime and water, which is capable of reacting with other chemicals. To accomplish this, quicklime and water are mixed, either in a batch or continuous process as per the methods and reactions described in equation 2.

Step II—Manufacture of High Speed Precipitated Calcium Carbonate (SPCC)

In order to form PCC, the slaked lime must be allowed to react with a $CO_2$ source. Typically, this requires the bubbling of either $CO_2$ or $CO_2$ containing flue gas through the slaked lime slurry. During that bubbling, the gaseous $CO_2$ is dissolved by the aqueous media, forming carbonic acid. The carbonic acid in an alkaline medium, disassociates into carbonic ions, which react with hydroxyl ions to yield carbonate ions, as per the reactions described in equations 5, 6, and 7. During the carbonation process, the carbonate ions react with the already present calcium ions to form calcium carbonate, as per the reaction described in equation 8.

In the novel process of manufacturing precipitated calcium carbonate via "pressure carbonation," the rate of dissolution of $CO_2$ into water is increased considerably by carrying out the reaction under "pressure," in pressurized reactors. In addition to increasing the rate of reaction, the use of a pressurized reaction vessel also raises the efficiency of $CO_2$ utilization and thus, the carbonation efficiency of the reaction. The super atmospheric pressure may also increase the availability of $Ca^{++}$ ions.

Manufacture of Calcium Silicate Hydrate (CSH)

The multi-phase calcium silicate hydrates products disclosed include at least two distinct crystallochemical phases and are produced by reacting the hot slaked lime slurry, described above, with another hot slurry of fluxed calcined diatomaceous earth (FCDE), under carefully selected conditions of high temperatures and pressures. Several different compositions of matter, structure, and key performance properties of such calcium silicate hydrates were produced by manipulating the following reaction parameters:
1) Lime to Silica Mole Ratio
2) Concentration of Lime/Silica slurry
3) Reaction Temperature
4) Reaction Pressure
5) Process Conditions
   Time to heat up to reaction temperature
   Time at reaction temperature
   Time to cool down from reaction temperature One of the factors which makes the process conditions so critical to the proper calcium silicate hydrate formation, is the inverse solubility relationship which silica shares with calcium hydroxide with respect to temperature. As silica is heated, its solubility in water increases up to a maximum of 0.07% at ~518° F. The solubility of lime, on the other hand, decreases with increasing temperature. Thus, at different times and at different temperatures, during the reaction, the available lime and silica ratios are constantly changing, which is the novelty of this process to produce the multiple phase calcium silicate hydrates. The chemical reaction is described in equations 11 and 12 above.

Without limiting this invention to any particular theory, it can be postulated that the reaction proceeds through several steps. First, the $Ca(OH)_2$ particle reacts with $SiO_2$ in the gel phase to yield a calcium silicate hydroxide having an approximate crystallochemical formula as $Ca_6SiO_6O_{17}(OH)_2$ (xenotolite). As the temperature is raised beyond 180° C. to about 250° C., calcium hydroxide condenses with the remaining $(Ca(OH)_2)$ calcium hydroxide particles to give a calcium silicate hydrate with a distinct crystallochemical formula $Ca_4(SiO_3)_3(OH)_2$ which was identified by its characteristic x-ray diffraction pattern as having a mineral name of foshagite and a unique primary fibrous structure, interlocked into a secondary haystack structure (see FIG. 9).

Process and Equipment for Manufacturing Multiple Pigments Namely Calcium Carbonate and Calcium Silicate Hydrates Lab Scale Step I—Slaking of Lime Here, approximately 30 to 300 grams of market quality, ½" rotary pebble type lime was added slowly to approximately 1.0 liter of water under constant agitation. The time taken in the slaking process was approximately 30–45 minutes. Since the slaking of lime is an exothermic process, the calcium hydroxide slurry reached a temperature of between 150° F. and 212° F. This temperature increase was dependent on the "reactivity" of the lime and the concentration of the slurry. The resulting calcium hydroxide slurry was then screened, usually through a 140 mesh standard screen.

For the manufacture of precipitated calcium carbonate, the slurry was usually cooled to a pre-selected temperature ranging from 50° F. to about 122° F. For the manufacture of calcium silicate hydrate, the slurry was used while still at an elevated temperature, in order to facilitate the hydrothermal reaction.

Step II—Preparation of Calcium Carbonate

As mentioned earlier, this step is normally carried out under atmospheric pressure in a non-pressurized, vented reactor vessel. The key feature of this process, however, is that the carbonation reaction is carried out under super-atmospheric conditions, using sealed and pressurized reactor equipment. The reactor used in the lab was a specialized, high pressure, high temperature, 2 liter reactor vessel. It was fitted with an outside jacketed heater and internal cooling coil system. The reactor was also fitted with a Rustin 200 impeller. The agitator/impeller was connected to a variable speed magnetic drive motor. Additionally, the pressure vessel was fitted with a sample/dip tube and a vent system used to maintain pressure at a desired level. The completely assembled reactor was capable of pressures up to 1000 psig. All heating and cooling processes of the reactor were controlled via an external controller (RX-330).

Carbonation Reaction Under Super-Atmospheric Pressures

The slurry, at a predetermined temperature (50° F. to approximately 122° F.), was sealed inside the reactor vessel. Then a mixture of $CO_2$ and $N_2$ was bubbled through it and the pressure was raised to a specific level between 0 and 100 psig. The ratio of $CO_2$ to $N_2$ was varied to simulate flue gasses from the lime kiln in a pulp mill (generally the main source of $CO_2$ in on-site PCC plants). The flow rate of the gas was monitored and controlled using mass flow meters. Flow rate, along with other variables such as agitation speed, reaction temperature, reaction time, and $Ca(OH)_2$ concentration were varied in an effort to meet the desired reaction rate and $CO_2$ efficiency. This in turn, produced PCC of different particle sizes (0.1 to 3.0 microns) and shapes with surface areas ranging from 20,000 $cm^2/g$ to 100,000 $cm^2/g$ (as measured by the Blaine method). It also produced different particle morphologies, such as scalenohedral, rhombohedral, etc. In the lab reaction, the $CO_2$ concentration was varied from as little as 5.0% $CO_2$ to 100% $CO_2$. The novelty of this pressure carbonation process is that it can use as little as 5.0% $CO_2$ and still produce commercially viable PCC. This is particularly advantageous for non-integrated paper mills which do not have a lime kiln producing flue gas to use as a source for 15%–20% concentration $CO_2$. This novel process also lends itself to manufacturing PCC in an integrated paper mill utilizing mechanical pulp. (The mechanical pulping process does not incorporate a lime kiln and therefore does not produce any flue gas for use as a $CO_2$ source).

The $CO_2$ flow rate was varied from 0.5 liters per minute to about 5.0 liters per minute. The starting reaction temperature ranged from 50° F. to 130° F. A higher final temperature was attained after the carbonation reaction was completed due to the exothermic nature of the carbonation reaction. The rate of agitation, which is important for mass transfer of $CO_2$, was varied from 600 rpm to 1500 rpm. Some reactions were carried out under isothermal conditions where by the excess heat of carbonation was removed be activating the cooling coils. By manipulating the above referred to reaction parameters, production of some unique PCC structures were possible, including the "stacked" crystal structure illustrated in FIG. 5. Also, production of a full range of crystal morphologies like scalenohedral, rhombohedral, and aragonite, in different sizes, shapes, and surface areas is achievable Another advantage of this pressure carbonation was that the reaction rates were increased from approximately 0.5 g/l/min to the range of about 5 to as much as 15.0 g/l/min. This enabled the reduction of the reaction time from 120 min (conventional process) to from about 20 to about 40 minutes. One of the most significant outcomes of this development is that, due to a shorter reaction time, the PCC manufacturing can be carried out in a semi-continuous or fully continuous mode. Finally, an important development provided by this disclosure is that the process and equipment design allows the same process equipment to be employed for the manufacture of both the precipitated calcium carbonate and for calcium silicate hydrate.

Step 3—Lab Preparation of Multiphase Calcium Silicate Hydrates (CSH)

Hot lime slurry from step 1 (slaking process) above, was placed in an autoclave identical to the one described in step 2 (lab preparation of calcium carbonate). The amount of lime slurry generally ranged from about 40 to about 80 grams dry weight, depending upon the desired lime/silica ratio and final slurry concentration. At the same time as the slaking was being performed, a slurry of siliceous material (i.e. $SiO_2$ slurry) was also being prepared.

To prepare the siliceous slurry, 20 to 90 grams of the silica source was added to water such that the approximate concentration was 1.2 lb/gallon. The slurry was then heated to near boiling and transferred into the autoclave with the fully "slaked" lime. The reaction vessel containing the two slurries and any other additives/catalysts were closed and heated using the electrical heaters attached to the autoclave. The heating and subsequent cooling cycle was pre-selected and was one of the determining factors in the reaction product formed.

One of the products provided was a multiphase "CSH" product with its major component being foshagite accompanied by a minor component of xenotolite. The second product of this process was a multiphase "CSH" product with its major component being riversidite. The process conditions required for the manufacture of the foshagite (fibrous, haystack structure) products were as follows:

| | |
|---|---|
| 1) Lime/Silica Mol Ratio | ~1.33–1.5 $CaO/SiO_2$ |
| 2) Slurry Concentration | ~0.5–0.75 lb/gal |
| 3) Reaction Temperature | ~446° F.–482° F. |
| 4) Reaction Pressure | ~475–500 psig |
| 5) Reaction Time | ~1.5–2.5 hours |

The process conditions for the second structure of the calcium silicate hydrate (CSH) product of the process (riversidite), were as follows:

| | |
|---|---|
| 1) Lime/Silica Mol Ratio | ~0.75–0.85 $CaO/SiO_2$ |
| 2) Lime/Silica Slurry Concentration | ~0.5–0.8 lb/gal |
| 3) Reaction Temperature | ~338° F.–392° F. |
| 4) Reaction Pressure | ~150 psig |
| 5) Reaction Time | ~1.5–2.5 hours |

After the hydrothermal reaction had reached completion, the reactor was cooled by passing quenching water through an internal cooling coil. A cooling time of about 25 to about 30 minutes was usually used to bring the reactor from its reaction temperature of 356° F. to about 482° F.

Another important aspect of this process is that the different ratios of the $Ca(OH)_2$ and silica are available in the different time and temperature zones, thus resulting in a multiphase calcium silicate hydrates. These multiphase silicates have a unique structure and represent a novel composition of matter. Importantly, these products also have the desirable characteristics of a low density, high brightness, fibrous structure and the ability to absorb large amounts of water and oil. These characteristics are especially useful in the manufacture of paper because they give paper certain companion properties hereto unattainable. For example, the foshagite/xenotolite product gives a sheet of paper higher bulk than conventional fillers (i.e. calcium carbonate) while at the same time increasing stiffness, tensile index, smoothness, porosity, and opacity.

Several other calcium silicate hydrates can easily be made by changing the lime/silica ratio, slurry concentration, reaction temperature and reaction time. The use of different additives like NaOH, sugar, and chelating compounds can also create more diversity of product.

Plant Design and Manufacturing Processes to Produce Both Precipitated Calcium Carbonate and Silicate Hydrates This section refers to the process flow diagram designated FIG. 1, which illustrates the manufacturing of precipitated calcium carbonates and multiphase calcium silicate hydrates, interchangeably, in common process equipment.

Calcium oxide, or quicklime (2), is delivered by rail car or truck to the mill site. The lime is then unloaded into a lime storage silo (T-01) via a pneumatic conveyor. A feeder transports the stored lime to the slaking tank (T-11). Water (1) is then added to the slaking tank at a controlled rate to achieve a desired final concentration. Once the slaking is complete, the hot lime slurry (3) is pumped through a high pressure pump (P-11) to a heat exchanger (HE-11) to cool down the slurry to the desired temperature for the manufacture of precipitated calcium carbonate in a carbonation reaction. The lime slurry is then screened through about a 140 mesh screen (S-11). The cool slaked lime slurry (temp 81° F. to about 120° F.) is then pumped by another high pressure pump (P-13) into a reactor (T-31 or T-32). The slurry can also be further cooled to between 50° F. and 60°

F. through the use of a chiller (CH-15) if the desired carbonation temperature needs to be in that lower range. Importantly, such a low temperature is a key requirement for the manufacture of the rhombohedral crystal structure PCC.

Another important ingredient required for the production of PCC is carbon dioxide ($CO_2$). $CO_2$ gas (8) can be obtained from taking liquid $CO_2$ from a storage tank (T-04) and steaming it through a heat exchanger (HE-03) to get gaseous $CO_2$. The $CO_2$ gas is then metered through (M-03) into the carbonation reactors T-31 and T-32. $CO_2$ gas can also be obtained from lime kiln flue gas which contains from about 15 (or less) to about 20% (or more) by volume of $CO_2$. This hot flue gas is passed through a quencher (T-03) to bring the temperature down. The now cool gas is then compressed (C-03) and passed through a water/gas separator (S-03). Once the gas is free of moisture and impurities, it can also be metered through (M-03) and bubbled into the carbonation reactors T-31 and T-32.

Carbonation Process

The key to this novel aspect of the process is the carbonation of slaked lime slurry under super atmospheric pressure. The reaction can be carried out in a batch mode or under semi- and fully-continuous conditions.

Batch Pressure Carbonation Process

Here, lime slurry is pumped into one of the reactors (T-31 or T-32) and $CO_2$ gas is bubbled through the bottom of the reactor. The reaction is carried out under pressure, ranging from 3 psig to 70 psig. Due to the high pressures, the rate of dissolution of $CO_2$ in water is increased substantially. This, in turn, increases the concentration of $CO_3^-$ ions and therefore increases the rate of the entire carbonation process (see lab scale carbonation process description above). The reaction carbonation temperature can be pre-selected depending upon the product requirements, e.g. a paper mill requests high opaque/high brightness PCC. The other process conditions like agitation and flow of $CO_2$ are also adjusted to achieve the desired PCC product. The concentration of the lime slurry can also be varied from 15 grams per liter to 300 grams per liter to get different PCC products of various shapes, sizes, and morphologies.

Continuous Carbonation Process

The reaction time for complete carbonation of slaked lime is approximately 2–2.5 hours/batch in the conventional process. The use of the pressure carbonation process allows for continuous carbonation because the process reduces the time of carbonation to between 20 and 40 minutes. Therefore, the carbonation process can be carried out in a continuous mode. To do so, the slaked lime slurry first enters from the top of one of the reactor vessels (either T-31 or T-32) and $CO_2$ is bubbled up through the bottom of the same vessel. The rate of lime slurry addition and $CO_2$ addition is then balanced such that it takes approximately 20 minutes to fill the first reactor. The partially carbonated slurry is then passed into the second reactor (either T-32 or T-31, respectively) and the carbonation process is completed in the same manner that it began in the first reactor. The final precipitated calcium carbonate is then discharged through the bottom valve (either V-32 or V-31, respectively). The completed PCC is screened through a 140 mesh screen (S-41), transferred directly to a storage tank (T-62), and is ready to be pumped to the mill site at the customer's request.

Manufacture of Calcium Silicate Hydrate

For the manufacture of calcium silicate hydrate, the main raw material, other than lime, is a silica source (5). The silica source, such as quartz, pure silica, or fluxed calcined diatomaceous earth (FCDE) is delivered in trucks or by rail to the manufacturing facility. The FCDE is stored in a silo (T-02) until it is needed, at which time, it is transferred into a slurry preparation tank (T-12). Here, a predetermined quantity of water (4) is mixed thoroughly with the FCDE through the use of a high shear mixer (M-12). The mixed slurry is then screened for impurities through a screen, preferably about 200 mesh (S-13) before being pumped (P-12) into the pressure reactor (T-31). Hot lime slurry (3) is then added. Additives as desired can also be input at this step. The hydrothermal reaction is carried out for approximately 2 to about 2.5 hours. The final product is usually a multiphase calcium silicate hydrate and is discharged through a valve (VA-36). The slurry is then passed through a heat exchanger (PH-41) to both cool the CSH product and preheat the incoming FCDE for the next batch. In this way, we are able to maximize the heat efficiency during the production process. Once cooled, the CSH slurry is screened (S-41) and placed in a batch holding tank (T-41) and then in a silicate storage tank (T-61) and from there it is pumped to the mill as necessary.

While silicate from reactor T-31 is discharged through the heat exchanger (PH-41), fresh FCDE slurry is pumped in counter current flow through the same heat exchanger (PH-41) and into the second reactor vessel (T-32). Hot slaked lime is also added to the reactor vessel (T-32), along with any additives, and the hydrothermal reactions previously carried out in reactor T-31 are now performed in T-32. Once the reactions in T-32 are complete, it is discharged and passed through the heat exchanger (PH-41) in the same manner as the previous CSH stream, except that the fresh FCDE is now used to fill reactor T-31. A summary of the timings for each stage in the cycle is shown below:

| | |
|---|---|
| Time to Fill a reactor with FCDE and lime | ~45 min |
| Time to Heat a reactor to the reaction temperature | ~60 min |
| Reaction Time at reaction temperature | ~120 min |
| Time to Discharge CSH from the reactor | ~45 min |
| Total Time required for one complete cycle | ~240 min |

Thus, the pressure reactors can be alternately filled and discharged with silicates in four hour cycles.

Experimental Apparatus

The following examples, with the exception of examples 13 and 14, were carried out in a 2-liter autoclave, capable of withstanding pressures up to 1000 psig. The autoclave was fitted with an external, electric heating jacket and internal, running water, cooling coils, both of which were controlled by an external, dedicated controller (RX-330). In addition, the contents inside the autoclave were agitated through the use of a magnetic drive motor and standard (flat blade for SPCC process, pitched blade for CSH process), dual impellers. The autoclave was also fitted with a vent, for regulating pressure, and a dip-tube, for taking samples from the autoclave under pressurized conditions. For examples 13 and 14, a 5-liter autoclave was used. Again it was fitted with an external, electric heating jacket and internal, running water, cooling coils, both controlled by an external, dedicated controller (RX-330). A magnetic drive was used in conjunction with standard, dual pitched blade impellers for agitation purposes. The 5-liter autoclave was also fitted with a vent, for pressure regulation purposes.

EXAMPLES OF PRECIPITATED CALCIUM CARBONATE USING "PRESSURE CARBONATION" PROCESS

Example 1

Figure 12:
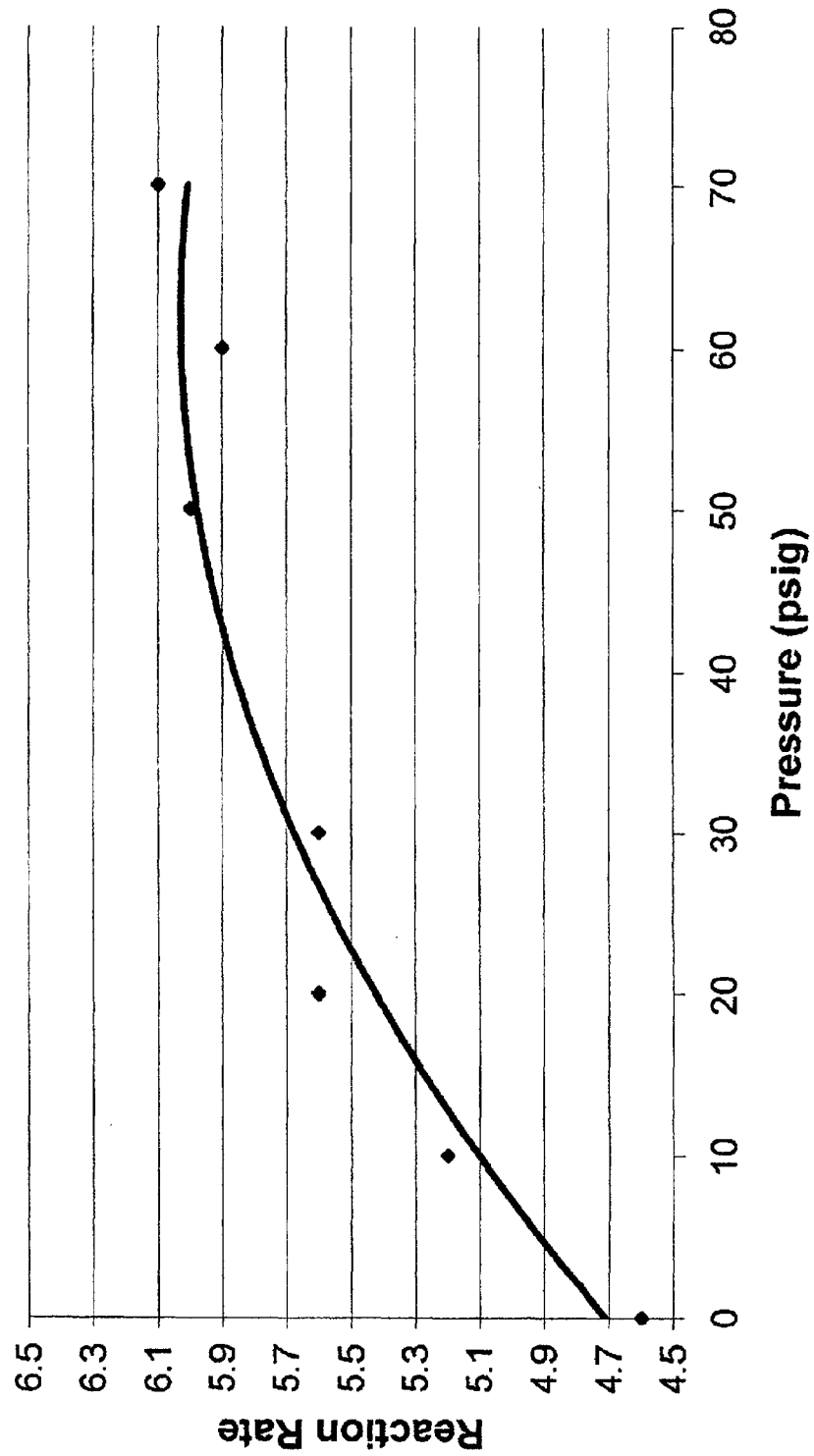
FIG. 12 is a graphical depiction of the reaction rate in grams of calcium hydroxide (expressed as calcium carbonate) per liter of slurry per minute, showing the increase in carbonation reaction rate as the pressure at which the carbonation reaction takes place is increased.
Figure 13:
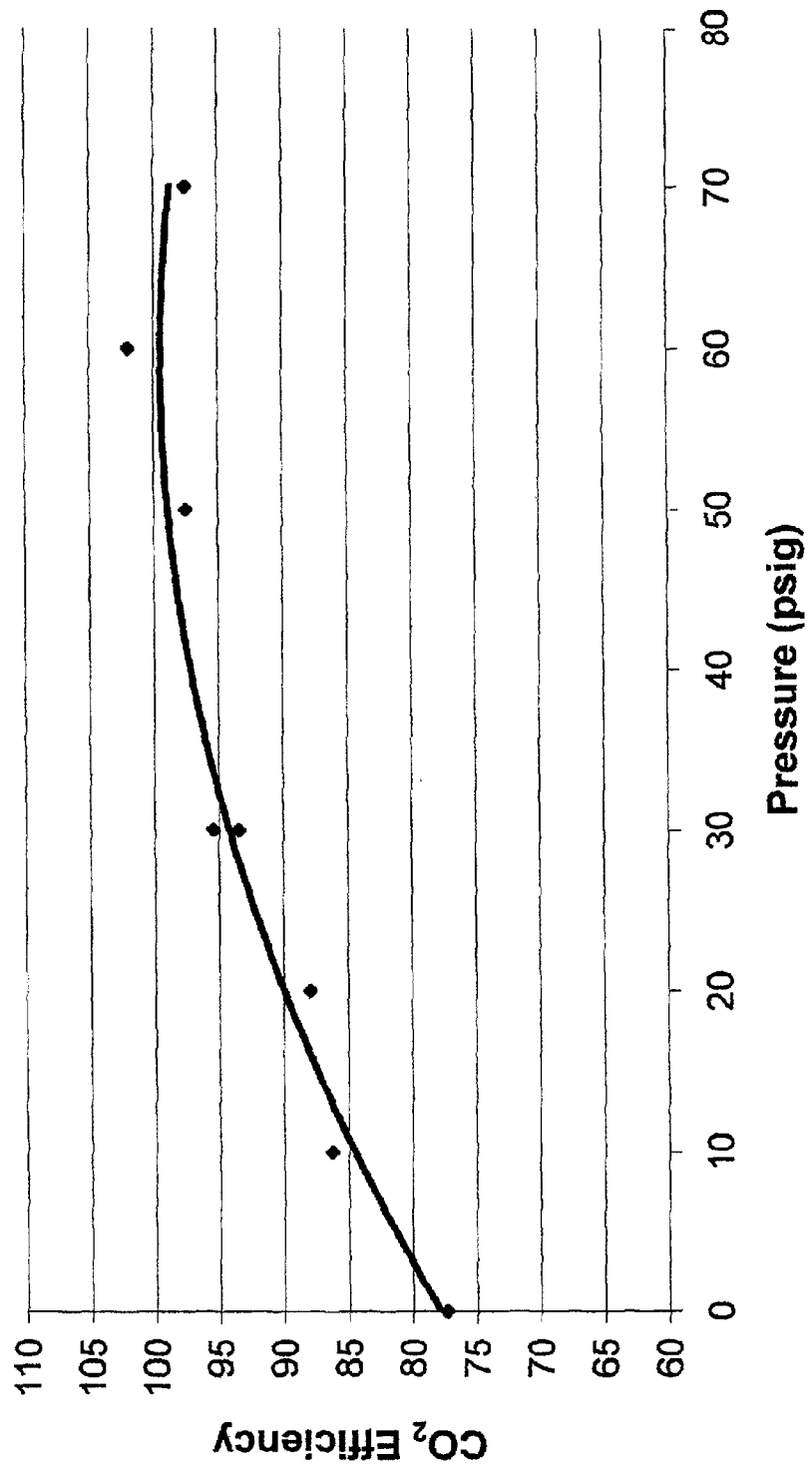
FIG. 13 is a graphical depiction of the increase in carbonation efficiency as the pressure at which the carbonation reaction takes place is increased.
Figure 14:
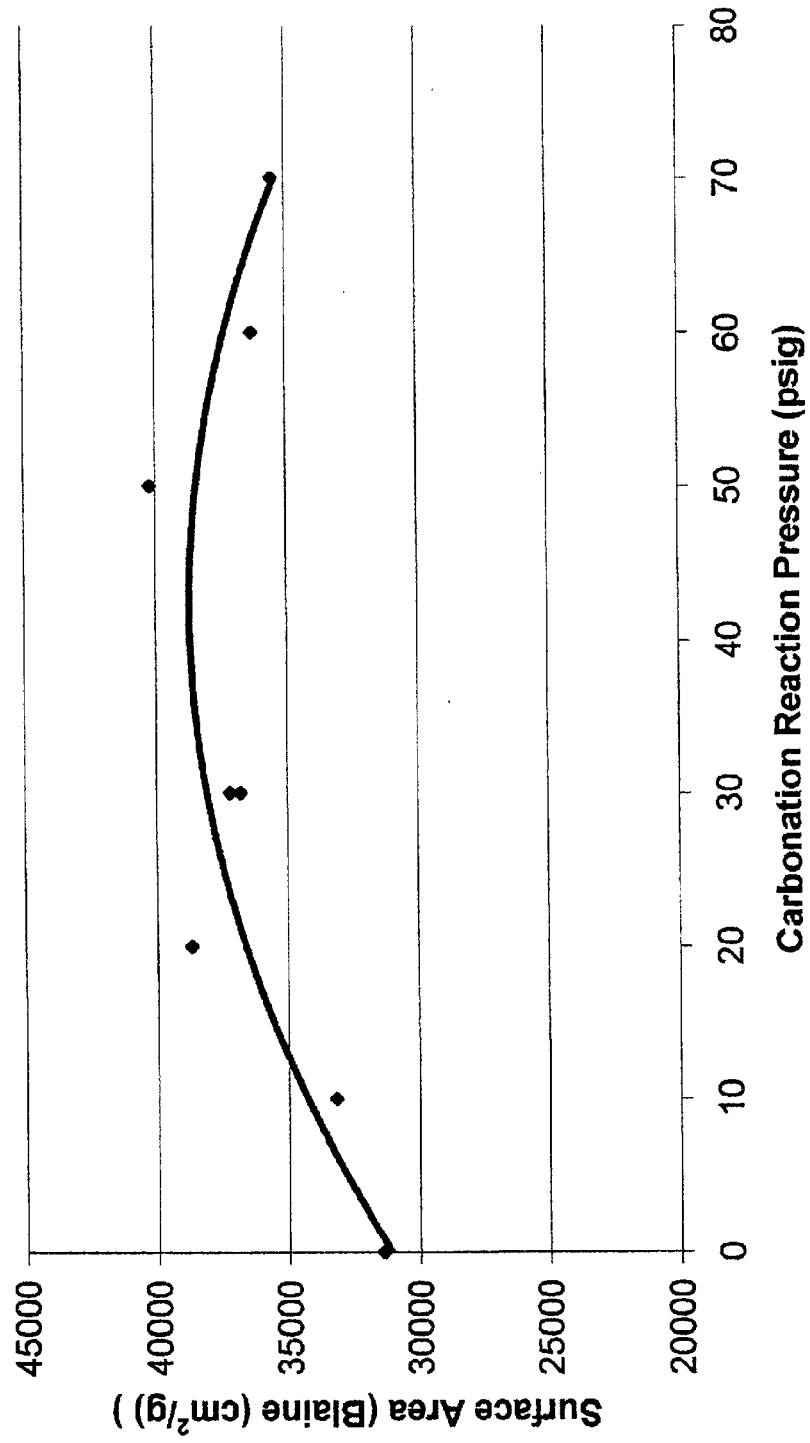
FIG. 14 is a graphical depiction of the change in surface area of precipitated calcium carbonate, showing the change as the pressure at which the carbonation reaction takes place is increased.

The Effect of Pressure in a Pressure Carbonation System on Reaction Rate, Carbonation Efficiency, and Surface Area of PCC In a series of experiments, the carbonation reaction pressure was raised from 0 psig (as done with a conventional open tank PCC system) to 70 psig. The reaction temperature was kept constant at 100° F. and the % $CO_2$ was kept constant at 20% $CO_2$/ 80% $N_2$ by volume. The resulting experimental data is given in Table 2. The resulting reaction rate at 0 psig was 4.6 grams per liter of slurry per minute. In the pressure carbonation system operating at 70 psig, it was 6.1 grams per liter per minute. The increase in reaction rate was approximately 33%. The carbonation efficiency, i.e., carbon dioxide utilization, increased from 76% to 100%. The surface area (Blaine) of the PCC produced by this process increased from 31,400 $cm^2$/gram at 0 psig, to a maximum of 40,200 $cm^2$/g at 50 psig, and then decreased slightly to 35,500 $cm^2$/g at 70 psig. See FIGS. 12, 13, and 14.

TABLE 2

Effect of Pressure on Reaction Rate, Carbonation Efficiency, and Surface Area

| Batch # | Pressure (psig) | Reaction Rate (g/L/min) | Carbonation Efficiency (%) | Surface Area ($cm^2$/g) |
|---|---|---|---|---|
| 135 | 0 | 4.6 | 77.379 | 31,400 |
| 136 | 10 | 5.2 | 86.308 | 33,200 |
| 146 | 20 | 5.6 | 88.000 | 38,700 |
| 137 | 30 | 5.6 | 93.500 | 37,200 |
| 143 | 30 | 5.6 | 95.489 | 36,800 |
| 138 | 50 | 6.0 | 97.565 | 40,200 |
| 148 | 60 | 5.9 | 102.000 | 36,300 |
| 139 | 70 | 6.1 | 97.565 | 35,500 |

Example 2

The Effect of Temperature in a "Pressure Carbonation" System

As in example 1, the slaked lime was placed into a reactor at a slurry concentration of 250 grams of calcium hydroxide per liter. The starting carbonation temperature was varied from 65° F. to 125° F. A first set of reactions was carried out under conventional atmospheric pressure or open PCC type system conditions at 0 psig. The next set of reactions was carried out under a pressure of 30 psig. A gas mixture of 20% carbon dioxide and 80% nitrogen by volume was bubbled through the reactor. The flow of carbon dioxide was at the rate of 1.5 liters per minute. The reaction rate was calculated by titrating $Ca(OH)_2$ at the beginning and end of the reaction. As the reaction proceeded, the reaction temperature increased, with the temperature starting at 100° F. and ending at 163° F. The end of the reaction was indicated when the temperature reached a maximum and then declined. The point of inflection in the temperature curve was taken as the completion point of the carbonation reaction.

Figure 15:
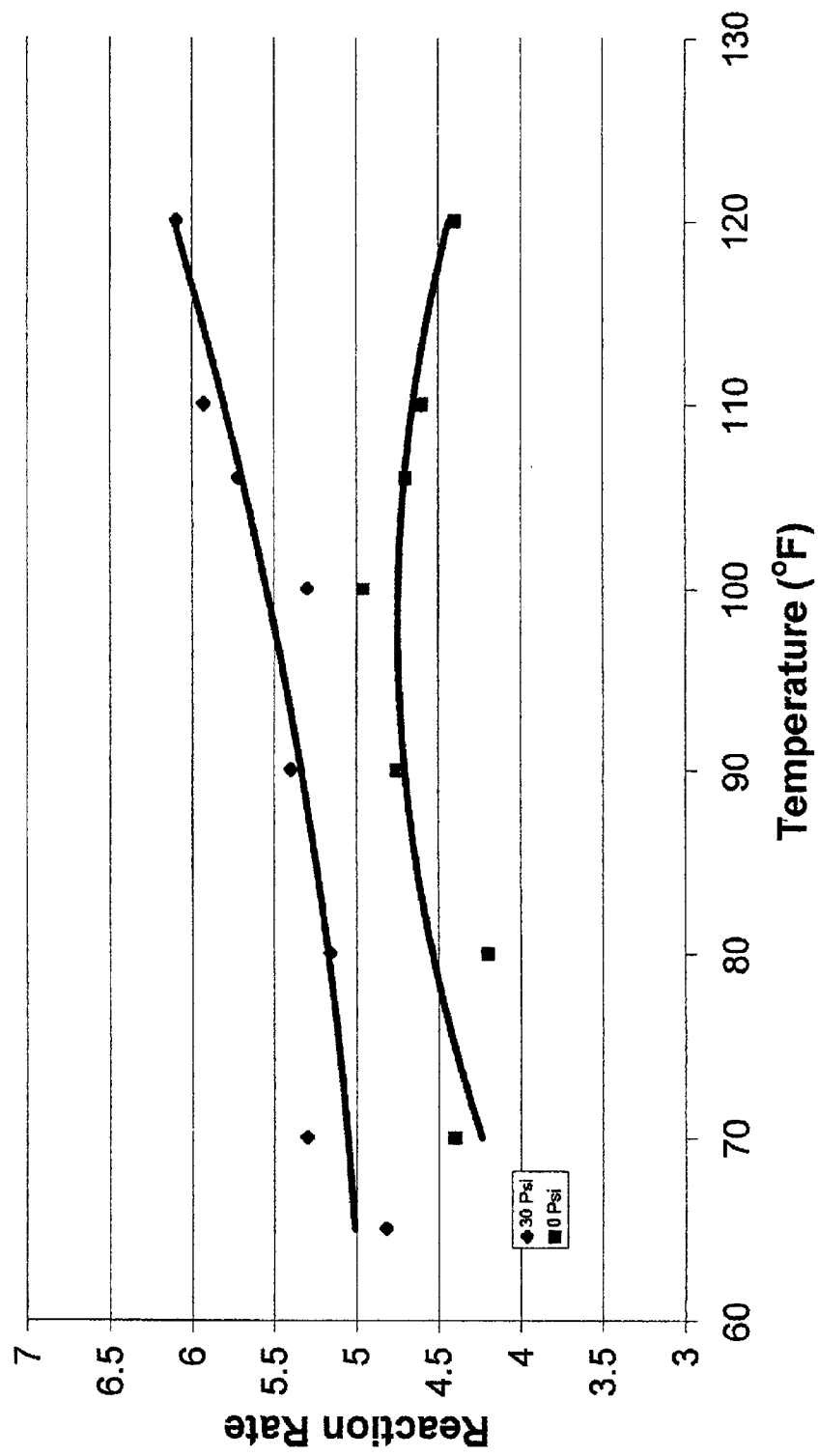
FIG. 15 is a graphical depiction of the reaction rate of the carbonation reaction as a function of the temperature at which the carbonation reaction takes place, showing the reaction rate for a gas stream containing 20 percent carbon dioxide, at 0 psig (atmospheric pressure) and at 30 psig.

The carbonation reaction conditions and the resulting experimental data for the non-pressurized and pressurized systems are shown in Tables 3 and 4, respectively. The reaction rates at varying temperature, for a prior art atmospheric system (0 psig) are shown in FIG. 15. The corresponding reaction rates for "pressurized carbonation" system operating at 30 psig are also shown in FIG. 15. The graphs indicate that in the pressurized carbonation process, the reaction rates steadily increased as a function of temperature. On the other hand, the data indicated that the reaction rates, as a function of temperature in an open system (at 0 psig), increased only gradually as temperature was raised, from approximately 4.4 grams per liter per minute to 5.0 grams per liter per minute until the temperature reached about 100° F. However, FIG. 15 shows that as the temperature was increased beyond 100° F., the rate of reaction decreased to 4.4 grams per liter per minute.

Figure 16:
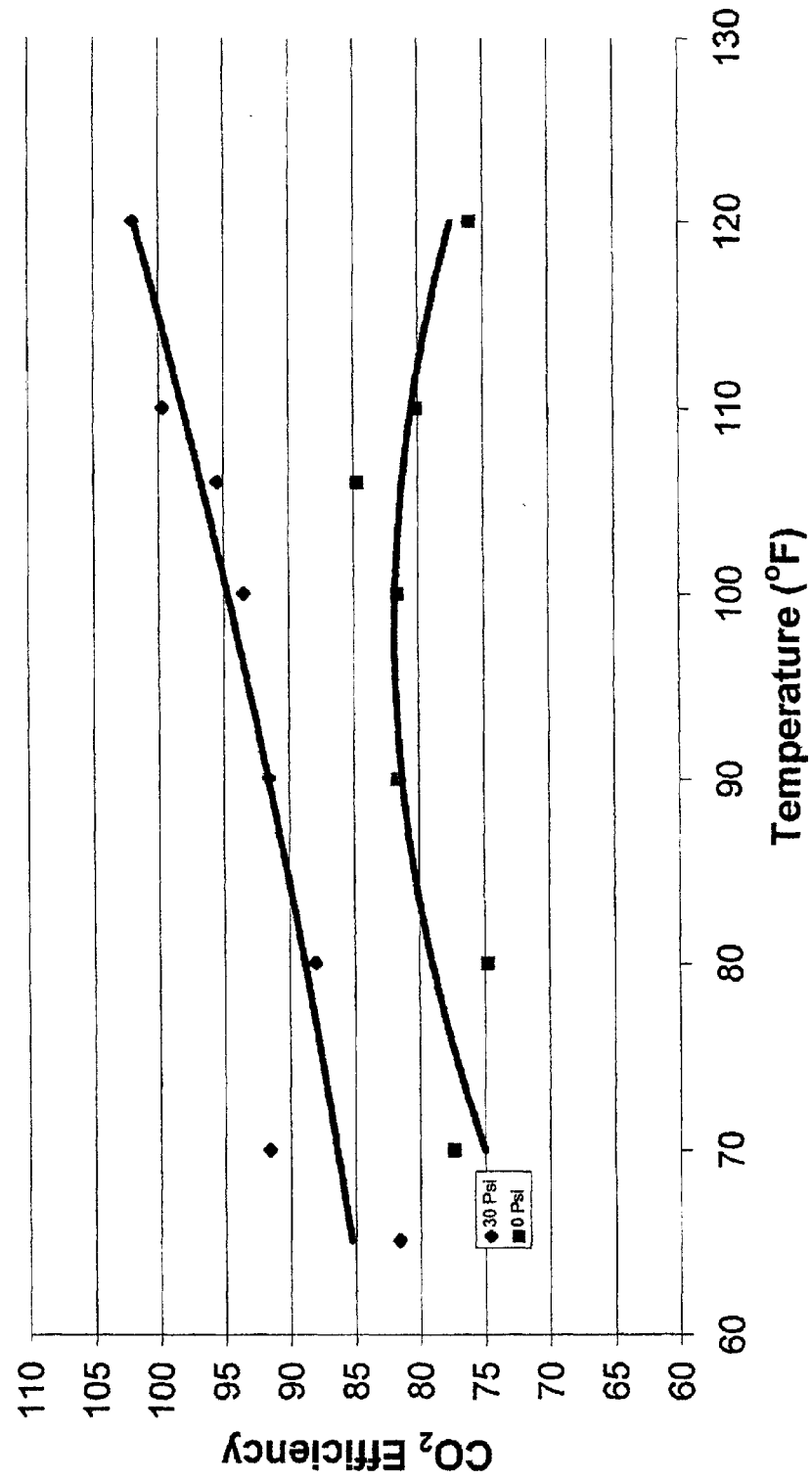
FIG. 16 is a graphical depiction of the carbon dioxide usage efficiency as a function of the temperature at which the carbonation reaction is carried out, showing the efficiency for a gas stream containing 20 percent carbon dioxide, at 0 psig (atmospheric pressure), and at 30 psig.

As indicated in FIG. 16, similar results were observed with respect to carbon dioxide utilization efficiency. The carbon dioxide utilization efficiency in the pressurized system increased significantly as the temperature was increased from about 60° F. to about 120° F. As can be seen in FIG. 16, with carbonation occurring at 30 psig, the carbon dioxide utilization efficiencies were in the range from slightly above 80% to about 100%. In an atmospheric system (operating at 0 psig) the carbonation efficiency was lower, ranging from about 74% to about 84%.

Figure 17:
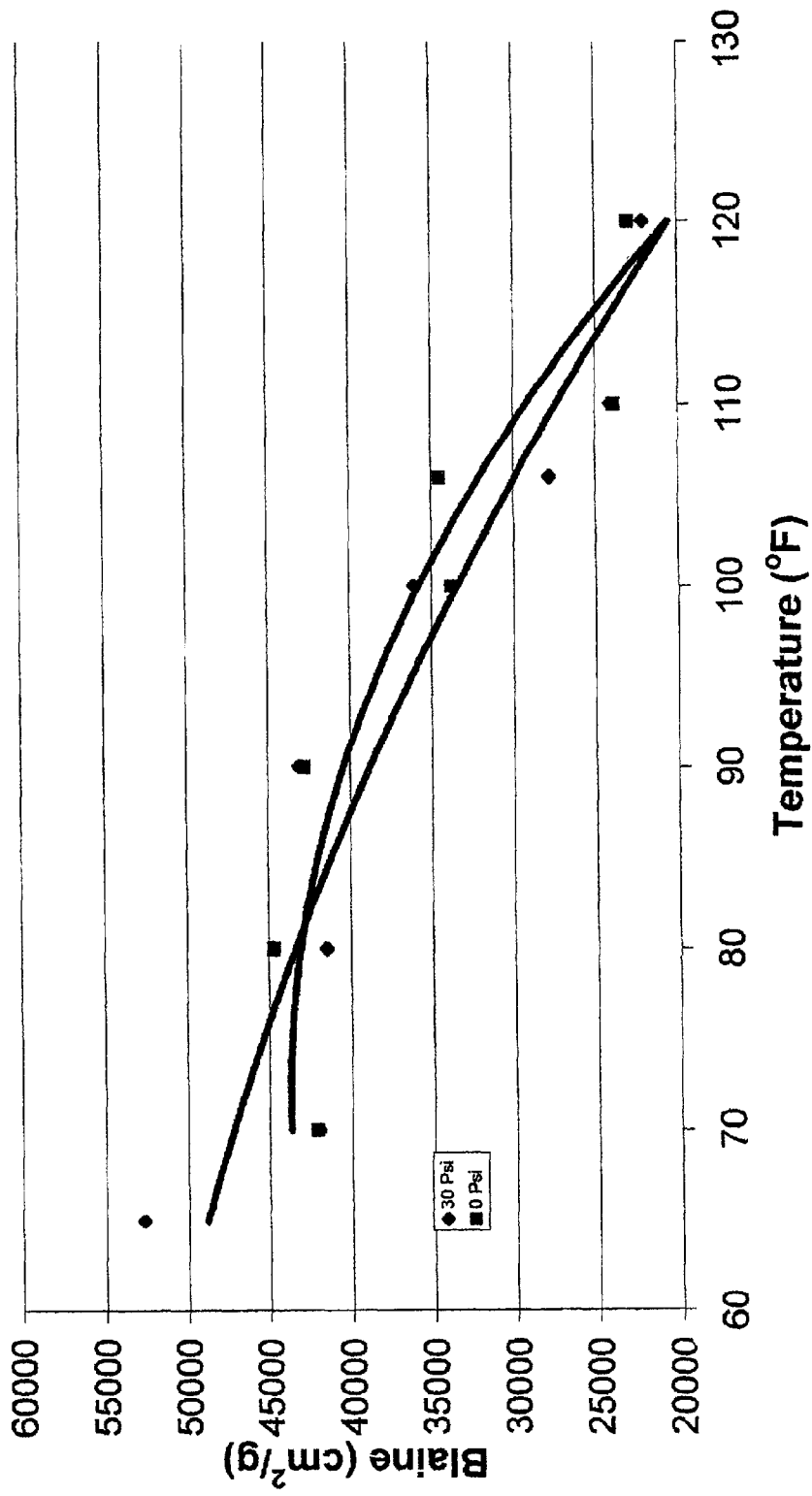
FIG. 17 is a graphical depiction of the surface area (shown as Blaine) of PCC as a function of the temperature at which the carbonation reaction is carried out, showing the PCC surface area for a gas stream containing 20 percent carbon dioxide at 0 psig (atmospheric pressure), and at 30 psig.

Overall, a pressurized carbonation system provided a higher reaction rate throughout the whole range of operating temperature. The surface areas of the produced PCC, as measured by Blaine for both the pressurized and non-pressurized systems, at different temperatures, is provided in FIG. 17. In both systems, the surface area of the product decreased as the reaction temperature was increased. The surface area of calcium carbonate decreased from approximately 44,000 $cm^2$/g to 22,000 $cm^2$/g. Importantly, the controllability of surface area via temperature was more linear under pressurized carbonation (30 psig) conditions.

TABLE 3

The Effect of Temperature on Reaction Rate, Carbonation Efficiency, and Surface Area in a Non-Pressurized System.

| Batch # | Temperature ° F. | Pressure (psig) | % $CO_2$ | Reaction Rate (g/L/m) | Carbonation Efficiency (%) | Surface Area ($cm^2$/g) |
|---|---|---|---|---|---|---|
| 175 | 70 | 0 | 20.0 | 4.40 | 77.4 | 42,100 |
| 174 | 80 | 0 | 20.0 | 4.20 | 74.8 | 44,700 |
| 173 | 90 | 0 | 20.0 | 4.75 | 81.6 | 42,800 |
| 172 | 100 | 0 | 20.0 | 4.96 | 81.6 | 33,800 |
| 169 | 106 | 0 | 20.0 | 4.70 | 84.7 | 34,500 |
| 170 | 110 | 0 | 20.0 | 4.60 | 80.14 | 23,900 |
| 171 | 120 | 0 | 20.0 | 4.40 | 76.1 | 23,000 |

TABLE 4

The Effect of Temperature on Reaction Rate, Carbonation Efficiency, and Surface Area in a Pressurized System

| Batch # | Temperature (° F.) | Pressure (psig) | % $CO_2$ | Reaction Rate (g/L/m) | Carbonation Efficiency (%) | Surface Area ($cm^2$/g) |
|---|---|---|---|---|---|---|
| 127 | 65 | 30.0 | 20 | 4.82 | 81.6 | 52,700 |
| 129 | 70 | 30.0 | 20 | 5.30 | 91.6 | 42,000 |
| 130 | 80 | 30.0 | 20 | 5.16 | 88.0 | 41,500 |
| 128 | 90 | 30.0 | 20 | 5.40 | 91.6 | 43,100 |
| 133 | 100 | 30.0 | 20 | 5.30 | 93.5 | 36,100 |
| 131 | 106 | 30.0 | 20 | 5.72 | 95.5 | 27,800 |
| 132 | 110 | 30.0 | 20 | 5.93 | 99.7 | 24,100 |
| 134 | 120 | 30.0 | 20 | 6.10 | 100.0 | 22,100 |

Example 3

The effect of %$CO_2$ Concentration on Reaction Rate, Carbonation Efficiency, and Surface Area In this series of experiments, the concentration of $CO_2$ was varied from 5.0% $CO_2$/95% $N_2$ to 100% $CO_2$/0% $N_2$, by volume. Other reaction conditions were kept constant at the following levels:

| | |
|---|---|
| Flow of $CO_2$: | 1.5 liters per minute |
| Carbonation Reaction Temp.: | 100° F. |
| Ca(OH)$_2$ Concentration: | ~260 grams per liter |

The results of the measurements of the reaction rate, carbonation efficiency, and PCC surface area for a non-pressurized and pressurized system are given in Tables 5 and 6, respectively. The results are also graphed in FIGS. 18, 19, and 20.

Figure 18:
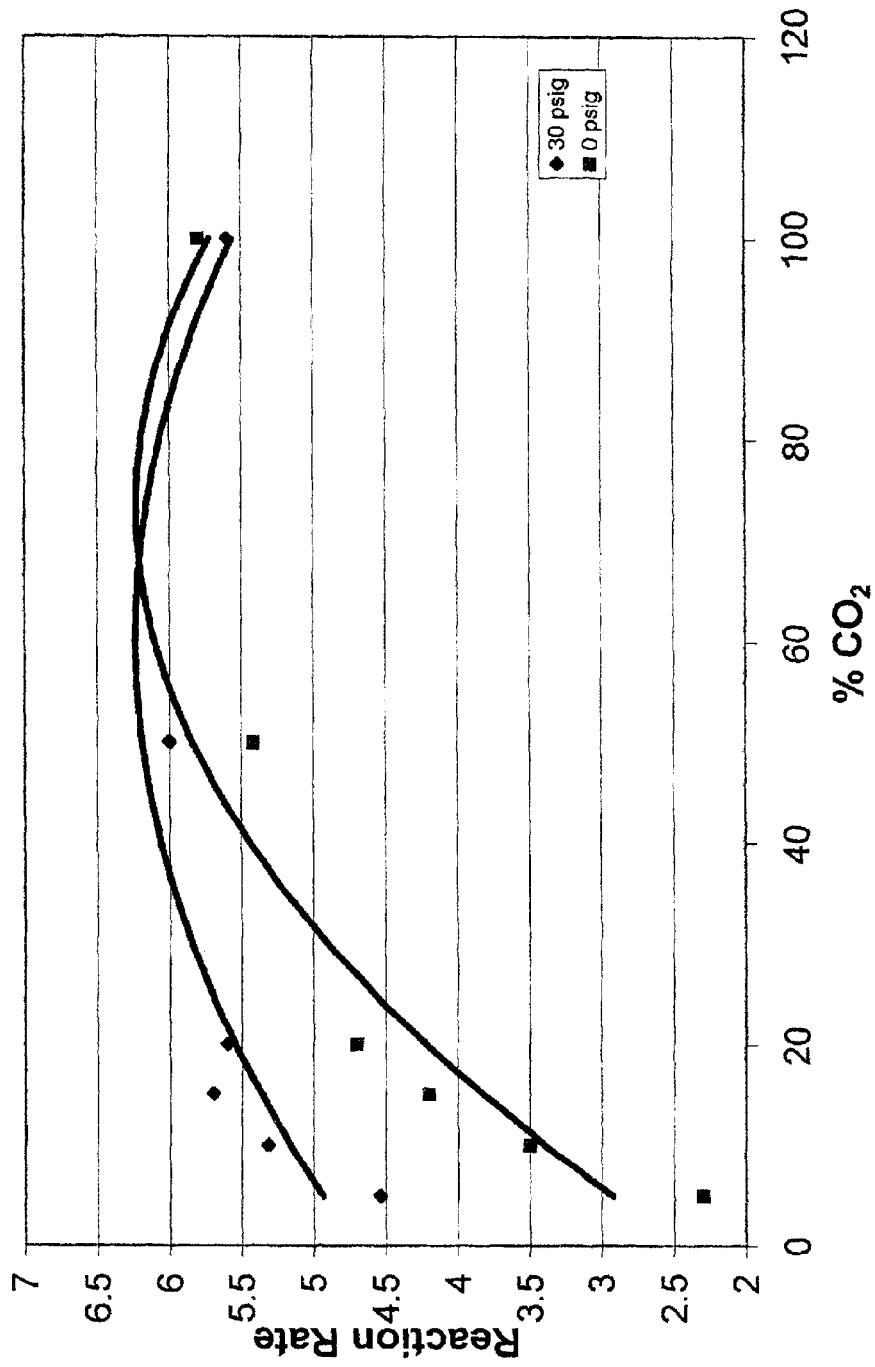
FIG. 18 is a graphical depiction of the reaction rate of the carbonation reaction as a function of the percentage of carbon dioxide in a gas stream provided to the carbonation reactor, showing the efficiency of a gas stream at 0 psig (atmospheric pressure), and at 30 psig.
Figure 19:
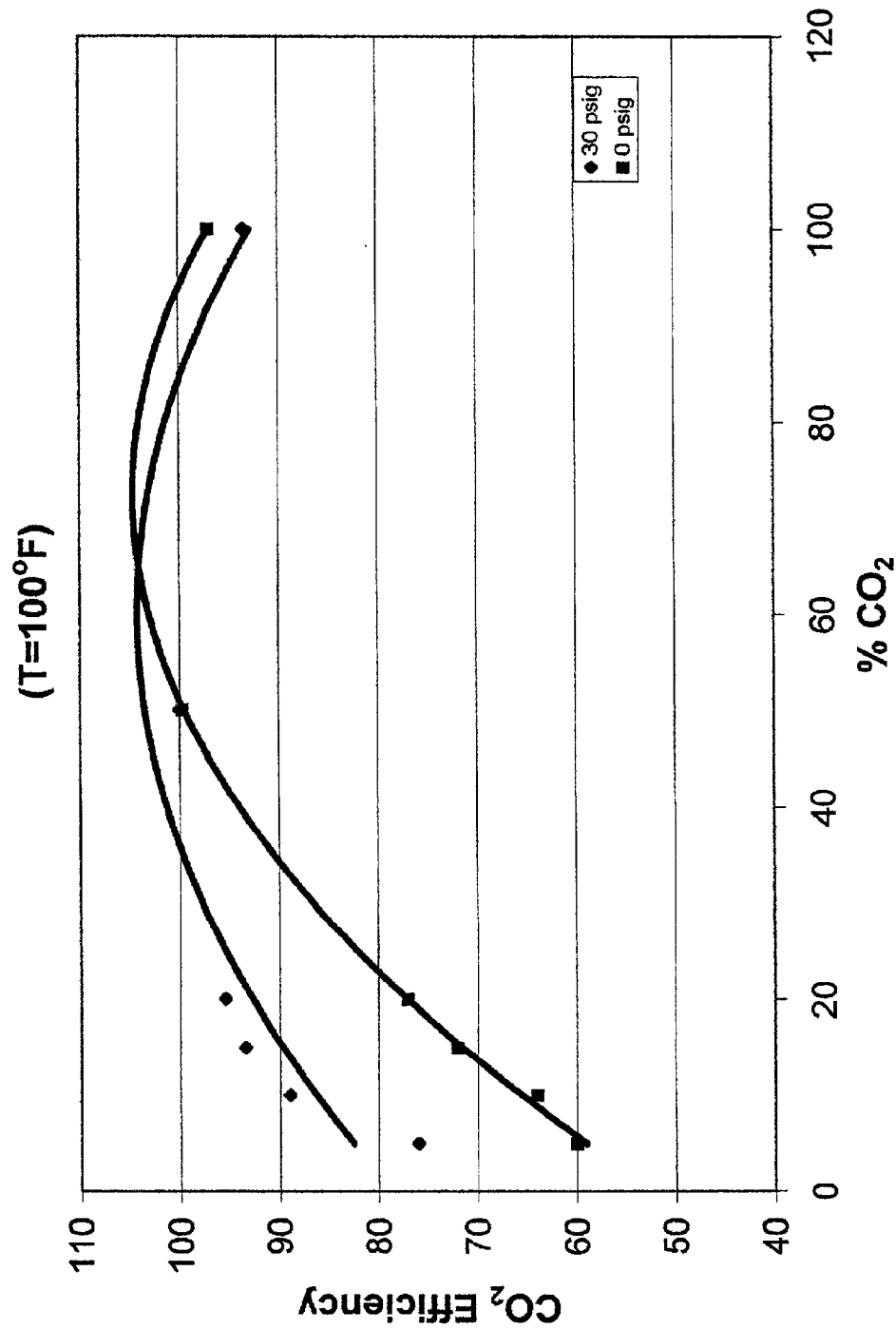
FIG. 19 is a graphical depiction of the carbon dioxide usage efficiency as a function of the percentage of carbon dioxide in a gas stream provided to the carbonation reactor, showing the efficiency of a gas stream at 0 psig (atmospheric pressure), and at 30 psig.
Figure 20:
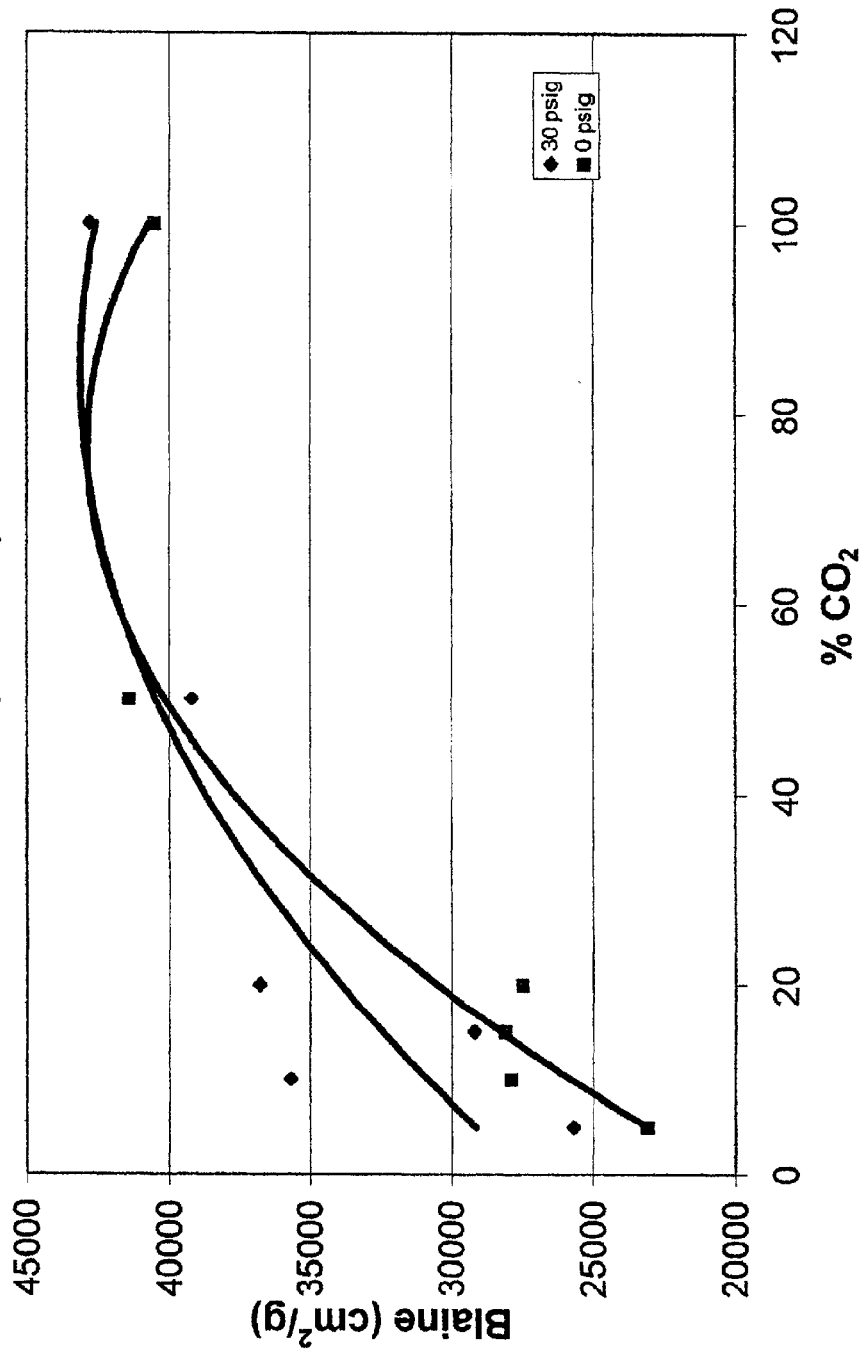
FIG. 20 is a graphical depiction of the surface area of precipitated calcium carbonate (as indicated by Blaine) as a function of the percentage of carbon dioxide in a gas stream provided to the carbonation reactor, showing the efficiency of a gas stream at 0 psig (atmospheric pressure), and at 30 psig.
Figure 21:
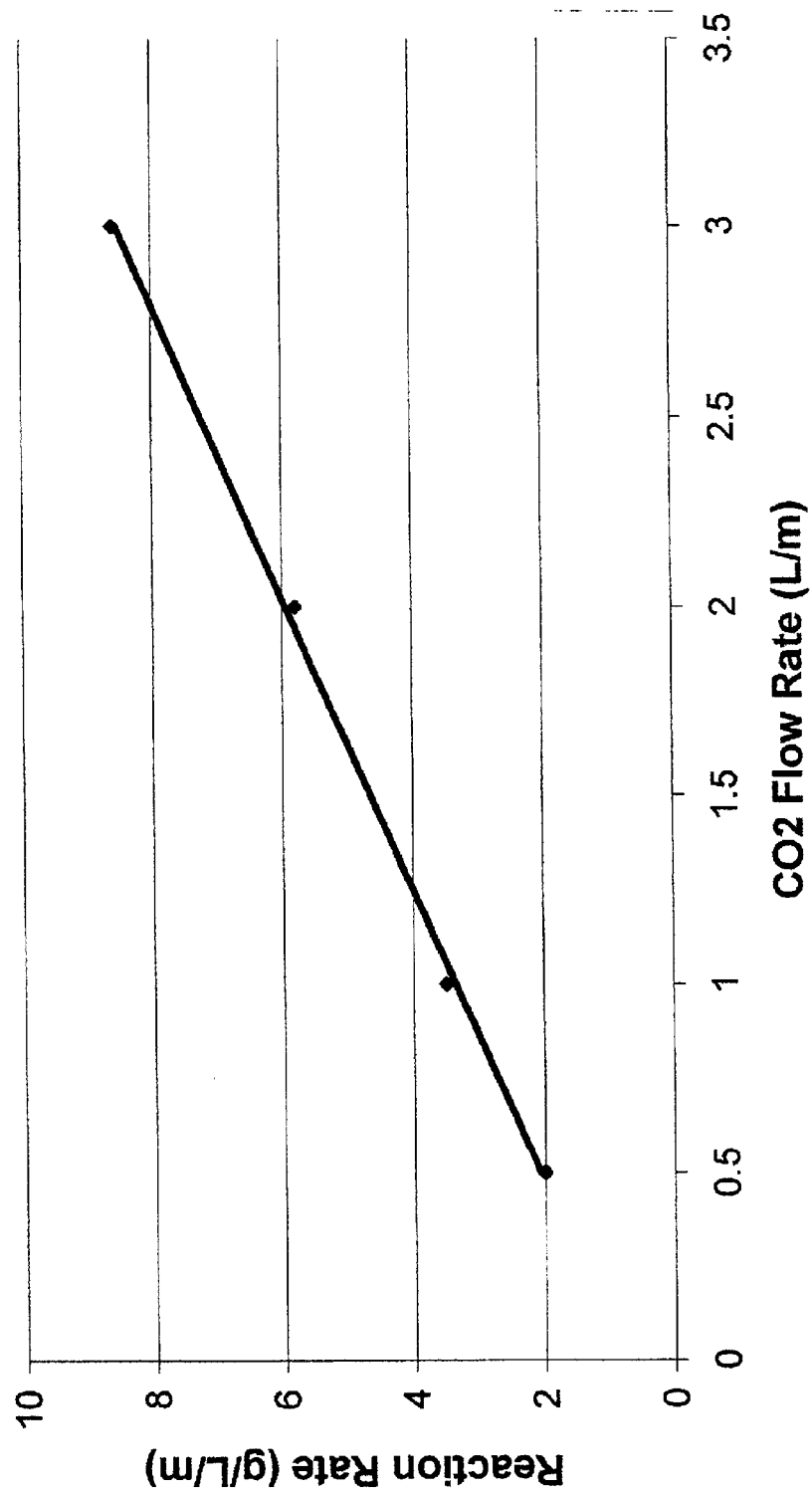
FIG. 21 is a graphical depiction of the reaction rate of the carbonation reaction as a function of the flow rate of the CO2 containing gas stream provided to the carbonation reactor at 30 psig.
Figure 22:
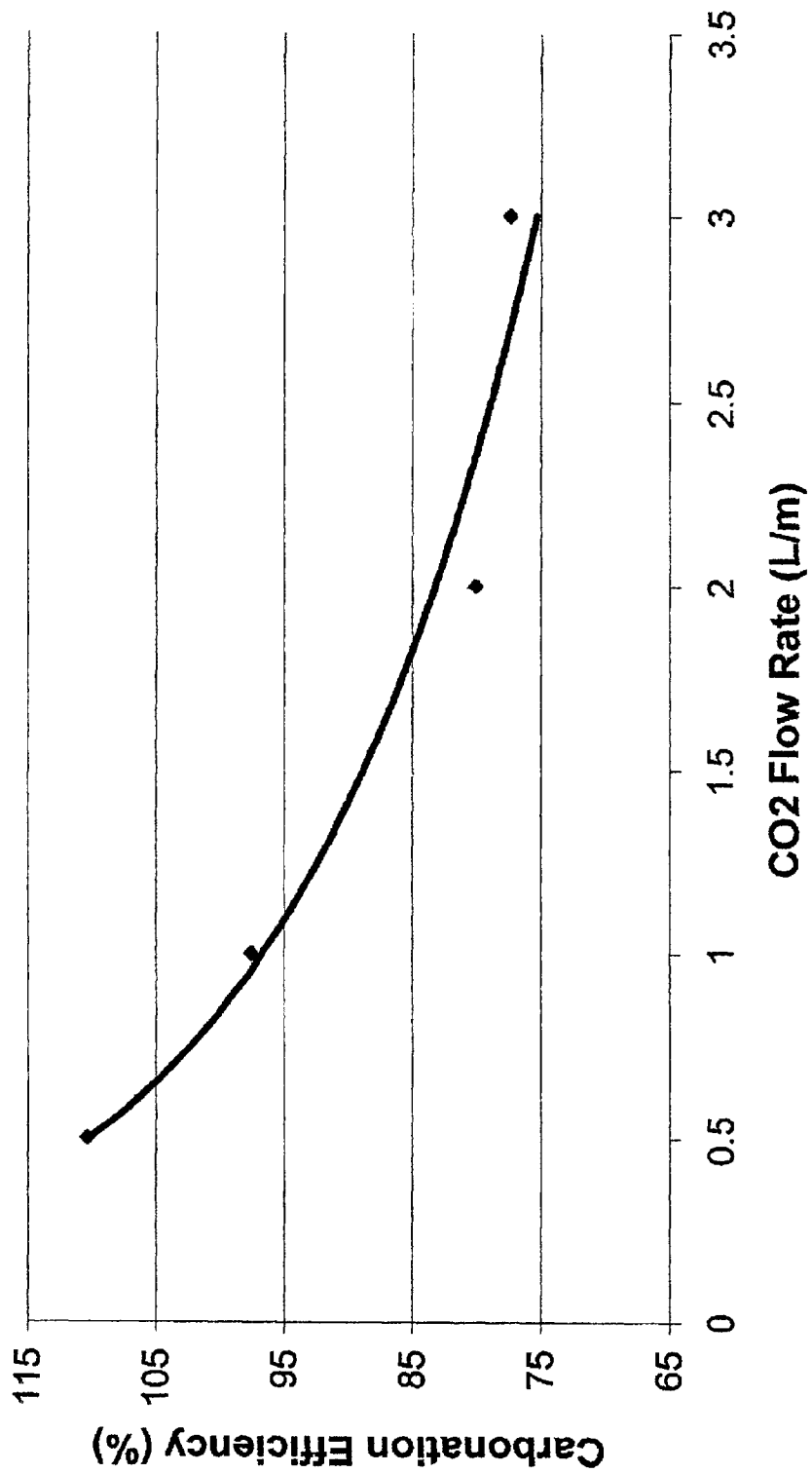
FIG. 22 is a graphical depiction of the carbon dioxide usage efficiency as a function of the flow rate of the CO2 containing gas stream provided to the carbonation reactor at 30 psig.
Figure 23:
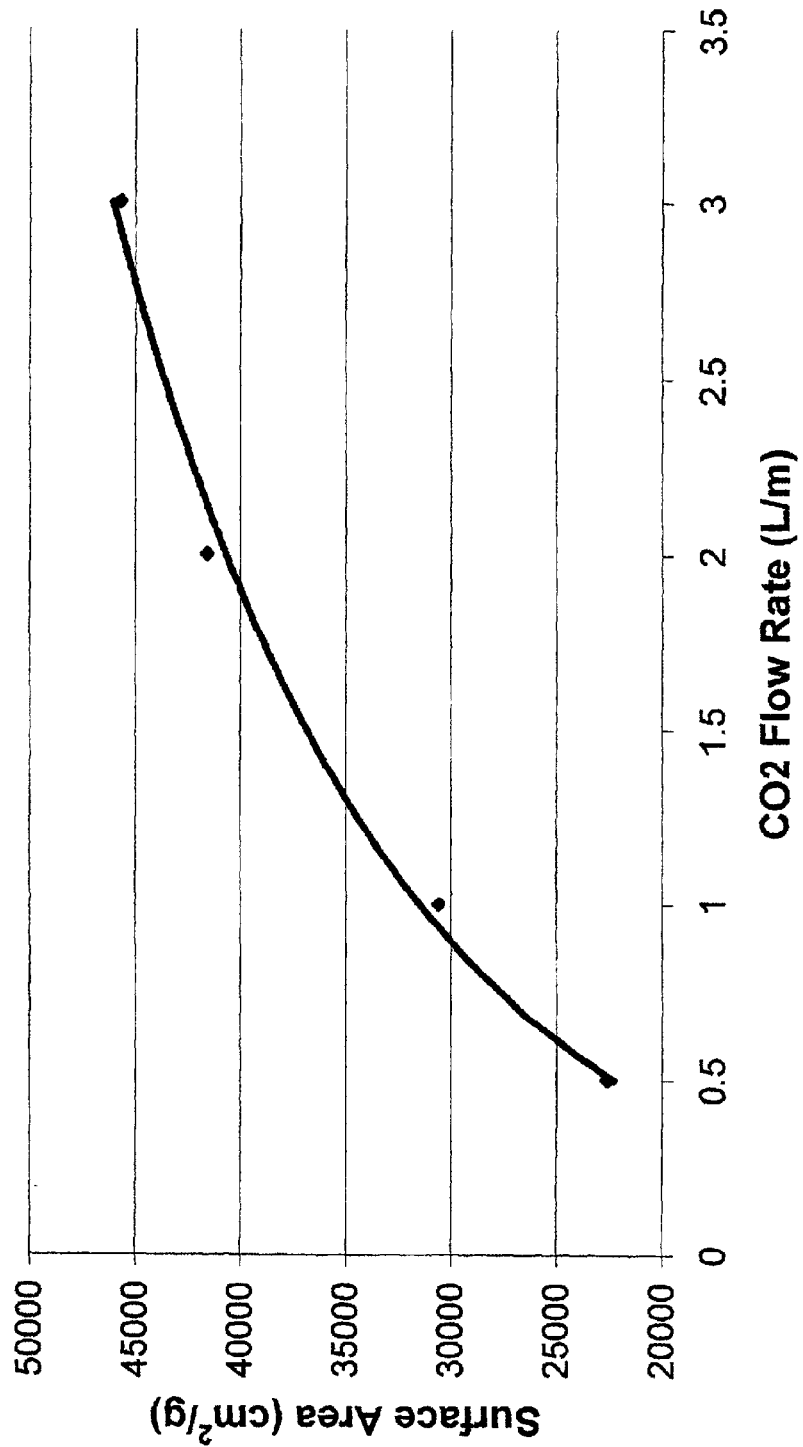
FIG. 23 is a graphical depiction of the surface area of precipitated calcium carbonate (as indicated by Blaine) as a function of the flow rate of the CO2 containing gas stream provided to the carbonation reactor at 30 psig.
Figure 24:
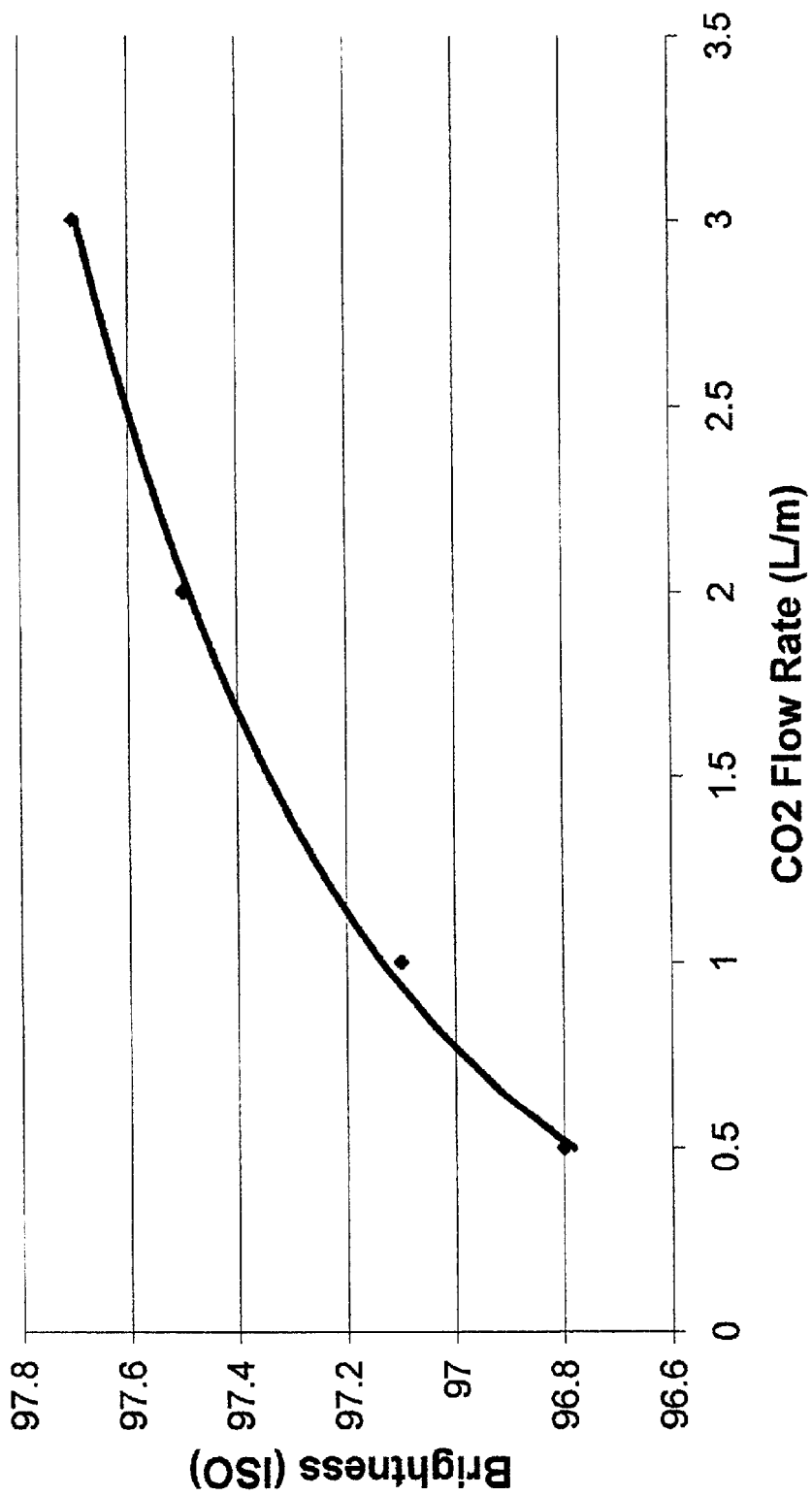
FIG. 24 is a graphical depiction of the pigment brightness as a function of the flow rate of the CO2 containing gas stream provided to the carbonation reactor at 30 psig.
Figure 25:
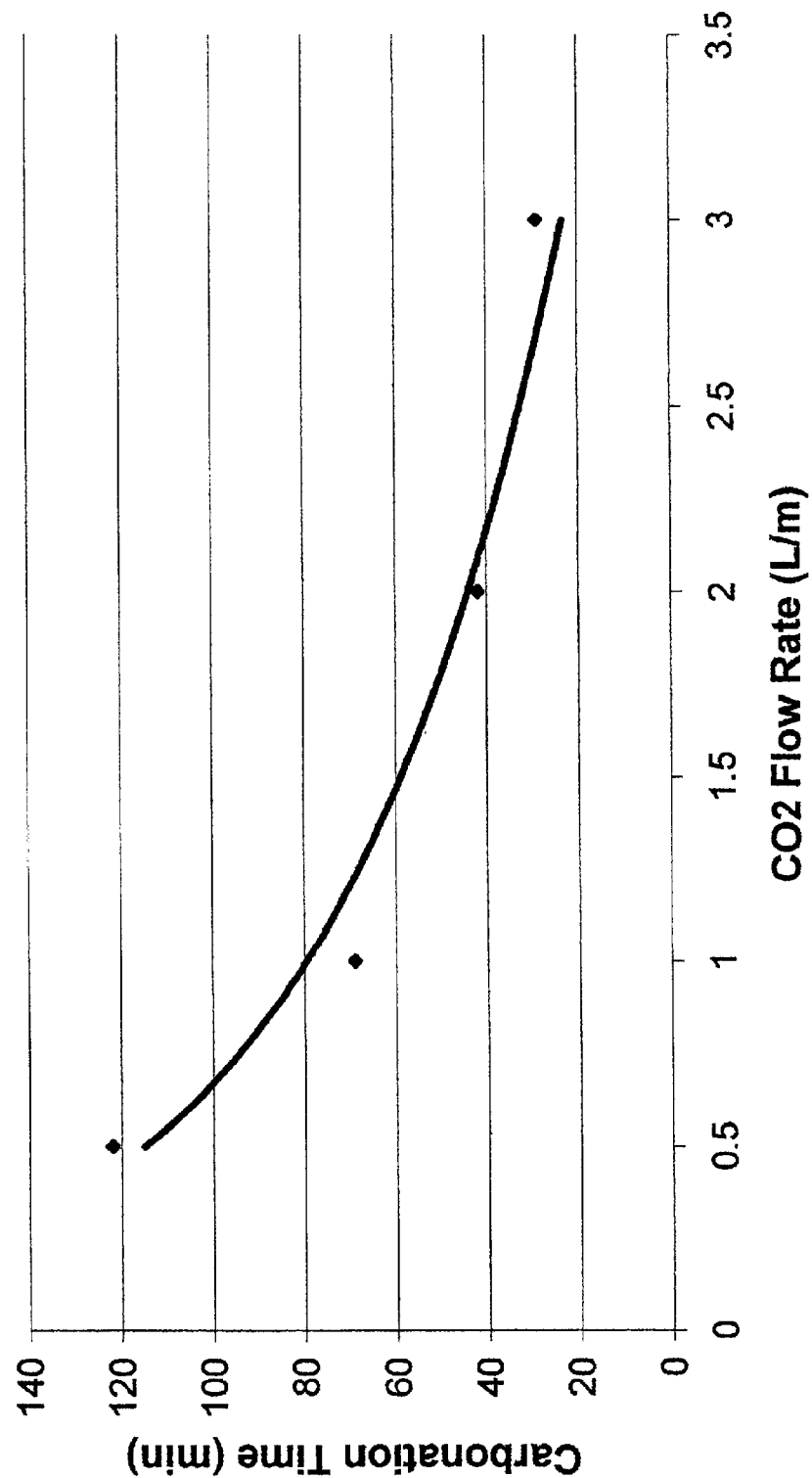
FIG. 25 is a graphical depiction of the length (in minutes) of the carbonation reaction as a function of the flow rate of the CO2 containing gas stream provided to the carbonation reactor at 30 psig.

It is evident from FIG. 18 that when the entering gas stream contains only 5.0% $CO_2$, the reaction rate is almost doubled by using "pressure carbonation" PCC production with a gauge pressure of 30 psig. As indicated in FIG. 20, the surface area comparison between batch #140 and batch #149 also indicates the formation of a finer PCC particle size using the "pressure carbonation" technique.

Also, as the concentration of carbon dioxide increased, the reaction rates increased. Similarly, the carbonation efficiency increased with increasing $CO_2$ concentration. The particle surface area also increased with $CO_2$ concentration indicating formation of finer PCC particles (42,000 $cm^2$/g). The reaction rate under the pressurized system was much higher than with the reaction carried out at atmospheric pressure. See FIGS. 18, 19, and 20.

TABLE 5

Comparative Example—The Effect of $CO_2$ Concentration on Reaction Rate, Carbonation Efficiency, and Surface Area in Non-Pressurized System.

| Batch # | Pressure | % $CO_2$ | Reaction Rate | Carbonation Efficiency (%) | Surface Area ($cm^2$/g) |
|---|---|---|---|---|---|
| 149 | 0 | 5 | 2.3 | 60.0 | 23,100 |
| 150 | 0 | 10 | 3.5 | 64.0 | 27,900 |
| 151 | 0 | 15 | 4.2 | 72.0 | 28,100 |
| 152 | 0 | 20 | 4.7 | 77.0 | 27,500 |
| 153 | 0 | 50 | 5.4 | 99.7 | 41,400 |
| 154 | 0 | 100 | 5.8 | 97.0 | 40,500 |

TABLE 6

The Effect of $CO_2$ Concentration on Reaction Rate, Carbonation Efficiency, and Surface Area in a Pressurized System.

| Batch # | Pressure | % $CO_2$ | Reaction Rate | Carbonation Efficiency (%) | Surface Area ($cm^2$/g) |
|---|---|---|---|---|---|
| 140 | 30 | 5 | 4.5 | 76.0 | 25,700 |
| 141 | 30 | 10 | 5.3 | 89.0 | 35,700 |
| 142 | 30 | 15 | 5.7 | 93.5 | 29,200 |
| 143 | 30 | 20 | 5.6 | 95.5 | 36,800 |
| 144 | 30 | 50 | 6.0 | 100.0 | 39,200 |
| 145 | 30 | 100 | 5.6 | 93.5 | 42,800 |

Example 4

The Effect of $CO_2$ Flow Rate on Carbonation Time, Reaction Rate, Surface Area, Carbonation Efficiency, and Pigment Brightness in a Pressure Carbonation System In this series of experiments, the flow rate of $CO_2$ was varied from 0.5 to 3.0 liters per minute, while the other reaction conditions were held constant at the following levels:

| | |
|---|---|
| % $CO_2$: | 20% |
| Carbonation Reaction Temp.: | 100° F. |
| Ca(OH)$_2$ Concentration: | ~244 grams per liter |
| Reaction Pressure: | 30 psig |

The reactions were all carried out in equipment as described in example 1. The results of the measurements of the reaction rate, carbonation efficiency, surface area and brightness are given in Table 7.

As would be expected, these results show a direct link between the $CO_2$ Flow rate and the carbonation time, reaction rate, surface area, carbonation efficiency, and brightness. The first dependent variable, carbonation time, decreased as the $CO_2$ flow rate increased. This was most likely a result of the corresponding increase in reaction rate with increasing $CO_2$ flow. The surface area was also found to increase with increasing $CO_2$ flow, indicating the presence of smaller carbonate crystals. The carbonation efficiency, however, decreased with increased $CO_2$ flow. Lastly, the pigment brightness increased with increasing $CO_2$ flow rate. See FIGS. 21, 22, 23, 24, and 25.

TABLE 7

The Effect of $CO_2$ Flow Rate on Carbonation Time, Reaction Rate, Surface Area, Carbonation Efficiency, and Pigment Brightness in a Pressure Carbonation System.

| Batch # | $CO_2$ Flow Rate (L/m) | Carbonation Time (min) | Reaction Rate (g/L/m) | Carbonation Efficiency (%) | Surface Area ($cm^2/g$) | Brightness (G.E.) |
|---|---|---|---|---|---|---|
| SPC-236 | 0.5 | 122 | 2.0 | 99.9+ | 22600 | 96.8 |
| SPC-237 | 1.0 | 69 | 3.5 | 97.6 | 30600 | 97.1 |
| SPC-238 | 2.0 | 42 | 5.8 | 80.1 | 41600 | 97.5 |
| SPC-239 | 3.0 | 29 | 8.6 | 77.4 | 45700 | 97.7 |

Example 5

Figure 26:
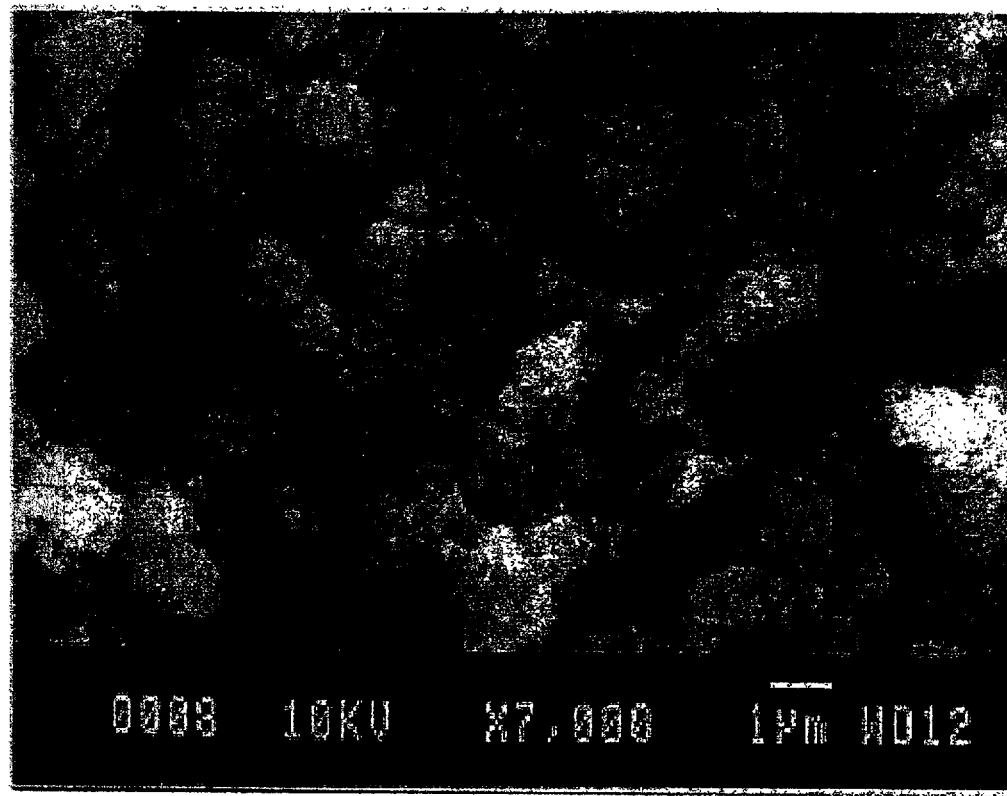
FIG. 26 is a photograph of one type of precipitated calcium carbonate crystal obtained in the process of the present invention, termed SPC 118; the photographs were taken with a scanning electron microscope (SEM).

Effect of a High $CO_2$ Flow Rate on Carbonation Time, Reaction Rate, Surface Area, Carbonation Efficiency and Pigment Brightness in a Pressure Carbonation System In this example, experimental conditions were similar to example 4 except the $CO_2$ flow rate was set at 5.3 liters per minute, the $CO_2$ concentration was 100%, the reaction pressure was 3 psig, and the concentration of $Ca(OH)_2$ was 266 grams per liter. Table 8 shows the results. The S.E.M. is shown in FIG. 26.

The reaction rate for this experiment was 16.6 grams per liter per minute, which lead to a carbonation time of only 16 minutes. The surface area was quite large, 46,700 $cm^2/g$. The carbonation efficiency was 79.4% and the brightness was found to be 96.0% reflectance on a G.E. brightness meter.

Figure 27:
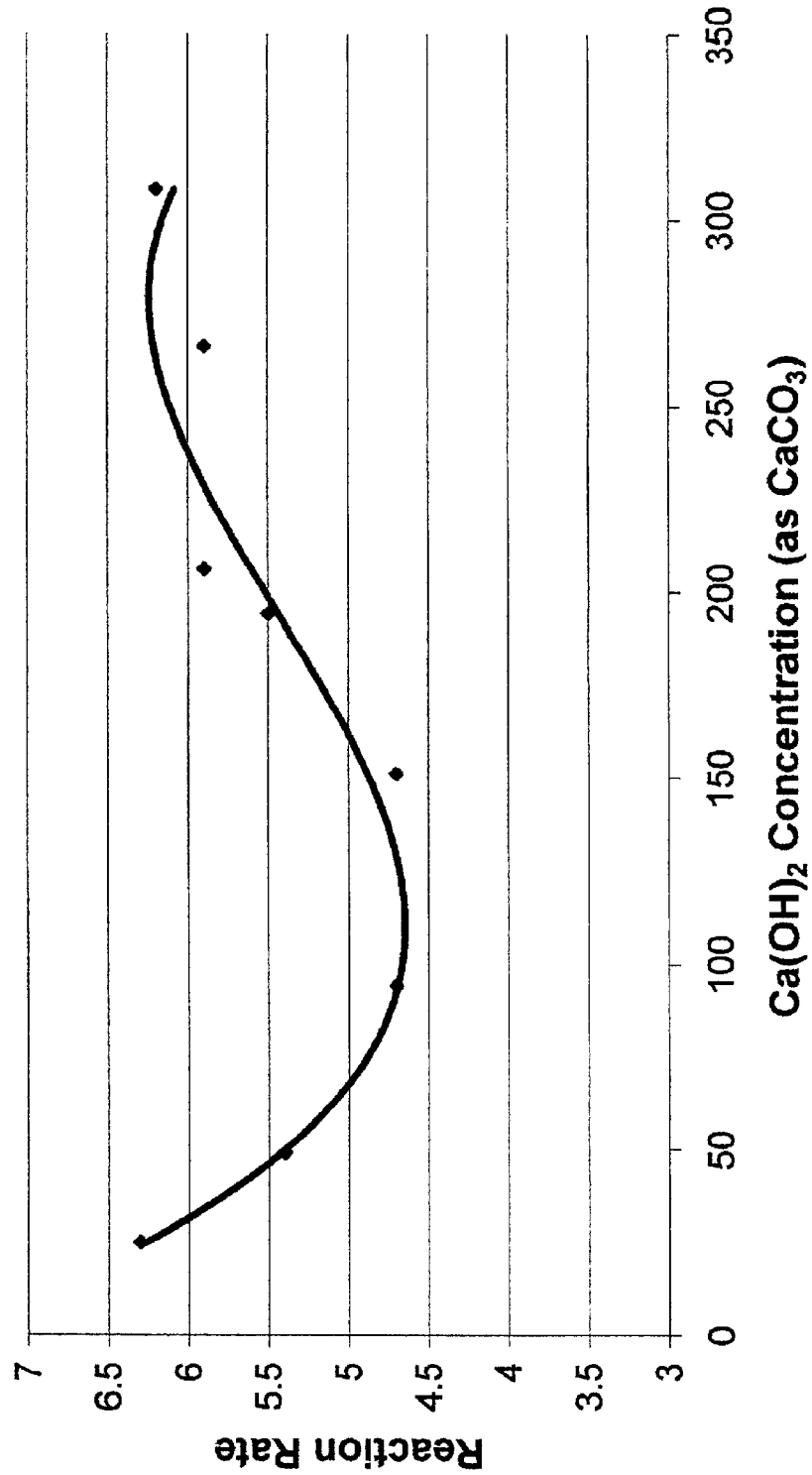
FIG. 27 is a graphical depiction of the reaction rate of the carbonation reaction, in terms of the grams per liter per minute of calcium hydroxide converted, as a function of the concentration of calcium hydroxide in the lime slurry (expressed as grams of calcium hydroxide as calcium carbonate, per liter of slurry), for a reaction according to the invention, carried out at 30 psig and 200 F using a gas stream to the carbonation reaction which contains 20% carbon dioxide by volume upon entry to the carbonation reactor.
Figure 28:
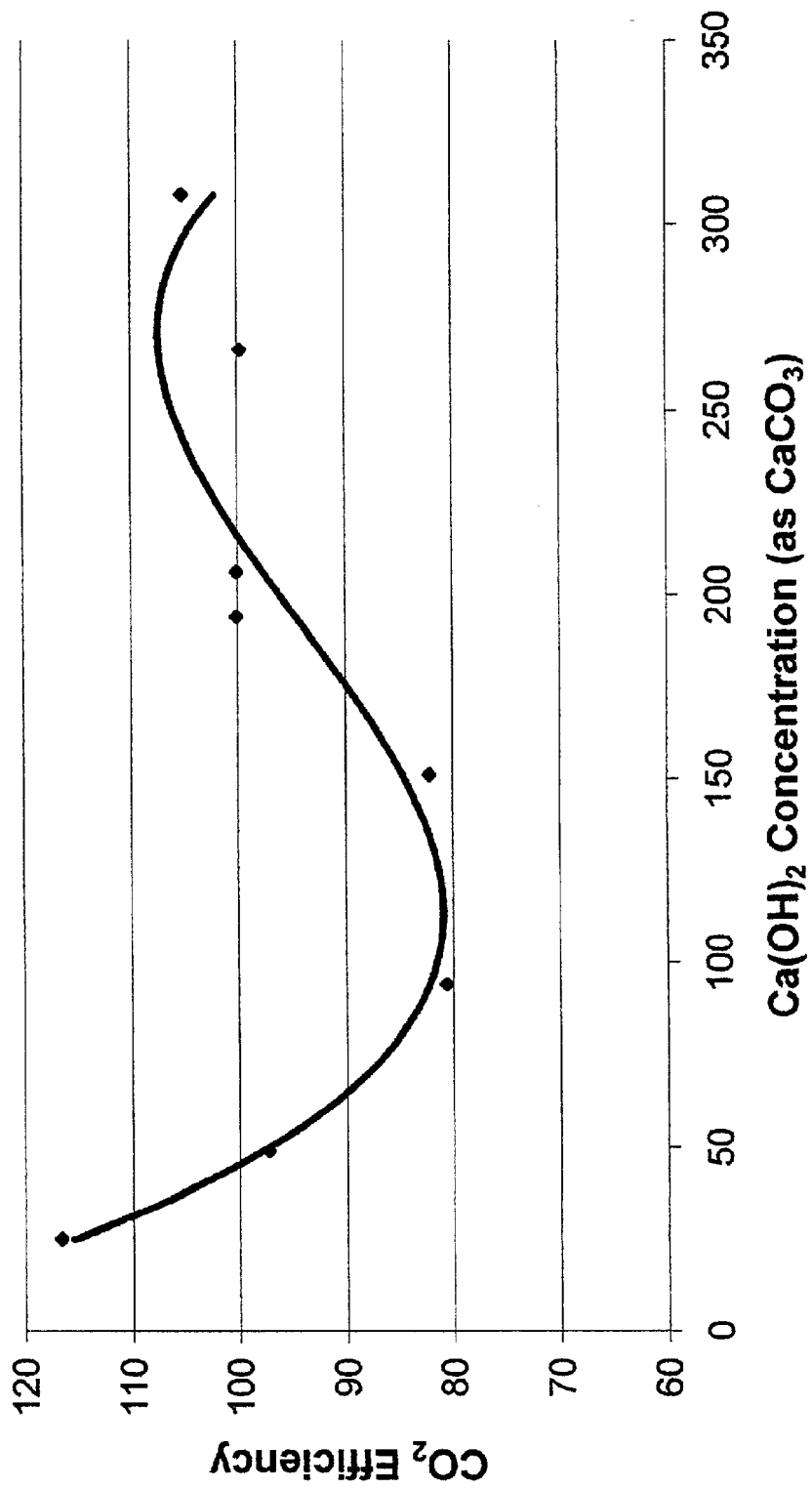
FIG. 28 is a graphical depiction of the carbon dioxide efficiency of the carbonation reaction, as a function of the concentration of calcium hydroxide in the lime slurry (expressed as grams of calcium hydroxide as calcium carbonate, per liter of slurry), for a reaction according to this invention, carried out at 30 psig and 200 F using a gas stream to the carbonation reaction which contains 20% carbon dioxide by volume upon entry to the carbonation reactor.
Figure 29:
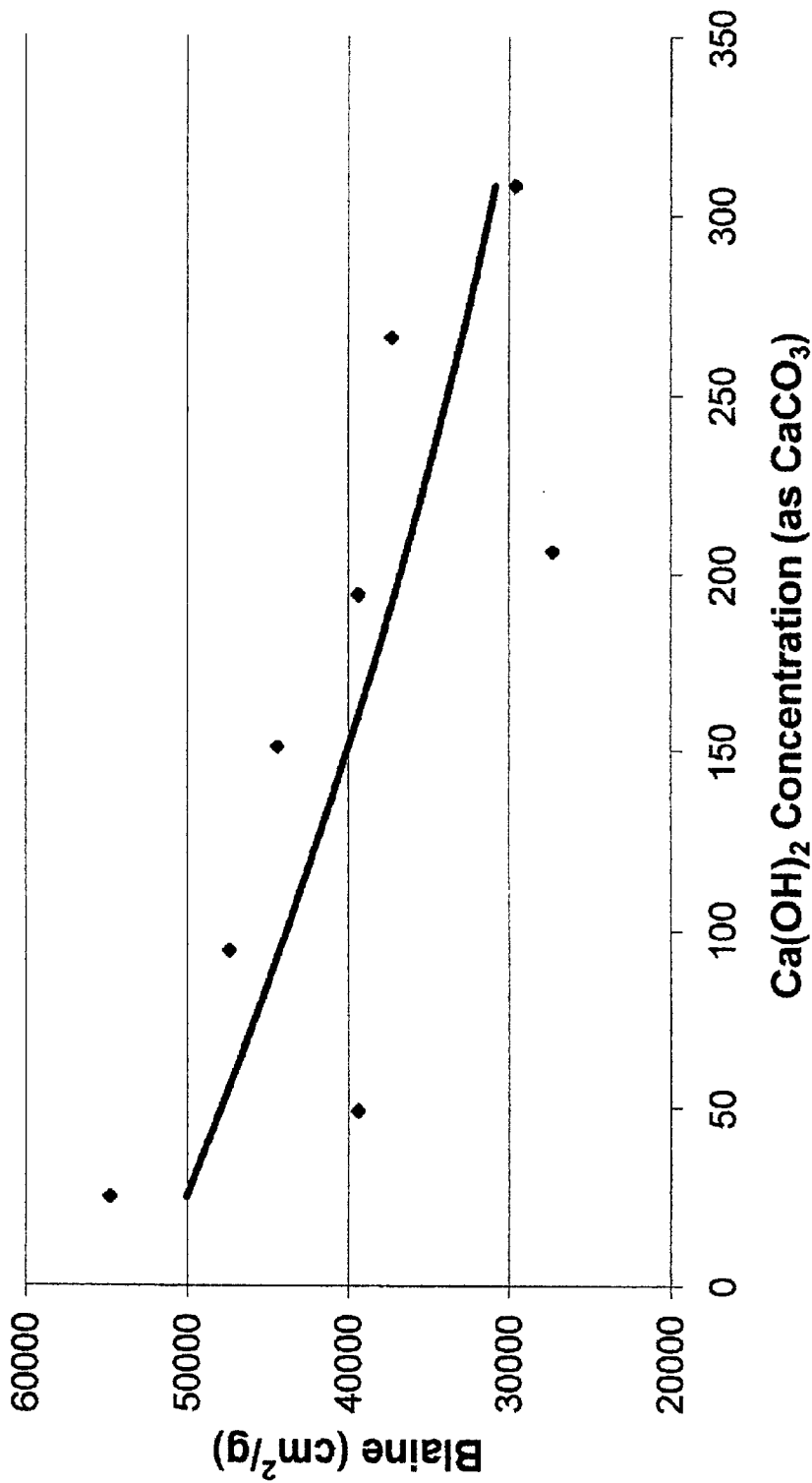
FIG. 29 is a graphical depiction of the surface area of precipitated calcium carbonate (as indicated by Blaine), as a function of the concentration of calcium hydroxide in the lime slurry (expressed as grams of calcium hydroxide as calcium carbonate, per liter of slurry), for a reaction as described herein, carried out at 30 psig and 200 F using a gas stream to the carbonation reaction which contains 20% carbon dioxide by volume upon entry to the carbonation reactor.

The carbonation efficiency and surface area of the PCC are given in FIGS. 28 and 29, respectively. As shown in FIG. 27, the reaction rate response was curvilinear, an inverse parabola. The carbonation efficiency followed a similar trend. However, as the calcium hydroxide concentration increased from about 25 to about 308 grams per liter, the particle surface area of the PCC manufactured under pressure carbonation conditions decreased steadily from about 55,000 $cm^2/g$ to about 30,000 $cm^2/g$. FIGS. 28 and 29 indicate that the initial reaction rates and carbon dioxide efficiency, respectively, were higher at lower calcium hydroxide concentrations. The reaction rate and the carbon dioxide utilization efficiency decreased as the concentration of $Ca(OH)_2$ increased to about 125 grams per liter of calcium hydroxide. However, beyond 150 grams per liter, the reaction rate and the carbon dioxide utilization efficiency increased, reaching a maximum at, or slightly less than, about 300 grams per liter of $Ca(OH)_2$.

TABLE 8

Effect of a High $CO_2$ Flow Rate on Carbonation Time, Reaction Rate, Surface Area, Carbonation Efficiency, and Pigment Brightness in a Pressure Carbonation System

| Batch # | $CO_2$ Flow Rate (L/m) | Carbonation Time (min) | Reaction Rate (g/L/m) | Surface Area ($cm^2/g$) | Carbonation Efficiency (%) | Brightness (G.E.) |
|---|---|---|---|---|---|---|
| SPC-118 | 5.3 | 16 | 16.6 | 46700 | 79.4 | 96.0 |

Example 6

The Effect of Calcium Hydroxide Concentration on Reaction Rate, Carbonation Efficiency, and Surface Area of PCC In this example, the concentration of calcium hydroxide, measured as calcium carbonate, was varied from a low of 35 grams per liter to a high of 308 grams per liter.

The constant reaction conditions were as follows:

| | |
|---|---|
| $CO_2$ Flow: | 1.5 liters per minute |
| $CO_2$ Concentration: | 20% |
| Carbonation Temp.: | 100° F. |
| Reaction Pressure: | 30 psig |

The experimental data for variation of calcium hydroxide slurry concentration in a pressure carbonation reactor is shown in Table 9. The reaction rate response, as calcium hydroxide concentration is varied, is given in FIG. 27.

TABLE 9

The Effect of Calcium Hydroxide Concentration on Reaction Rate, Carbonation Efficiency, and Surface Area.

| Batch # | Calcium Hydroxide Concentration (as $CaCO_3$) | Reaction Rate | Carbonataion Efficiency (%) | Surface Area ($cm^2/g$) |
|---|---|---|---|---|
| 168 | 25 | 6.3 | 99.9+ | 54,800 |
| 162 | 49 | 5.4 | 97.28 | 39,400 |
| 164 | 94 | 4.7 | 80.64 | 47,400 |
| 165 | 151 | 4.7 | 82.20 | 44,400 |
| 163 | 194 | 5.5 | 99.9+ | 39,400 |
| 166 | 206 | 5.9 | 99.9+ | 27,300 |
| 167 | 266 | 5.9 | 99.73 | 37,300 |
| 161 | 308 | 6.2 | 99.9+ | 29,600 |

Example 7

Effect of Agitation (RPM of agitator) on Pressure Carbonation

In this set of experiments, the agitation in the reaction vessel was successively increased from 500 RPM to about 1800 RPM on the agitator. The other reaction conditions were kept constant at the following levels:

| | |
|---|---|
| CO₂ Flow: | 1.5 liters per minute |
| CO₂ Concentration: | 20% |
| Carbonation Temperature: | 100° F. |
| Ca(OH)₂ Concentration: | ~250 gpl |
| Carbonation Pressure: | 30 psig |

Figure 30:
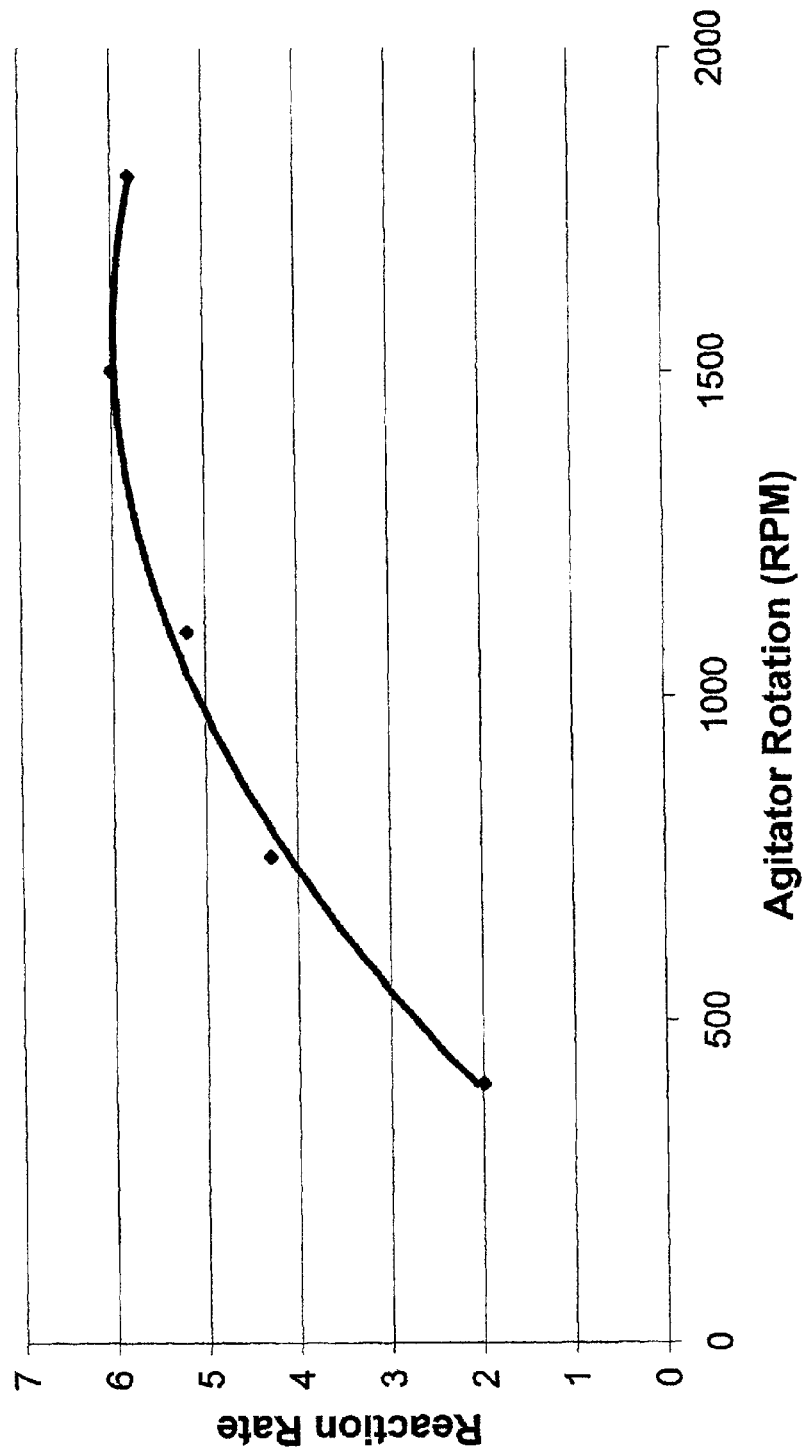
FIG. 30 is a graphical depiction of the reaction rate of the carbonation reaction as a function of the speed of the agitator used to stir the lime slurry in the reactor, for a reaction carried out at 30 psig and 100 F using a gas stream entering the carbonation reactor which contains 20% carbon dioxide by volume.
Figure 31:
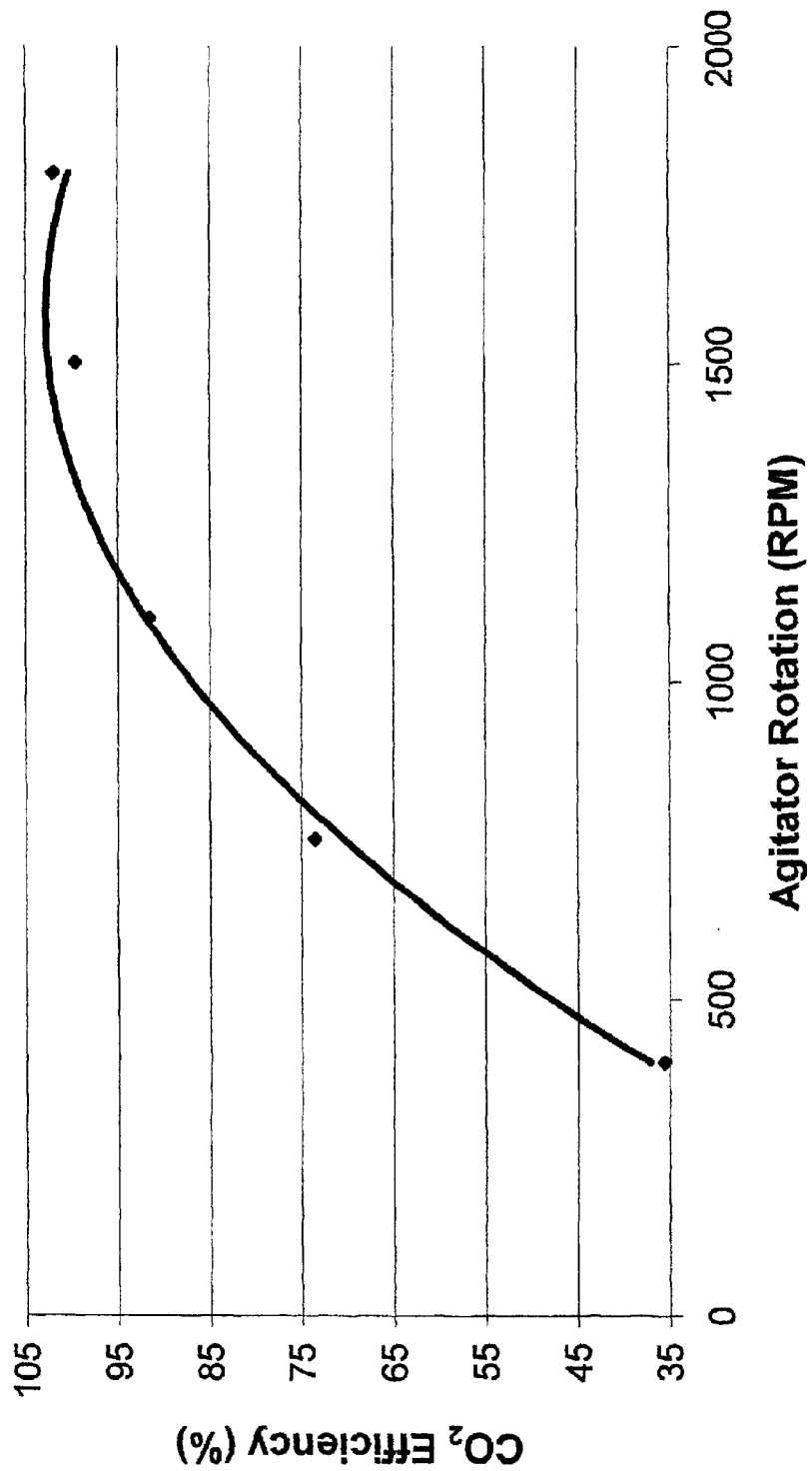
FIG. 31 is a graphical depiction of the carbon dioxide utilization efficiency of the carbonation reaction as a function of the speed of the agitator used to stir the lime slurry in the reactor, for a reaction carried out at 30 psig and 100 F using a gas stream entering the carbonation reactor which contains 20% carbon dioxide by volume.
Figure 32:
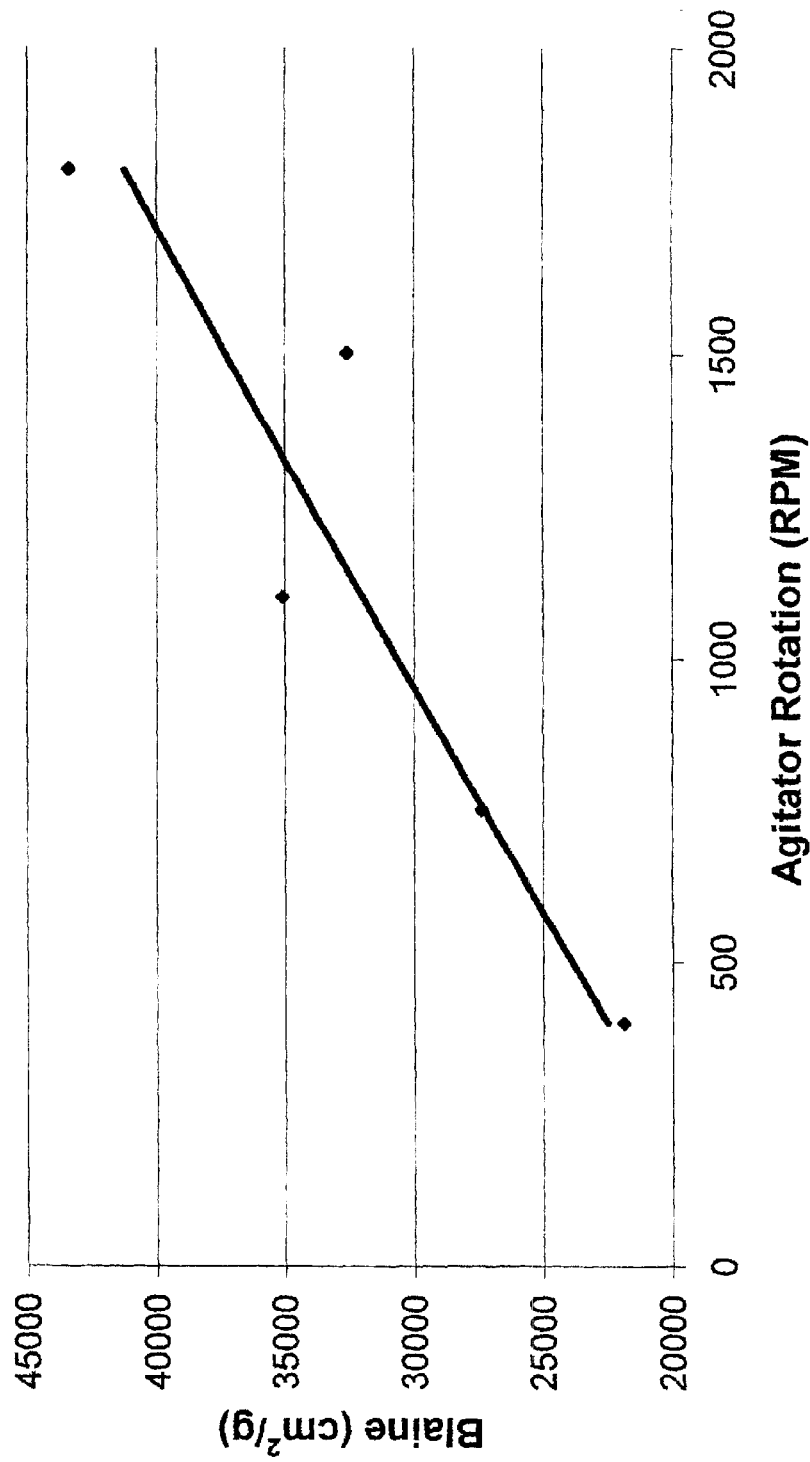
FIG. 32 is a graphical depiction of the surface area of precipitated calcium carbonate (as indicated by Blaine) as a function of the speed of the agitator used to stir the lime slurry in the reactor, for a reaction carried out at 30 psig and 100 F using a gas stream entering the carbonation reactor which contains 20% carbon dioxide by volume.

The reaction rate was measured by titration of the lime slurry at regular intervals. The experimental data is given in Table 10. As indicated in FIG. 30, with increased agitation, the reaction rate of carbonation increased three-fold from about 2.0 grams per liter per minute of calcium hydroxide consumption to about 6.0 grams per liter per minute of calcium hydroxide consumption. Importantly, under pressure carbonation conditions of 30 psig, with increased agitation, the carbonation efficiency increased from a low of 35.0% to a high of 99.6%, as indicated in FIG. 31. As shown in FIG. 32, the particle surface area of PCC manufactured under pressure carbonation conditions of 30 psig increased from a low of 21,900 cm²/g as measured by Blaine, to about to 43,400 cm²/g.

TABLE 10

The Effect of Agitation on Reaction Rate, Carbonation Efficiency, and Surface Area.

| Batch # | RPM | Reaction Rate | Carbonation Efficiency (%) | Surface Area (cm²/g) |
|---|---|---|---|---|
| 155 | 400 | 2.0 | 35.619 | 21,900 |
| 156 | 750 | 4.3 | 73.574 | 27,400 |
| 157 | 1100 | 5.2 | 91.592 | 35,100 |
| 158 | 1800 | 5.8 | 102.000 | 43,400 |
| 159 | 1500 | 6.0 | 99.600 | 32,600 |

Example 8

Preparation of Sclenohedral PCC

A slaked lime slurry having a concentration of 246 grams per liter of slurry was placed in the 2-liter pressurized reaction vessel described above. A gas mixture of 20% carbon dioxide/80% nitrogen was bubbled through the reactor. The initial carbonation reaction temperature was at 100° F. The pressure in the carbonation reaction vessel was maintained at 30 psig. The PCC manufactured under such pressurized carbonation conditions had the following characteristics:

| | |
|---|---|
| Particle Surface Area (Blaine method): | 28,200 cm²/gram |
| Brightness: | 96.7 GE |
| Crystal Habit: | Sclenohedral (calcite) |

Figure 2:
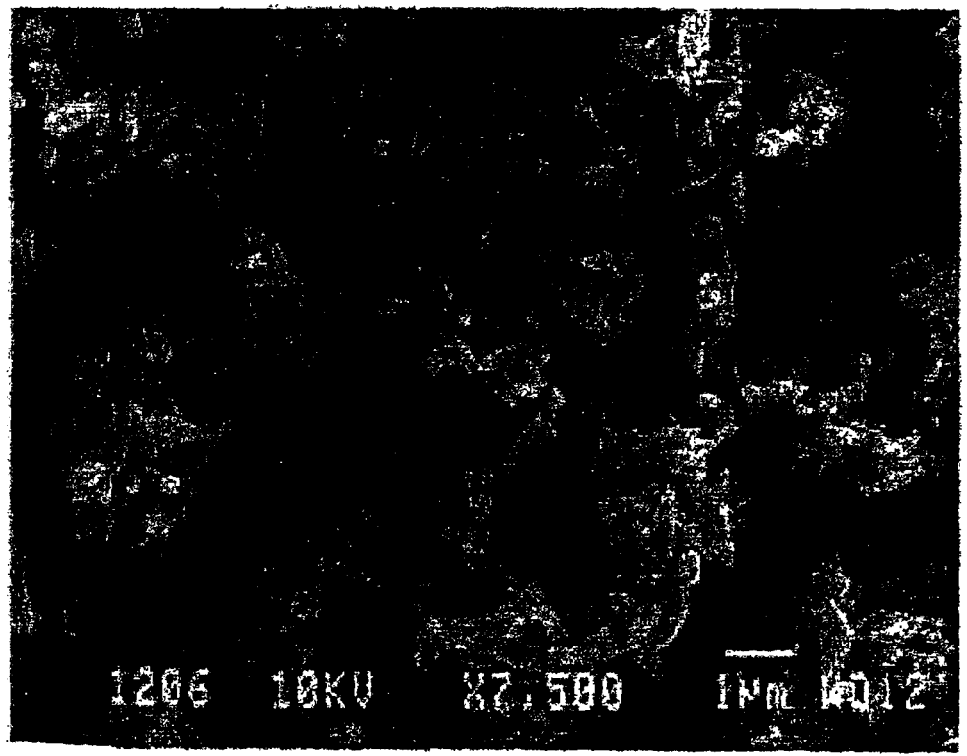
FIG. 2 is a photograph of the sclenohedral crystals of precipitated calcium carbonate obtained in the process of the present invention; the photographs were taken with a scanning electron microscope (SEM).

The scanning electron micrograph for this scalenohedral PCC product is shown in FIG. 2. Among other uses, these PCC particles are useful as fillers in paper and paper boards.

Example 9

Preparation of Rhombohedral PCC with ~1:1 Aspect Ratio (Controlled Isothermal Conditions)

A slaked lime slurry having a concentration of 87 grams per liter of calcium hydroxide slurry (expressed as calcium carbonate) was placed in the 2-liter pressurized reaction vessel described above. A gas mixture of 20% carbon dioxide/80% nitrogen was bubbled through the reactor. The initial carbonation reaction temperature was at 68° F. The increase of reaction temperature was limited to 4.0° F. by circulating cooling water through the reactor. The pressure in the reaction vessel during pressure carbonation was maintained at 20 psig. The PCC manufactured under such pressurized carbonation conditions had the following characteristics:

| | |
|---|---|
| Particle Surface Area (Blaine method): | 40,900 cm²/gram |
| Brightness: | 92.1 GE |
| Aspect Ratio: | ~1:1 |

Figure 3:
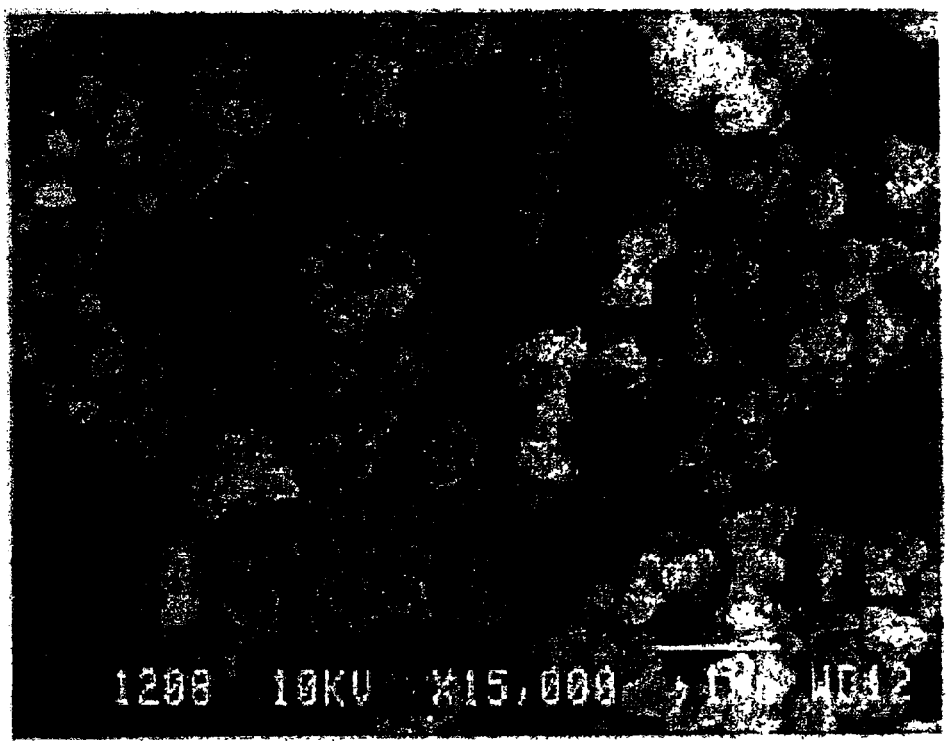
FIG. 3 is a photograph of the rhombohedral crystals of precipitated calcium carbonate obtained in the process of the present invention, where the crystals have an aspect ratio of approximately 1:1; the photographs were taken with a scanning electron microscope (SEM).

The scanning electron micrograph for this rhombohederal PCC product is shown in FIG. 3. Among other uses, these PCC particles can be effectively used for both filler and as coating material for paper.

Example 10

Preparation of Rhombohedral PCC with ~1:1.5+ Aspect Ratio

By manipulation of process variables, PCC with various aspect ratios can easily and reliably be produced using the pressurized carbonation process disclosed herein. Aspect ratio is the ratio of crystal breadth to crystal length, and is considered a semi-qualitative number. To produce rhombohedral PCC with an aspect ratio of 1:1.5, a slaked lime slurry having a concentration of 116 grams per liter of calcium hydroxide (expressed as calcium carbonate) was placed in the 2-liter pressurized reaction vessel described above. A gas mixture of 20% carbon dioxide/80% nitrogen was bubbled through the reactor. The initial carbonation reaction temperature was at 50° F. The reaction was carried out under isothermal conditions, and thus, heat generated by the exothermic nature of the reaction was removed by circulating cooling water to maintain the reactor temperature. The pressure in the reaction vessel during pressure carbonation was maintained at 30 psig. The PCC manufactured under such pressurized carbonation conditions had the following characteristics:

| | |
|---|---|
| Particle Surface Area (Blaine method): | 21,500 cm²/gram |
| Brightness: | 98.6 GE |
| Aspect Ratio: | ~1:1.5+ |

Figure 4:
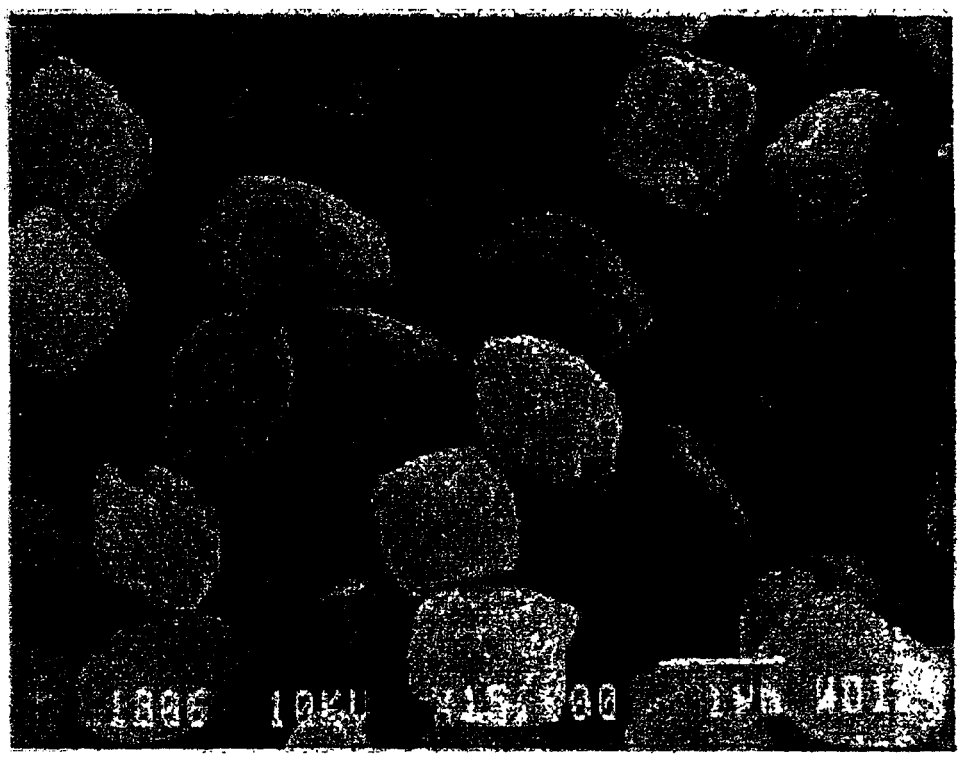
FIG. 4 is a photograph of the rhombohedral crystals of precipitated calcium carbonate obtained in the process of the present invention, where the crystals have an aspect ratio of approximately 1:1.5; the photographs were taken with a scanning electron microscope (SEM).

The scanning electron micrograph for this rhombohederal PCC product is shown in FIG. 4. Among other uses, these rhombohederal PCC particles can be effectively used for both filler and in coating formulations for paper.

Example 11

Preparation of "Stacked" Rhombohedral PCC

By manipulation of process variables, a unique "stacked" PCC crystal structure can be reliably produced using this pressurized carbonation process. To produce stacked rhombohedral PCC, a slaked lime slurry having a concentration of 32 grams per liter of calcium hydroxide (expressed as calcium carbonate) was placed in the 2-liter pressurized reaction vessel described above. A gas mixture of 25% carbon dioxide/75% nitrogen was bubbled through the reactor. The initial carbonation reaction temperature was at 73° F. The carbonation pressure was maintained at 70 psig. The reaction yielded a PCC with the following characteristics:

| | |
|---|---|
| Particle Surface Area (Blaine method): | 16,400 cm$^2$/gram |
| Brightness: | 87.3 GE |
| Crystal Structure: | stacked rhombohedral |

Figure 5:
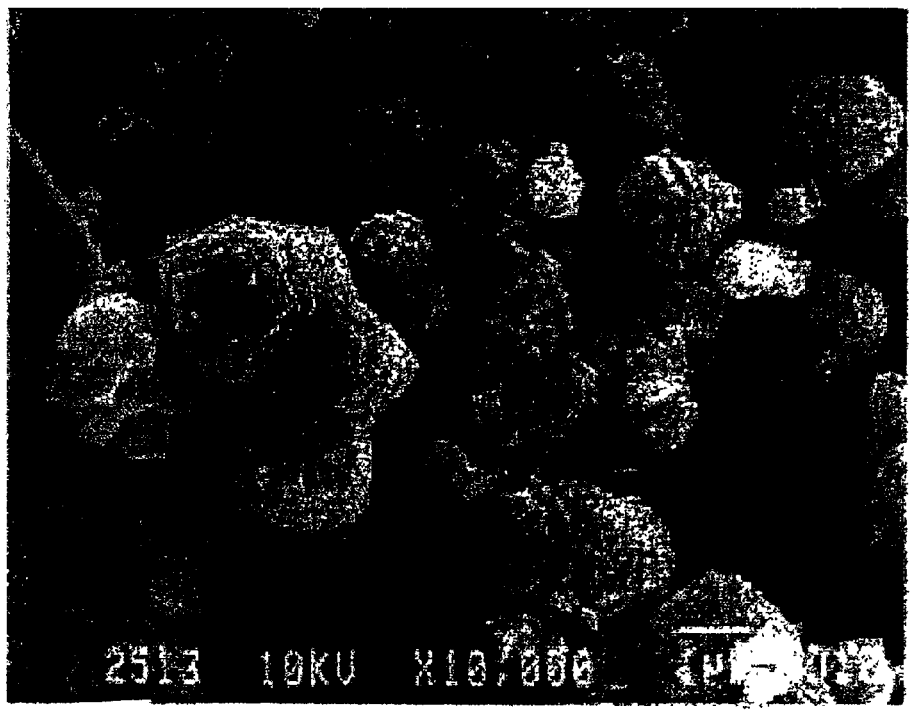
FIG. 5 is a photograph of the stacked rhombohedral crystals of precipitated calcium carbonate obtained in the process of the present invention; the photographs were taken with a scanning electron microscope (SEM).

The scanning electron micrograph for this rhombohederal PCC product is shown in FIG. 5. The pressure carbonation conditions just described provide this unique stacked rhombohedral crystal structure. Among other uses, these stacked rhombohederal PCC particles can be especially useful in coating.

Example 12

Preparation of Aragonite PCC

When desired, aragonite crystal habit PCC crystal structure can be reliably produced using the pressurized carbonation process disclosed. To produce aragonite PCC, a slaked lime slurry having a concentration of 229 grams per liter of calcium hydroxide slurry (expressed as calcium carbonate) was placed in the 2-liter pressurized reaction vessel described above. A gas mixture of 25% carbon dioxide/75% nitrogen by volume was bubbled through the reactor. The initial carbonation reaction temperature was at 120° F. The carbonation pressure was maintained at 70 psig. The reaction yielded a PCC with the following characteristics:

| | |
|---|---|
| Particle Surface Area (Blaine method): | 23,500 cm$^2$/gram |
| Brightness: | 95.0 GE |
| Crystal Habit: | aragonite |

Figure 6:
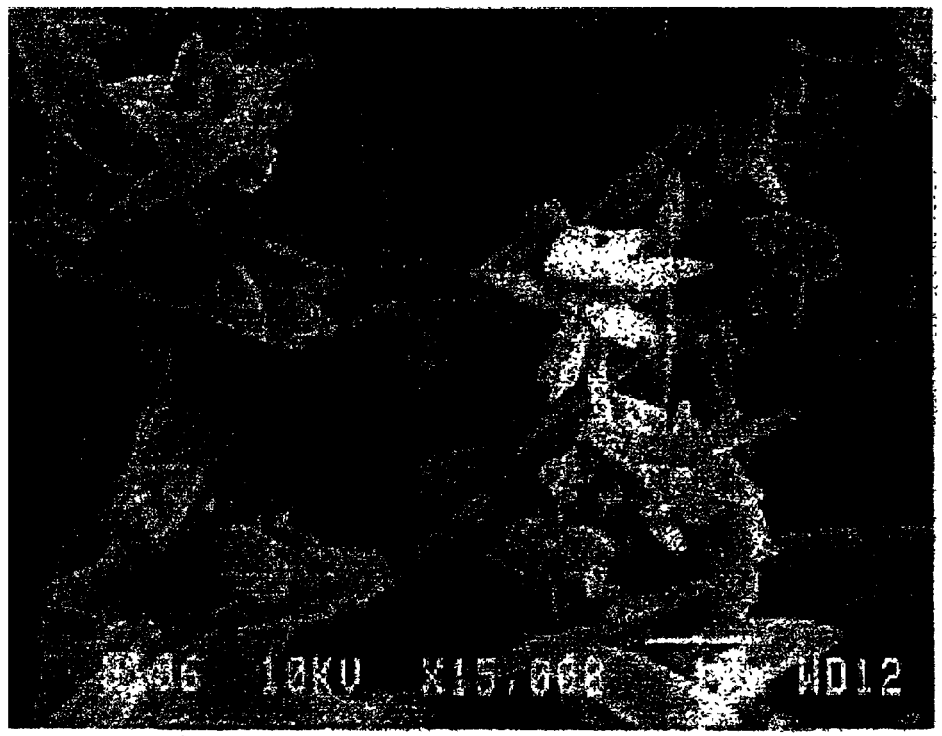
FIG. 6 is a photograph of the aragonite crystals of precipitated calcium carbonate obtained in the process of the present invention; the photographs were taken with a scanning electron microscope (SEM).

The scanning electron micrograph for this aragonite PCC product is shown in FIG. 6. The pressure carbonation conditions just described provide this aragonite crystal structure. Among other uses, these aragonite PCC particles can be useful in filler for paper.

EXAMPLES OF CALCIUM SILICATE HYDRATES

Example 13

Manufacture of Multiple Phase Silicate Hydrates (5XPC 12)

Initially, 135.09 grams of ½" rotary pebble lime (from Mississippi Lime Co.) was accurately weighed and slaked in 410 milliliters of de-ionized water. The slaking reaction is exothermic and caused the slurry temperature to rise to near boiling. When the slurry temperature was very near boiling and before much of the water had evaporated, an additional 1190 milliliters of water was added to both dilute and cool the slurry. The slurry was then agitated for 30 minutes to insure slaking completion before being screened through a 140 mesh screen. The slurry was then transferred to the 5 liter autoclave described above and tested for lime availability in accordance with ASTM method C25. Approximately 109.6 grams of fine fluxed calcined diatomaceous earth (FCDE) was weighed and added to 750 ml of hot water (concentration of ~1.22 lb/gallon). The silica slurry was heated for approximately 10 min, to near boiling, then added to the screened and tested lime slurry. The exact amount of silica slurry added to lime slurry was determined by the lime availability such that a mol ratio of ~1.35 mol CaO/SiO$_2$ would be maintained. The total slurry volume was also adjusted to a final concentration of 0.425 lb/gallon. The autoclave was continuously agitated at a constant speed of 338 rpm. The reactor was heated for approximately 100 min in order to reach the target temperature of 473° F. The temperature was maintained at 473° F. for 2 hours, after which, the "quenching" water was flushed through the cooling coil built inside the autoclave. This cooling process was maintained until the inside vessel temperature reached approximately 176° F. (roughly 30 min), at which point, the vessel was opened and the reaction products were transferred to a holding vessel for storage. A portion of the resultant slurry was dried in a 221° C. oven for 12 hours. During the drying process, the slurry formed hard lumps, which had to be broken up through the use of a mortar and pestle. The now powdered, dry product was brushed through a 140 mesh screen to insure product uniformity when testing. The pigment in this example was designated 5XPC 12. The tests carried out on the dry powder were as follows:

1) X-ray diffraction analysis
2) Scanning Electron Micrograph (S.E.M.)
3) Brightness
4) Percent Water Absorption
5) Air Permeability (time in sec by Blaine Method)
6) Bulk Density (weight in grams by Blaine Method)
7) pH For the air permeability test, two numbers are reported. The first is the weight in grams of powder required to fill the capsule and is an indication of the "bulk density" of the powder. The second is the time in seconds for a controlled volume of air to pass through the compressed powder inside the capsule and is an approximate measure of the "structure" of the particle.

The process conditions are given in Table 11 and the pigment properties are given in Table 12.

TABLE 11

| | Process conditions of 5XPC 12 | | | | |
|---|---|---|---|---|---|
| Batch # | Mol Ratio (CaO/SiO$_2$) | Concentration (lb/gallon) | Temperature (° F.) | Average Pressure (psi) | Reaction Time (hours) |
| 5XPC 12 | 1.35 | 0.425 | 473 | 456 | 2.0 |

TABLE 12

Pigment Properties of 5XPC 12

| Batch # | GE Brightness (% reflectance) | Water Absorption (%) | Air Permeability Blaine Wt. (g) | Air Permeability Blaine time (sec.) |
|---|---|---|---|---|
| 5XPC 12 | 96.4 | 880 | 0.35 | 81.8 |

The x-ray diffraction pattern of this novel, multiphase calcium silicate hydrate is given in FIG. 33. This product (identified as 5XPC 12) gave a unique x-ray pattern. The pattern indicated that the powder had at least one major phase and at least one minor phase. The summary of the characteristic "peaks" is shown in Table 13.

The major peaks for phase I were found to indicate the presence of calcium silicate hydroxide—Foshagite—($Ca_4(SiO_3)_3(OH)_2$) with major peaks at d(Å)=2.97, d(Å)=2.31 and a minor peak at d(Å)=5.05. For phase II, the x-ray diffraction pattern indicated the presence of calcium silicate hydrate—Xonotlite—($Ca_6Si_6O_{17}(OH)_2$) with major peaks at d(Å)=3.107, d(Å)=1.75 and a minor peak at d(Å)=3.66. Thus I obtained a novel composition of matter, which was a combination Foshagite and Xonotlite fibrous structure, intertwined into a haystack structure. One of the significant novelties of this invention is that we obtained this structure from a single reaction.

TABLE 13

X-ray diffraction peak summary for 5XPC 12

| Common Name | Crystallochemical Formula | d-spacing (Major) | d-spacing (median) | d-spacing (Minor) |
|---|---|---|---|---|
| Foshagite (Phase I) | $Ca_4(SiO_3)_3(OH)_2$ (Major) | d = 2.97 Å | d = 2.31 Å | d = 5.05 Å |
| Xonotlite (Phase II) | $Ca_6Si_6O_{17}(OH)_2$ (Minor) | d = 3.107 Å | d = 1.75 Å | d = 3.66 Å |

The S.E.M. pictures at 7,500 times and 1,500 times magnification are given in FIGS. 8 and 9, respectively. The high magnification S.E.M. clearly shows the "fibrous" structure of foshagite and a small fraction of "rod" or "ribbon" like, tubular structures of xonotlite. The diameter of the foshagite "fibers" ranges from 0.1 to 0.2 microns while the length ranges from 1 to 5 microns. The xonotlite particles had diameters in the range of 0.1 to 0.3 microns and a length in the range of 1 to 3 microns.

The low magnification S.E.M. depicts the three dimensional structure of the secondary particles of calcium silicate hydrates. The structure appears to have been formed by an interlocking of the primary "fibrous" crystals and some inter-fiber bonding due to hydrogel of silica formed during the initial stages of hydro-thermal reaction. Because of these two main reasons, the secondary particles are fairly stable and do not significantly lose their 3-d structure when subjected to process shear. In addition, these particles also seem to withstand the pressure encountered during the calendering or finishing operations integral to papermaking. The median size of the secondary particles as seen, ranges from 10 to about 40 microns.

In order to evaluate this pigment in paper, handsheets were prepared for evaluation. Handsheets were prepared using the 5XPC 12 product sample in order to evaluate the papermaking characteristics of the pigment. The procedure included preparation of a standard pulp slurry made up of 75% hardwood and 25% softwood. Both pulp sources were beaten separately, in a Valley Beater, to a specific Canadian Standard Freeness of 450±10 in accordance with TAPPI test methods T-200 and T-227. Handsheets were formed from the prepared stock, on a 6" British handsheet mold, in accordance with TAPPI test method T-205. The exceptions to the standard method were as follows. Since the goal of producing these handsheets was to test filler performance, some filler was incorporated into the handsheets at various replacement levels (usually 15%, 20%, and 25%). In order to achieve comparability between different levels, a constant basis weight was achieved via a reduction in fiber content. Thus, a 25% filled sheet would contain only 75% of the fiber that the unfilled sheet had. The next variation on the standard test method was the addition of retention aid. A retention aid (Percol 175) was added to hold the filler in the sheet until the sheet had dried completely. All other handsheet formation components were kept consistent with TAPPI test method T-205.

The handsheets were tested in accordance with TAPPI test method T-220, with one exception. Instead of using a 15 mm sample for testing tensile, a 25.4 nm sample was used and the tensile index calculations were altered accordingly. The handsheets were ashed in accordance with TAPPI test method T-211.

Paper handsheets were tested for the following properties:

1. Opacity

2. Sheet Scattering Coefficient

3. Filler Scattering Coefficient

4. Brightness

5. Sheet Bulk (Basis Weight/Caliper ratio)

6. Sheet Stiffness

7. Sheet Porosity

8. Sheet Smoothness

9. Sheet Tensile Index

A standard alkaline filler, precipitated calcium carbonate (SMI Albacar HO), was used as a reference material to gauge product performance. The results of the handsheet evaluation are given in Tables 14 through 17.

TABLE 14

Optical property performance of handsheets containing 20% (interpolated) 5XPC 12 and pulp only.

| Pigment | Brightness (ISO) | Opacity (ISO) | Sheet Scattering Coefficient (cm$^2$/g) | Filler Scattering Coefficient (cm$^2$/g) |
|---|---|---|---|---|
| 5XPC 12 | 90.56 | 90.88 | 835.21 | 3077.24 |
| Pulp Only | 85.73 | 73.19 | 274.8 | NM |
| Improvement over pulp | +5.6% | +24.2% | +203.9% | — |

TABLE 15

Strength property performance of handsheets containing 20% (interpolated) 5XPC 12 and pulp only.

| Pigment | Stiffness (Gurley Units) | Bulk (cm$^3$/g) | Porosity (sec/100 cc air) |
|---|---|---|---|
| 5XPC 12 | 150.74 | 1.73 | 64.91 |
| Pulp Only | 137.15 | 1.40 | 51.94 |
| Improvement over pulp | +9.9% | +23.3% | +25.0% |

TABLE 16

Optical property performance of handsheets containing 20% (interpolated) 5XPC 12 and 20% (interpolated) PCC.

| Pigment | Brightness (ISO) | Opacity (ISO) | Sheet Scattering Coefficient (cm$^2$/g) | Filler Scattering Coefficient (cm$^2$/g) |
|---|---|---|---|---|
| 5XPC 12 | 90.56 | 90.88 | 835.12 | 3077.24 |
| PCC | 90.44 | 88.69 | 709.84 | 2474.48 |
| Improvement over PCC | Even | +2.47% | +17.66% | +24.36% |

TABLE 17

Strength property performance of handsheets containing 20% (interpolated) of 5XPC 12 and 20% (interpolated) PCC.

| Pigment | Bulk (cm$^3$/g) | Porosity (sec/100 cc air) | Stiffness (Gurley Units) | Tensile Index (Nm/g) |
|---|---|---|---|---|
| 5XPC 12 | 1.73 | 64.91 | 150.74 | 31.17 |
| PCC | 1.55 | 22.24 | 107.54 | 27.95 |
| Improvement over PCC | +11.56% | +191.9% | +40.17% | +11.53% |

Example 14

(5XPC—27 Pigment Sample)

This novel, multiphase calcium silicate hydrate of was formed by hydrothermal reaction of lime and silica. The CaO/SiO$_2$ mol ratio used for this new product was ~0.85, the final slurry concentration was ~0.75 lb/gallon, the reaction temperature was 374° F., and the reaction time was 2.5 hours. A summary of these conditions is given in Table 18.

TABLE 18

Process conditions of 5XPC 27

| Batch # | Mol Ratio (CaO/SiO$_2$) | Concentration (lb/gallon) | Temperature (° F.) | Average Pressure (psi) | Reaction Time (hours) |
|---|---|---|---|---|---|
| 5XPC 27 | 0.85 | 0.75 | 374 | 163.5 | 2.5 |

The resulting calcium silicate hydrate of was tested for pigment brightness, water absorption, Blaine air permeability and density, and pH. Both X-ray diffraction and Scanning Electron Micrograph analyses were also performed on this product. The pigment properties are given in Table 19. The pigment was evaluated for its performance in paper by incorporating it into handsheets as in example 13. The results of the handsheet work are given in Tables 21 through 24. The X-ray diffraction pattern is given in FIG. 34. The S.E.M. pictures at 10,000 and 2000 times magnification are given in FIGS. 10 and 11, respectively.

The calcium silicate hydride formed under these conditions had substantially lower brightness and water absorption characteristics than TiSil™ brand calcium silicate hydrate (CSH) set forth in Example 13. However, it gave much higher sheet bulk, sheet stiffness, and sheet air permeability characteristics. The pigment properties of the novel 5XPC 27 pigment are given in Table 19. It appears that this product provided a much higher sheet bulk. Also, the sheet permeability of this new product was higher than the foshagite-xonotlite complex as described in Example 13.

TABLE 19

Pigment Properties of 5XPC 27

| Batch # | G.E. Brightness (% reflectance) | Water Absorption (%) | Air Permeability Blaine Wt. (g) | Air Permeability Blaine time (sec.) |
|---|---|---|---|---|
| 5XPC 27 | 91.2 | 360 | 0.5 | 17.0 |

As the mole ratio of CaO/SiO$_2$ was reduced to ~0.85 and the reaction temperature was lowered to 374° F., I discovered another unique and useful multiple phase calcium silicate hydrate material with a distinct and unique X-ray diffraction pattern. The X-ray diffraction analysis revealed this product to be a mixture of Riversidite [Ca$_5$Si$_6$O$_{16}$(OH)$_2$] and Xonotlite [Ca$_6$Si$_6$O$_{17}$(OH)$_2$]. The X-ray diffraction pattern is given in FIG. 34. The pattern indicated that the powder had at least one major phase and at least one minor phase. The peak summary is shown in Table 20.

TABLE 20

X-ray diffraction peak summary for 5XPC 27

| Common Name | Crystallochemical Formula | d-spacing (Major) | d-spacing (Median) | d-spacing (Minor) |
|---|---|---|---|---|
| Riversideite (Phase I) | Ca$_5$Si$_6$O$_{16}$(OH)$_2$ (Major) | d = 3.055Å | d = 3.58Å | d = 2.80Å |
| Xonotlite (Phase II) | Ca$_6$Si$_6$O$_{17}$(OH)$_2$ (Minor) | d = 3.056Å | d = 4.09Å | d = 2.50Å |

The major peaks for phase I were found to indicate the presence of calcium silicate hydrate—Riversideite—(Ca$_5$Si$_6$O$_{16}$(OH)$_2$) with major peaks at d(Å)=3.055, d(Å)= 3.58 and a minor peak at d(Å)=2.80. For phase II, the pattern indicated the presence of calcium silicate hydroxide—xonotlite—(Ca$_6$Si$_6$O$_{17}$(OH)$_2$) with major peaks at d(Å)= 3.056, d(Å)=4.09 and a minor peak at d(Å)=2.50. The pigment also contained trace amounts of calcite (CaCO$_3$). The other portion of the slurry was tested for the pigment performance as a filler in paper. The paper was formed into handsheets and tested using the procedures described in example 13.

The S.E.M. pictures at 10,000 times and 2000 times are given in FIGS. 10 and 11. As can be seen in the 10,000× magnification photograph, the product is unlike the previous example. The calcium silicate hydrate mixture has fibrous and non-fibrous composition joined possibly by an amorphous portion of silica hydrogel formed during the initial phase of hydro-thermal reaction.

The 2000× magnification indicates the formation of an irregular globular particle formed by the fibrous intergrowth of a series of primary fibrous crystals. The particle size is in the range of 10–30 microns and the crystals seem to have grown randomly.

This multi-phase (primarily Riversideite and Xonotlite) calcium silicate hydrate gave lower brightness value than that of Example 13. More significantly, this material gave a much lower water absorption (around 360% to about 400%) as well.

To evaluate performance in paper, handsheets were formed using this pigment and then tested as in Example 13. The paper performance results are shown in Tables 21 through 24. This product, compared to pulp only, gave substantially higher stiffness and sheet bulk. Unlike the pigment provided in Example 13, (where Foshagite was the primary component), this second pigment (where Riversideite and Xonotlite are present) combination produced a much more open sheet, as shown by the low Gurley porosity numbers. The optical properties, like brightness, opacity and scattering coefficient of the sheet decreased.

Comparing the performance of this second pigment (with predominantly Riversidite as the major component and Xonotlite as the minor component present) with an alkaline filler, such as precipitated calcium carbonate, the sheet stiffness and bulk improved dramatically. The optical properties (sheet opacity, sheet brightness, etc.)of the handsheets decreased, however. The decreased optical properties of this new multiphase product, were clearly due to the large particle size and irregular globular structure as seen in the S.E.M. pictures.

TABLE 21

Optical property performance of handsheets containing 20% (interpolated) 5XPC 27 and pulp only.

| Pigment | Brightness (ISO) | Opacity (ISO) | Sheet Scattering Coefficient (cm²/g) | Filler Scattering Coefficient (cm²/g) |
|---|---|---|---|---|
| 5XPC 27 | 87.86 | 83.35 | 449.12 | 1092.42 |
| Pulp Only | 85.19 | 74.97 | 292.1 | N/A |
| Improvement over pulp | +3.1% | +11.2% | +53.8% | — |

TABLE 22

Strength property performance of handsheets containing 20% (interpolated) 5XPC 27 and pulp only.

| Pigment | Stiffness (Gurley Units) | Bulk (cm³/g) | Porosity (sec/100 cc air) |
|---|---|---|---|
| 5XPC 27 | 225.87 | 2.46 | 3.92 |
| Pulp Only | 136.68 | 1.47 | 33.5 |
| Improvement over pulp | +65.2% | +68.0% | −88.3% |

TABLE 23

Optical property performance of handsheets containing 20% (interpolated) 5XPC 27 and 20% (interpolated) PCC.

| Pigment | Brightness (ISO) | Opacity (ISO) | Sheet Scattering Coefficient (cm²/g) | Filler Scattering Coefficient (cm²/g) |
|---|---|---|---|---|
| 5XPC 27 | 87.86 | 83.35 | 449.12 | 1092.42 |
| PCC | 90.21 | 89.39 | 738.55 | 2546.03 |
| Improvement over PCC | −2.6% | −6.76% | −39.19% | −57.09% |

TABLE 24

Strength property performance of handsheets containing 20% (interpolated) of 5XPC 27 and 20% (interpolated) PCC.

| Pigment | Stiffness (Gurley Units) | Bulk (cm³/g) | Porosity (sec/100 cc air) | Tensile Index (Nm/g) |
|---|---|---|---|---|
| 5XPC 27 | 225.87 | 2.46 | 3.92 | 29.67 |
| PCC | 102.11 | 1.65 | 13.23 | 24.77 |
| Improvement over PCC | +121.19% | +49.22% | −70.39% | +19.79% |

Thus, this multiphase combination of calcium silicate hydrate was most useful in improving sheet stiffness and sheet bulk. It was also excellent for "opening up" the sheet (lowering the Gurley porosity) for more "breathing." Due to its excellent stiffness, this product is referred to as "StiSil™ brand calcium silicate hydrate (CSH)."

Example 15

Manufacture of Multiple Phase Silicate Hydrates (XPC 294)

Initially, 39.5 grams of ½" rotary pebble lime (Mississippi Lime Co.) was accurately weighed and slaked in 410 milliliters of de-ionized water. The slaking reaction is exothermic and the lime was therefore added in 12 equal parts over the course of 1 hour. This kept the temperature of the water near the initial temperature of 60° C. throughout the slaking process. When the slaking process was complete, the lime was screened through a 140 mesh screen. The slurry was then transferred to the 2-liter autoclave described above and tested for lime availability in accordance with ASTM method C25. Approximately 31.1 grams of fine fluxed calcined diatomaceous earth (FCDE) was weighed and added to 990 ml of hot water (concentration of ~1.22 lb/gallon). The silica slurry was heated for approximately 10 min, to near boiling, then added to the screened and tested lime slurry. The exact amount of silica slurry added to lime slurry was determined by the lime availability such that a mol ratio of 1.33 mol $CaO/SiO_2$ would be maintained. The total slurry volume was also adjusted to a final concentration of 0.42 lb/gallon. The high pressure vessel was then closed, sealed, and connected to an automated heating/cooling control system (RX 330). The contents of the autoclave were under constant agitation via the magnetic drive motor mentioned above.

The reactor was heated for approximately 60 minutes in order to reach the target temperature of 473° F. The temperature was maintained at 473° F. for 2 hours, after which, the "quenching" water was flushed through the cooling coil built inside the autoclave. This cooling process was maintained until the inside vessel temperature reached approximately 176° F. (approximately 30 min). At which point, the vessel was opened and the reaction products were transferred to a holding vessel for storage. From this point, the slurry was treated exactly as in example 13 above.

The process conditions are given in Table 25 and the pigment properties are given in Table 26.

TABLE 25

Process conditions of XPC 294

| Batch # | Mol Ratio ($CaO/SiO_2$) | Concentration (lb/gallon) | Average Temperature (° F.) | Average Pressure (psi) | Reaction Time (hours) |
|---|---|---|---|---|---|
| XPC 294 | 1.33 | 0.42 | 458 | 456 | 2.0 |

TABLE 26

Pigment Properties of XPC 294

| Batch # | GE Brightness (% reflectance) | Water Absorption (%) | Air Permeability Blaine Wt. (g) | Air Permeability Blaine time (sec.) |
|---|---|---|---|---|
| XPC 294 | 96.7 | 760 | 0.35 | 88.8 |

In order to evaluate this pigment in paper, handsheets were prepared in the same manner as in example 13 above. The results of the handsheet evaluation are given in Tables 27 through 30.

TABLE 27

Optical property performance of handsheets containing 20% (interpolated) XPC 294 and pulp only.

| Pigment | Brightness (ISO) | Opacity (ISO) | Sheet Scattering Coefficient ($cm^2/g$) | Filler Scattering Coefficient ($cm^2/g$) |
|---|---|---|---|---|
| XPC 294 | 88.31 | 90.97 | 767.59 | 2735.33 |
| Pulp Only | 81.42 | 75.39 | 274.80 | NM |
| Improvement over pulp | +8.5% | +20.7% | +179.4% | — |

TABLE 28

Strength property performance of handsheets containing 20% (interpolated) XPC 294 and pulp only.

| Pigment | Stiffness (Gurley Units) | Bulk ($cm^3/g$) | Porosity (sec/100 cc air) |
|---|---|---|---|
| XPC 294 | 173.40 | 1.94 | 30.12 |
| Pulp Only | 140.85 | 1.62 | 18.92 |
| Improvement over pulp | +23.1% | +19.8% | +59.2% |

TABLE 29

Optical property performance of handsheets containing 20% (interpolated) XPC 294 and 20% (interpolated) FCC.

| Pigment | Brightness (ISO) | Opacity (ISO) | Sheet Scattering Coefficient ($cm^2/g$) | Filler Scattering Coefficient ($cm^2/g$) |
|---|---|---|---|---|
| XPC 294 | 88.31 | 90.97 | 767.59 | 2735.33 |
| PCC | 88.15 | 88.86 | 666.37 | 2245.67 |
| Improvement over PCC | Even | +2.38% | +15.2% | +21.8% |

TABLE 30

Strength property performance of handsheets containing 20% (interpolated) of XPC 294 and 20% (interpolated) PCC.

| Pigment | Bulk ($cm^3/g$) | Porosity (sec/100 cc air) | Stiffness (Gurley Units) | Tensile Index (Nm/g) |
|---|---|---|---|---|
| XPC 294 | 1.94 | 30.12 | 173.40 | 30.86 |
| PCC | 1.71 | 11.12 | 111.56 | 27.09 |
| Improvement over PCC | +13.37% | +170.9% | +55.4% | +13.9% |

Example 16

(XPC-258 Pigment Sample)

This novel, multiphase calcium silicate hydrate was formed similar to example 14, with the following differences. The CaO/SiO$_2$ mol ratio used for this new product was 0.76, the final slurry concentration was about 0.75 lb/gallon, the reaction temperature was 370° F., and the 2-liter reactor was used instead of the 5-liter. A summary of the process conditions is given in Table 31.

TABLE 31

Process conditions of XPC 258

| Batch # | Mol Ratio (CaO/SiO$_2$) | Concentration (lb/gallon) | Average Temperature (° F.) | Average Pressure (psi) | Reaction Time (hours) |
| --- | --- | --- | --- | --- | --- |
| XPC 258 | 0.76 | 0.75 | 365 | 154 | 2 |

The pigment properties are given in Table 32. This pigment was also evaluated for its performance in paper by incorporating it into handsheets as in example 14. The results of the handsheet work are given in Tables 33 and 34. This multi-phase (primarily Riversideite with some Xonotlite) calcium silicate hydrate gave lower brightness values than that of Example 15. More significantly, this material gave a much lower water absorption (around 360%–400%) as well.

This product, compared to pulp only, gave substantially higher stiffness and sheet bulk. Unlike the pigment provided in Example 15, (where foshagite is the primary component), this second pigment (where riversidite is the primary component) produced a much more open sheet, as shown by the low Gurley porosity numbers.

Comparing the performance of this second pigment (with predominantly riversidite and some xonotlite present) with an alkaline filler, such as precipitated calcium carbonate, the sheet stiffness and bulk improved dramatically.

TABLE 32

Pigment Properties of XPC 258

| Batch # | G.E. Brightness (% reflectance) | Water Absorption (%) | Air Permeability Blaine Wt. (g) | Air Permeability Blaine time (sec.) |
| --- | --- | --- | --- | --- |
| XPC 258 | 90.8 | 400 | 0.5 | 37.1 |

TABLE 33

Strength property performance of handsheets containing 20% (interpolated) XPC 258 and pulp only.

| Pigment | Stiffness (Gurley Units) | Bulk (cm$^3$/g) | Porosity (sec/100 cc air) |
| --- | --- | --- | --- |
| XPC 258 | 236.84 | 2.39 | 4.32 |
| Pulp Only | 144.56 | 1.62 | 28.82 |
| Improvement over pulp | +63.8% | +47.5% | −85.0% |

TABLE 34

Strength property performance of handsheets containing 20% (interpolated) of XPC 258 and 20% (interpolated) PCC.

| Pigment | Stiffness (Gurley Units) | Bulk ($cm^3/g$) | Porosity (sec/100 cc air) | Tensile Index (Nm/g) |
|---|---|---|---|---|
| XPC 258 | 236.84 | 2.39 | 4.32 | 23.72 |
| PCC | 102.96 | 1.69 | 14.89 | 25.31 |
| Improvement over PCC | +130.0% | +41.7% | −70.97% | −6.3% |

Thus, this multiphase combination of calcium silicate hydrate was most useful in improving sheet stiffness and sheet bulk. It was also excellent for "opening up" the sheet (lowering the Gurley porosity) for more "breathing." Due to its excellent stiffness, this product is referred to as "StiSil™ brand calcium silicate hydrate (CSH)."

Example 17

Varying Reaction Temperature (XPC 119)

Initially, 39.9 grams of pebble lime was weighed accurately and added slowly to 1.2 L of water in a beaker with constant agitation. The amount of lime, water, and the rate of lime addition were controlled in an effort to keep the slurry from boiling due to the exothermic nature of the lime slaking reaction. The slaked lime of $Ca(OH)_2$ was screened in a 200 mesh screen. The residual material was then discarded. The filtered $Ca(OH)_2$ slurry was tested by acidic titration to calculate the exact amount of available lime. The slaked lime was then transferred into a 2 liter autoclave. Then, 31.06 grams of fine fluxed calcined diatomaceous earth (FCDE) was added to 200 ml of water in order to produce a slurry of 0.1553 g/L concentration. This slurry was also preheated with constant stirring and brought to near boiling (near 212° F.). Next, the silica was added to the autoclave containing the hot slaked lime slurry. The total solids concentration of the $CaO+SiO_2$ slurry inside the autoclave, at this point was about 0.5 lbs/gallon. The mol ratio of lime to silica was 1.67 $CaO/SiO_2$. The high-pressure reactor was sealed and then heated by an externally, jacketed, electrical heating element.

The autoclave was constantly agitated at 600 RPM. The autoclave was heated until a preset temperature of 428° F. was reached. At that point the reaction conditions were held constant by a system controller, RX-330. The $CaO+SiO_2$ slurry was reacted at a temperature of 428° F. for 120 minutes. At the end of this time, the "quenching" water was passed through a cooling system built into the inside of the autoclave. Inside the pressure vessel, steam condensed and the temperature fell rapidly. The cooling water continued until the vessel reached approximately 176° F.

The silicate slurry was transferred into a holding beaker. The following describes the overall heating/cooling cycle:

Time to temperature~60 min
Time at temperature~120 min
Time for cooling~25 min

The slurry was tested as in example 13. The reaction conditions and pigment properties are given in Tables 35 and 36 respectively.

Example 18

Varying Reaction Temperature (XPC 107)

In this example, all the reaction conditions and parameters were identical to example 17 above, except the reaction temperature was raised from 428° F. to 451° F. The resultant calcium silicate hydrate complex was then tested as per the above-described test program and the resultant reaction conditions and pigment properties are given in Tables 35 and 36 respectively.

Example 19

Varying Reaction Temperature (XPC 124)

In this example, all of the reaction conditions and parameters were kept constant, as in example 15, except for reaction temperature. The reaction temperature was raised from 451° F. to 469° F. The calcium silicate hydrate complex formed was tested as in the above examples. The reaction conditions and pigment properties are given in Tables 35 and 36 respectively.

TABLE 35

Reaction conditions for XPCs 119, 107, and 124.

| Example # | Batch ID | Mole Ratio ($CaO/SiO_2$) | Conc. (lbs/gal) | Temp (degrees F.) | Reaction Time (hours) |
|---|---|---|---|---|---|
| Example 17 | XPC 119 | 1.67 | 0.7 | 428.0 | 2 |
| Example 18 | XPC 107 | 1.67 | 0.7 | 451.0 | 2 |
| Example 19 | XPC 124 | 1.67 | 0.7 | 469.0 | 2 |

TABLE 36

Pigment properties for XPCs 119, 107, and 124.

| Batch ID | Water Absorption (%) | Brightness (ISO) | Blaine Wt. (grams) | Blaine Time (sec.) | pH |
|---|---|---|---|---|---|
| XPC 119 | 440 | 94.2 | 0.5 | 94 | 11.6 |
| XPC 107 | 440 | 96.2 | 0.45 | 118.5 | 10.7 |
| XPC 124 | 580 | 94.9 | 0.35 | 94.9 | 11.5 |

Note that the mid range reaction temperature of 451° F. produced the highest brightness material

Example 20

Varying the CaO/SiO$_2$ Mol Ratio (XPC 277)

In this example, all the reaction parameters were kept constant, as in example 19, except for the CaO/SiO$_2$ mol ratio. The CaO/SiO$_2$ mol ratio was changed to 3.0. The concentration in the autoclave was adjusted by adding water to 0.4 lb/gal. The reaction was carried out for two hours and the autoclave was cooled and the product was handled as in example 15. The reaction temperature was kept constant at 439° F. The reaction mixture was agitated at a constant of 600 RPM. The final product was tested for key properties as in example 15 and the reaction conditions and key pigment properties are shown in Tables 37 and 38 respectively.

Example 21

Varying the CaO/SiO$_2$ Mol Ratio (XPC 279)

In this example, all the reaction parameters were kept constant as in example 20, except the CaO/SiO$_2$ mol ratio was changed to 1.90. The hydrothermal reaction was carried out using the same cycle of heating and cooling as in the previous examples and the final product was again tested for key pigment properties. The reaction conditions and key pigment properties are shown in Tables 37 and 38 respectively.

Example 22

Varying CaO/SiO$_2$ Mol Ratio (XPC 282)

Here again, the reaction parameters were all held constant, as in example 21, except for the CaO/SiO$_2$ mol ratio, which was changed to 1.34. The hydrothermal reaction was carried out using the same cycle of heating and cooling as in the previous examples and the final product was again tested for key pigment properties. The reaction conditions and key pigment properties are shown in Tables 37 and 38 respectively.

Note that a CaO/SiO$_2$ mole ratio of 1.34 produced a calcium silicate hydrate with the highest water absorption capability and highest brightness value.

Example 23

Varying Reaction Time (XPC 172)

In this example, all the process conditions were kept constant, as in example 15, except for the reaction time, which was lowered to 1 hour. The calcium silicate hydrate complex was tested as in the previous examples and the reaction conditions and key pigment properties are shown in Tables 39 and 40 respectively.

Example 24

Varying Reaction Time (XPC 173)

In this example, all the process conditions were kept constant, as in example 23, except for the reaction time, which was raised to 2 hours. The calcium silicate hydrate complex was tested as in the previous examples and the reaction conditions and key pigment properties are shown in Tables 39 and 40 respectively.

Example 25

Varying Reaction Time (XPC 174)

In this example, all the process conditions were kept constant, as in example 24, except for the reaction time, which was raised to 3 hours. The calcium silicate hydrate complex was tested as in the previous examples and the reaction conditions and key pigment properties are shown in Tables 39 and 40 respectively.

TABLE 37

Reaction conditions for XPCs 277, 279, and 282.

| Example # | Batch # | Mole Ratio (CaO/SiO$_2$) | Conc. (lbs/gal) | Temp. (degrees C.) | Reaction Time (hours) |
|---|---|---|---|---|---|
| Example 20 | XPC 277 | 2.86 | 0.4 | 439.0 | 2 |
| Example 21 | XPC 279 | 1.90 | 0.4 | 439.0 | 2 |
| Example 22 | XPC 282 | 1.34 | 0.4 | 439.0 | 2 |

TABLE 38

Pigment properties for XPCs 277, 279, and 282.

| Batch # | Water Absorption (%) | Brightness (ISO) | Blaine Wt. (grams) | Blaine Time (sec.) | pH |
|---|---|---|---|---|---|
| XPC 277 | 200 | 94.4 | 1.05 | 508 | 12.4 |
| XPC 279 | 240 | 90.3 | 0.75 | 116.3 | 11.8 |
| XPC 282 | 660 | 96.3 | 0.35 | 91.8 | 11.0 |

TABLE 39

Reaction conditions for XPCs 172, 173, and 174.

| Example # | Batch # | Mole Ratio (CaO/SiO$_2$) | Conc. (lbs/gal) | Temp. (degrees F.) | Reaction Time (hours) |
|---|---|---|---|---|---|
| Example 23 | XPC 172 | 1.67 | 0.7 | 451.0 | 1 |
| Example 24 | XPC 173 | 1.67 | 0.7 | 451.0 | 2 |
| Example 25 | XPC 174 | 1.67 | 0.7 | 451.0 | 3 |

TABLE 40

Pigment properties for XPCs 172, 173, and 174.

| Batch # | Water Absorption (%) | Brightness (ISO) | Blaine Wt. (grams) | Blaine Time (sec.) | PH |
|---|---|---|---|---|---|
| XPC 172 | 480 | 92.9 | 0.5 | 74 | 11.1 |
| XPC 173 | 520 | 96.1 | 0.45 | 108.5 | 11.0 |
| XPC 174 | 600 | 93.3 | 0.4 | 135.0 | 11.2 |

Note that a reaction time of 2 hours produced the highest brightness product. The longer reaction time of 3 hours produced the greatest water absorption values, but at a lower brightness.

Example 26

Varying CaO—SiO$_2$ Slurry Concentration (XPC 136)

In this example, all the reaction conditions were kept constant, as in Example 13, except for the CaO/SiO$_2$ slurry concentration, which was lowered to 0.4 lb/gallon. To start, 49.6 g of lime was slaked, screened, and titrated for available CaO. Then, 34.2 g of ultra-fine fluxed calcined diatomaceous earth was slurried. The fluxed calcined diatomaceous earth slurry was added to the lime slurry to give the mixture an initial CaO/SiO$_2$ mol ratio of 1.6. The reactants were then placed in a 2.0 liter autoclave and water was added to bring the final concentration of CaO+SiO$_2$ slurry up to 0.4 lb/gallon. The reaction temperature was set at 451° F. The autoclave was set and controlled using a temperature controller for both heating and cooling cycles as shown in FIG. 11. The silica-lime slurry was reacted at 451° F. for two hours. At the end of the reaction, the resulting calcium silicate hydrate was cooled by circulating water through the jacketed autoclave. The resulting mass was transferred to a holding beaker. The product was tested for the same key parameters and with the same methods as described in example 13. The reaction conditions and key pigment properties are shown in Tables 41 and 42, respectively.

Example 27

Varying CaO—SiO$_2$ Slurry Concentration (XPC 138)

In these reactions, all the reaction parameters were kept constant, as in example 26, except for the CaO+SiO$_2$ slurry concentration, which was raised to 0.6 lb/gallon. The product was tested as in Example 26 and the reaction conditions and key pigment properties are shown in Tables 41 and 42, respectively.

Example 28

Varying CaO—SiO$_2$ Slurry Concentration (XPC 140)

In this reaction, all the reaction parameters were kept constant, as in example 27, except for the CaO+SiO$_2$ slurry concentration, which was raised to 0.8 lb/gallon. The product was tested as in example 27 and the reaction conditions and key pigment properties are shown in Tables 41 and 42, respectively.

Example 29

Varying CaO—SiO$_2$ Slurry Concentration (XPC 141)

In this reaction, all the reaction parameters were kept constant, as in example 28, except for the CaO/SiO$_2$ slurry concentration, which was raised to 0.9 lb/gallon. The product was tested as in example 28 and the reaction conditions and key pigment properties are shown in Tables 41 and 42, respectively.

TABLE 41

Reaction conditions for XPCs 136, 138, 140, and 141.

| Example # | Batch # | Mole Ratio (CaO/SiO$_2$) | Conc. (lbs/gal) | Temp. (degrees C.) | Reaction Time (hours) |
|---|---|---|---|---|---|
| Example 26 | XPC 136 | 1.6 | 0.4 | 233 | 2 |
| Example 27 | XPC 138 | 1.6 | 0.6 | 233 | 2 |
| Example 28 | XPC 140 | 1.6 | 0.8 | 233 | 2 |
| Example 29 | XPC 141 | 1.6 | 0.9 | 233 | 2 |

TABLE 42

Pigment properties for XPCs 136, 138, 140, and 141.

| Batch # | Water Absorption (%) | Brightness (ISO) | Blaine Wt. (grams) | Blaine Time (sec.) | pH |
|---|---|---|---|---|---|
| XPC 136 | 480 | 93.9 | 0.45 | 93.7 | 11.4 |
| XPC 138 | 460 | 94.6 | 0.50 | 173.0 | 10.4 |
| XPC 140 | 560 | 96.7 | 0.35 | 75.1 | 10.7 |
| XPC 141 | 420 | 94.2 | 0.45 | 45.7 | 11.6 |

Note that the slurry concentration of 0.8 lb/gallon produced the highest brightness and the lowest bulk density.

Pressure Carbonation Process

Generally, it should also be noted that the pressure carbonation process for the production of PCC as described herein can be used with any convenient source of carbon dioxide, since the pressurization of the reactor advantageously increases the partial pressure of carbon dioxide to an extent that it can be economically exploited. It is to be appreciated that this process for the production of precipitated calcium carbonate is an appreciable improvement in the state of the art for on-site production of calcium carbonate. This novel process treats the manufacture of calcium carbonate in a manufacturing environment from a new perspective, to provide significantly improved production rates.

Calcium Silicate Hydrate (CSH)

The unique crystalline microfibres produced as a product of the reactions described herein exist, in one unique product, as bundles sized from about 10 to about 40 microns, typically occurring as haystacks or balls. Preferably, individual fibers are about 0.2 microns in the largest cross-sectional dimension, with lengths of up to 4 or 5 microns, so as to have a relatively large L/D ratio.

Importantly, the crystalline microfibers as just described have advantageous properties when utilized as a paper filler, particularly in uncoated groundwood, and in coated groundwood, in uncoated fine paper, and in coated fine paper. The aforementioned adsorptive properties help to adsorb printing ink in the papers. Also, it helps the paper sheet itself to absorb fines, so that it improves overall sheet retention during the papermaking process. Overall, final paper products exhibit improved porosity, improved smoothness, improved bulk, and improved stiffness. Also, brightness and opacity are maintained or improved. Moreover, the printability of the final product is significantly improved, due to the improved ink adsorption.

It is to be appreciated that the herein described unique, light, fluffy adsorptive calcium silicate hydrate products, and the method of producing the same, and the paper products produced using such products, each represent an appreciable improvement in the field of manufacture of paper.

The improved precipitated calcium carbonate manufacturing process and the novel calcium silicate hydrate manufacturing process, control of the pH, temperature, and time of reaction is determined by the nature of the progress of the reaction in a particular batch. Importantly, the process is readily automated and can be put into an automated process control environment. Although numerous examples have been provided in detail, it will be readily apparent to those skilled in the art that this unique pressurized production process for manufacture of calcium carbonate, and of the manufacture of calcium silicate in common equipment, and the apparatus for implementing such a process, may be modified from those embodiments provided herein, without materially departing from the novel teachings and advantages provided.

It will thus be seen that the objects set forth above, including those made apparent from the preceding description, are efficiently attained. Since certain changes may be made in carrying out the method for production of precipitated calcium carbonate and of calcium silicate, according to the teachings herein, it is to be understood that this invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

The intention is to cover all modifications, equivalents, and alternatives falling within the scope and spirit of the invention, as expressed herein above and in the appended claims. As such, the claims are intended to cover the methods, apparatus, structures (including crystal structures), and products described herein, and not only the equivalent methods or structural equivalents thereof, but also equivalent methods or structures. The scope of the invention, as described herein and as indicated by the appended claims, is thus intended to include variations from the embodiments provided which are nevertheless described by the broad meaning and range properly afforded to the language of the claims, as explained by and in light of the terms included herein, or the legal equivalents thereof.

What is claimed is:

1. A method for the hydrothermal production of calcium silicate hydrate and calcium carbonate in a set of common reactors, said method comprising:
   (a) providing an aqueous lime slurry, said aqueous lime slurry comprising (i) $Ca(OH)_2$ solids and (ii) dissolved $Ca(OH)_2$ in the form of $Ca^{++}$ ions;
   (b) screening grit from said aqueous lime slurry;
   (c) conditioning said aqueous lime slurry to a predetermined temperature;
   (d) feeding a first portion of said aqueous lime slurry into a first reactor of said set of common reactors;
   (e) agitating the contents of said first reactor at superatmospheric pressure;
   (f) introducing a stream of $CO_2$ into said aqueous lime slurry in said first reactor, to form $CO_3^{-2}$;
   (g) reacting said $CO_3^{-2}$; and said $Ca^{++}$ in a carbonation reaction to produce insoluble precipitated calcium carbonate ($CaCO_3$) in said first reactor;
   (h) removing said insoluble precipitated calcium carbonate and associated water from said first reactor;
   (i) charging a second reactor of said set of common reactors with a first aqueous silica slurry comprising silica at a concentration of from about 1 to about 1.5 pounds of silica per gallon of said first aqueous silica slurry;
   (j) charging said second reactor of said set of common reactors with a second portion of said aqueous lime slurry;
   (k) heating the contents of said second reactor under hydrothermal conditions to produce a calcium silicate;
   (l) removing said calcium silicate from said second reactor;
   (m) switching feed of said first portion of said aqueous lime slurry and said $CO_2$ to said second reactor from said frist reactor, and switching feed of said first aqueous silica slurry and said second portion of aqueous lime slurry to said first reactor, so that precipitated calcium carbonate is produced in said second reactor, and calcium silicate is produced in said first reactor.

2. The method as set forth in claim 1, wherein said silica comprises fluxed calcined diatomaceous earth (FCDE).

3. The method as set forth in claim 1, further comprising the step of heating said first aqueous silica slurry prior to charging said second reactor with said first aqueous silica slurry.

4. The method as set forth in claim 3, wherein said step of heating is carried out in a shell and tube heat exchanger.

5. The method as set forth in claim 1, wherein said hydrothermal conditions comprise pressure at up to 1000 psig.

6. The method as set forth in claim 1, wherein during step (k) of claim 1, agitation is provided in said second reactor.

7. The method as set forth in claim 1, wherein said carbon dioxide is dissolved in an aqueous medium before introduction into said first reactor under pressure.

8. The method as set forth in claim 1, wherein said step of conditioning said aqueous lime slurry to a predetermined temperature comprises chilling said aqueous lime slurry in a chiller.

9. The method as set forth in claim 1, wherein multiple sets of common reactors are provided.

10. The method as set forth in claim 9, wherein at least two pairs of reactors are provided, and wherein each reactor in each of said at least two pairs of reactors is configured for superatmospheric operation.

11. The method as set forth in claim 10, wherein a bank of pressure carbonators is employed sequentially for said carbonation reaction.

12. The method as set forth in claim 11, wherein said carbonation reaction is controlled isothermally.

13. The process as set forth in claim 1, further comprising the step of preparation of said aqueous lime slurry, and wherein the time for preparation of said aqueous lime slurry (slaking) is matched with the time of said carbonation reaction, so that the manufacture of calcium carbonate and of calcium silicate hydrate is carried out continuously.

14. The method as set forth in claim 1 wherein said aqueous lime slurry used in step (d) or in step (j) has a concentration between 30 grams per liter and 300 grams per liter of calcium hydroxide.

15. The process as set forth in claim 1 wherein the pH of said aqueous lime slurry used in step (d) or in step (j) is at least of pH 12.

16. The method as set forth in claim 1 where said aqueous lime slurry is conditioned to a predetermined temperature of between 50° F. and 120° F.

17. The method as set forth in claim 1 where said aqueous lime slurry is conditioned to a predetermined temperature of approximately 50° F. by passing it through a chiller, and wherein said insoluble calcium carbonate comprises a rhombohedral crystal habit.

18. The method as set forth in claim 1 where said aqueous lime slurry is conditioned to a predetermined temperature of about 120° .F by passing it through a heat exchanger, and wherein said insoluble calcium carbonate comprises aragonite crystals.

19. The method as set forth in claim 1 where said aqueous lime slurry is conditioned to a predetermined temperature in the range from about 80° F. to about 100° F., and wherein said insoluble calcium carbonate comprises crystals having a sclenohedral crystal habit.

20. The method as set forth in claim 1 wherein the concentration of said aqueous lime slurry used in step (d) or in step j) is in the range from about 200 grams per liter of calcium hydroxide to about 250 grams per liter of calcium hydroxide.

21. The method as set forth in claim 1 where in the $CO_2$ concentration is in the range of 5.0% $CO_2$ by volume to 100% $CO_2$ by volume.

22. The method as set forth in claim 1 wherein the $CO_2$ is in a mixed gas stream, and wherein said $CO_2$ concentration ranges from about 5 percent to twenty five percent by volume, and wherein the rate of flow of $CO_2$ is regulated, so as to control reaction rate in the conversion of $Ca(OH)_2$ to calcium carbonate.

23. The method as set forth in claim 1 wherein the agitation in said first reactor during said carbonation reaction is carried out by a mechanical agitator and wherein the rotational speed of said mechanical agitator ranges from 500 revolutions per minute to 1500 revolutions per minute.

24. The method as set forth in claim 1 wherein the end of said carbonation reaction is indicated by reduction of the pH from about 12.0 to about 8.0.

25. The method as set forth in claim 1 wherein the end of said carbonation reaction is indicated when the temperature in said first reactor reaches a maximum.

26. The method as set forth in claim 1 wherein the properties of the precipitated calcium carbonate are controlled by adjustment of at least one of the process variables are selected from a group consisting of:
  (1) temperature of said aqueous lime slurry fed to said first reactor;
  (2) concentration of $Ca(OH)_2$ in said aqueous lime slurry fed to said first reactor;
  (3) concentration of $CO_2$ in a liquid portion of said aqueous lime slurry in said first reactor; and wherein said concentration of $CO_2$ in a liquid portion of said aqueous lime slurry is controlled by regulation of pressure in a gas phase in said first reactor.

27. The method as set forth in claim 26, wherein temperature of said aqueous lime slurry in step (c) of claim 1 is controlled between 50° F. and 120° F., and wherein concentration of $Ca(OH)_2$ in said aqueous lime slurry is in the range of 87 grams per liter to 116 grams per liter, so as to produce "stacked" rhombohedral precipitated calcium carbonate crystals.

28. The method as set forth in claim 26, wherein said temperature of said aqueous lime slurry in step (c) is controlled in the range between 80° F. and 100° F., to produce sclenohedral precipitated calcium carbonate.

29. The method as set forth in claim 26, wherein said temperature of said aqueous lime slurry is controlled in the range between 50° F. and 80° F. to produce rhombohedral precipitated calcium carbonate.

30. The process as set forth in claim 26, wherein said temperature of said aqueous lime slurry is controlled to 120° F. to produce aragonite precipitated calcium carbonate.

31. The method as set forth in claim 28, wherein said reaction conditions are selected to give sclenohedral precipitated calcium carbonate suitable for use in paper filling, coating, or size press applications.

32. The process as set forth in claim 29 wherein the reaction conditions are selected to give a variety of rhombohedral precipitated calcium carbonate suitable in use for paper filling, coating, or size press applications.

33. The method as set forth in claim 26, wherein said reaction conditions are selected to provide aragonite precipitated calcium carbonate suitable for application in paper filling, coating, or size press applications.

34. An improved process to produce calcium silicate hydrates, said process comprising:
  (a) providing an aqueous lime slurry comprising lime at near boiling temperature;
  (b) providing a first aqueous silica slurry comprising silica at a concentration of between about 1.0 and about 1.5 lbs/gallon;
  (c) heating said first aqueous silica slurry;
  (d) providing a pressure reactor capable of operating at a pressure of up to 1000 pounds per square inch gauge, and filling up the pressure reactor with said first aqueous silica slurry and said aqueous lime slurry in a preselected calcium to silica mole ratio, expressed as moles of CaO divided by moles of SiO$_2$, to provide a reactant charge in said pressure reactor;

(e) heating said reactant charge to carry out a hydrothermal reaction between lime particles and silica to form a calcium silicate hydrate;

(f) slowly agitating the reactant charge in the pressure vessel during the formation of said calcium silicate hydrate.

35. The process set forth in claim 34, wherein a slaker is provided to prepare said aqueous lime slurry.

36. The process as set forth in claim 34 wherein the hydrothermal reaction between said aqueous lime slurry and said first aqueous silica slurry takes place in a plurality of pressure reactors.

37. The process as set forth in claim 36 wherein the rate of hydrothermal reaction is balanced in such a way so as the feeding of said first aqueous silica slurry and the discharging of a slurry of calcium silicate hydrates from the plurality of pressure reactors is continuous.

38. The process as set forth in claim 34 wherein recovery of heat is maximized by employing a heat exchanger to recuperate heat from a discharge stream from said pressure reactor, and wherein said discharge stream comprises calcium silicate hydrate.

39. The process as set forth in claim 34 wherein the lime concentration in said aqueous lime slurry is in the range of from 0.2 to 0.4 lb/gallon.

40. The process as set forth in claim 34 wherein said silica comprises fine fluxed calcined diatomaceous earth, and wherein said silica concentration in said first aqueous silica slurry is approximately 1.22 pounds per gallon.

41. The process as set forth in claim 34 wherein the calcium to silica mole ratio ranges from 0.75 to 0.85, or from about 1.3 to about 1.5.

42. The process as set forth in claim 34 wherein the combined concentration of lime and silica in said reactant charge is controlled by addition of water to provide a reactant charge having a combined lime plus silica concentration ranging from 0.2 pounds per gallon to 1.0 pounds per gallon, or from 0.5 pounds per gallon to 0.75 pounds per gallon, or from 0.4 to 0.6 pounds per gallon.

43. The process as set forth in claim 34 wherein the time for the hydrothermal reaction varies between 1 to 4 hours.

44. The process as set forth in claim 43, wherein said time for the hydrothermal reaction at reaction temperature is approximately 2 hours.

45. The process as set forth in claim 34 wherein the reaction temperature for the hydrothermal reaction varies from about 338° F. to about 392° F., or from about 446° F. to about 482° F.

46. The process as set forth in claim 34 wherein the pressure is maintained between 130 pounds per square inch gauge and about 150 pounds per square inch gauge, or between about 475 pounds per square inch gauge and about 500 pounds per square inch gauge.

47. The process as set forth in claim 34, wherein heat is supplied to the hydrothermal process by saturated steam at between 450° F. and 600° F.

48. The process as set forth in claim 34, wherein the filling time of the pressure reactor is between 45 to 60 minutes.

49. The process as set forth in claim 34 wherein calcium silicate hydrate is discharged from said pressure reactor in a slurry in a time from between 45 to 60 minutes.

50. The process as set forth in claim 34, wherein the properties of the calcium silicate hydrate product are controlled by adjusting one or more of the process variables selected from a group consisting of:

(1) calcium to silica mole ratio,
(2) lime plus silica slurry concentration,
(3) reaction temperature, and
(4) reaction pressure.

51. The process as set forth in claim 50, wherein the calcium to silica mole ratio is in the range of 1.2 to 1.6.

52. The process as set forth in claim 51, wherein said calcium silicate hydrate comprises foshagite consisting of fibrous crystals ranging in size from 0.1 to 0.3 microns and in length up to about 5 microns.

53. The process as set forth in claim 51, wherein said calcium silicate hydrate comprises primary fibrous particles interlocked into a secondary particle structure, and wherein said secondary particle structure has a size varying from about 10 microns to about 40 microns.

54. The process as set forth in claim 34, wherein the brightness of said calcium silicate hydrate is in the range of 95+/−2.

55. The process as set forth in claim 34, wherein the water absorption of the calcium silicate hydrate is in the range of from about 400 percent to 1000 percent.

56. The process as set forth in claim 34, wherein the air permeability of the calcium silicate hydrate (as measured by Blaine method) is in the range of 60 to 200 seconds.

57. The process as set forth in claim 34 wherein the weight of the calcium silicate hydrate (as measured by Blaine method) is in the range of 0.35 to 0.5 grams.

58. The process as set forth in claim 34 wherein the x-ray diffraction pattern of said calcium silicate hydrate, when dried, comprises:

| | |
|---|---|
| Foshagite: | dMajor = 2.97 Å |
| | dMinor = 5.05 Å |
| Xenotlite: | dMajor = 3.107 Å |
| | dMinor = 3.66 Å |

59. The method as set forth in claim 41, or claim 42, or claim 45, or claim 46, wherein said calcium silicate hydrate comprises riversidite.

60. The method as set forth in claim 59, wherein calcium to silica mole ratio ranges from about 0.75 to about 0.85.

61. The method as set forth in claim 59, wherein said calcium plus silica concentration in said reactant charge, expressed as CaO+SiO$_2$, ranges from about 0.5 pounds per gallon to about 0.8 pounds per gallon.

62. The method as set forth in claim 59, wherein said reaction temperature varies from about 338° F. to about 392° F.

63. The method as set forth in claim 59, wherein said pressure is maintained between 130 pounds per square inch gauge and about 150 pounds per square inch gauge.

64. The method as set forth in claim 41, or claim 42, or claim 45, or claim 46, wherein said calcium silicate hydrate comprises foshagite.

65. The method as set forth in claim 64, wherein the calcium to silica mole ratio ranges from about 1.3 to about 1.5.

66. The method as set forth in claim 64, wherein said calcium plus silica concentration in said reactant charge, expressed as CaO+SiO$_2$, ranges from 0.4 pounds per gallon to 0.6 pounds per gallon.

67. The method as set forth in claim 64, wherein said reaction temperature varies from about 446° F. to about 482° F.

68. The method as set forth in claim 64, wherein said pressure is maintained between about 475 pounds per square inch gauge and about 500 pounds per square inch gauge.

* * * * *